United States Patent
Hsieh et al.

(10) Patent No.: US 11,132,381 B2
(45) Date of Patent: *Sep. 28, 2021

(54) PIPELINING PAXOS STATE MACHINES

(71) Applicant: Google LLC, Mountain View, CA (US)

(72) Inventors: Wilson Cheng-Yi Hsieh, Syosset, NY (US); Alexander Lloyd, New York, NY (US)

(73) Assignee: Google LLC, Mountain View, CA (US)

( * ) Notice: Subject to any disclaimer, the term of this patent is extended or adjusted under 35 U.S.C. 154(b) by 173 days.

This patent is subject to a terminal disclaimer.

(21) Appl. No.: 16/241,598

(22) Filed: Jan. 7, 2019

(65) Prior Publication Data

US 2019/0266176 A1    Aug. 29, 2019

Related U.S. Application Data

(63) Continuation of application No. 14/988,535, filed on Jan. 5, 2016, now Pat. No. 10,191,960, which is a
(Continued)

(51) Int. Cl.
*G06F 16/27* (2019.01)
*G06F 16/23* (2019.01)
*H04L 29/08* (2006.01)

(52) U.S. Cl.
CPC ........ *G06F 16/273* (2019.01); *G06F 16/2343* (2019.01); *G06F 16/2379* (2019.01); *G06F 16/27* (2019.01); *H04L 67/1095* (2013.01)

(58) Field of Classification Search
CPC .... G06F 16/273; G06F 16/27; G06F 16/2379; G06F 16/2343; H04L 67/1095
(Continued)

(56) References Cited

U.S. PATENT DOCUMENTS 5,421,007 A    5/1995  Coleman et al.
5,832,521 A    11/1998 Klots et al.
(Continued)

FOREIGN PATENT DOCUMENTS

WO    2011100366 A2    8/2011
WO    2012040391 A1    3/2012

OTHER PUBLICATIONS

Notification of First Office Action CN 201380037792.3, dated Sep. 28, 2016, 11 pgs.
(Continued)

*Primary Examiner* — Hares Jami
(74) *Attorney, Agent, or Firm* — Lerner, David, Littenberg, Krumholz & Mentlik, LLP

(57) ABSTRACT

Paxos transactions are pipelined in a distributed database formed by a plurality of replica servers. A leader server is selected by consensus of the replicas, and receives a lock on leadership for an epoch. The leader gets Paxos log numbers for the current epoch, which are greater than the numbers allocated in previous epochs. The leader receives database write requests, and assigns a Paxos number to each request. The leader constructs a proposed transaction for each request, which includes the assigned Paxos number and incorporates the request. The leader transmits the proposed transactions to the replicas. Two or more write requests that access distinct objects in the database can proceed simultaneously. The leader commits a proposed transaction to the database after receiving a plurality of confirmations for the proposed transaction from the replicas. After all the Paxos numbers have been assigned, inter-epoch tasks are performed before beginning a subsequent epoch.

20 Claims, 31 Drawing Sheets

Related U.S. Application Data continuation of application No. 13/910,004, filed on Jun. 4, 2013, now Pat. No. 9,230,000.

(60) Provisional application No. 61/655,430, filed on Jun. 4, 2012.

(58) Field of Classification Search
USPC .................. 707/610, 615, 636, 637, 704
See application file for complete search history.

(56) References Cited

U.S. PATENT DOCUMENTS

| | | | |
|---|---|---|---|
| 6,477,544 B1 | 11/2002 | Bolosky et al. | |
| 6,963,914 B1 | 11/2005 | Breitbart et al. | |
| 6,981,114 B1 | 12/2005 | Wu | |
| 7,334,004 B2 | 2/2008 | Ganesh et al. | |
| 7,430,570 B1 | 9/2008 | Srinivasan et al. | |
| 7,567,973 B1 | 7/2009 | Burrows et al. | |
| 7,774,469 B2 | 8/2010 | Massa et al. | |
| 8,627,135 B2 | 1/2014 | Aron et al. | |
| 8,719,432 B1* | 5/2014 | Vermeulen | G06F 9/526 709/229 |
| 8,838,539 B1 | 9/2014 | Ashore et al. | |
| 8,850,130 B1* | 9/2014 | Aron | G06F 3/0641 711/150 |
| 8,949,208 B1 | 2/2015 | Xu et al. | |
| 9,069,827 B1* | 6/2015 | Rath | G06F 11/2094 |
| 2002/0133507 A1 | 9/2002 | Holenstein et al. | |
| 2003/0065708 A1* | 4/2003 | Jacobs | H04L 69/329 709/201 |
| 2005/0015404 A1 | 1/2005 | Cherkasova | |
| 2005/0149627 A1 | 7/2005 | Schreter | |
| 2005/0177590 A1 | 8/2005 | Chen et al. | |
| 2007/0016546 A1 | 1/2007 | De Vorchik et al. | |
| 2007/0050429 A1 | 3/2007 | Goldring et al. | |
| 2007/0183224 A1 | 8/2007 | Erofeev | |
| 2008/0071853 A1* | 3/2008 | Mosier | H04L 67/1095 709/201 |
| 2008/0096662 A1 | 4/2008 | Kuwahara et al. | |
| 2008/0243879 A1 | 10/2008 | Gokhale et al. | |
| 2008/0263305 A1 | 10/2008 | Shu et al. | |
| 2009/0070330 A1 | 3/2009 | Hwang et al. | |
| 2009/0327642 A1 | 12/2009 | Ogihara et al. | |
| 2010/0023520 A1 | 1/2010 | Barboy et al. | |
| 2010/0077165 A1 | 3/2010 | Lu et al. | |
| 2010/0281013 A1 | 11/2010 | Graefe | |
| 2011/0196664 A1 | 8/2011 | Zunger et al. | |
| 2012/0036161 A1 | 2/2012 | Lacapra et al. | |
| 2012/0151272 A1* | 6/2012 | Behrendt | G06F 11/203 714/39 |
| 2012/0159102 A1 | 6/2012 | Kan | |
| 2012/0167098 A1* | 6/2012 | Lee | G06F 16/2379 718/101 |
| 2012/0303791 A1 | 11/2012 | Calder et al. | |
| 2013/0060742 A1 | 3/2013 | Chang et al. | |
| 2013/0110774 A1* | 5/2013 | Shah | G06F 11/1658 707/610 |
| 2013/0204991 A1* | 8/2013 | Skjolsvold | G06F 9/5083 709/223 |
| 2013/0318129 A1 | 11/2013 | Vingralek et al. | |
| 2013/0346365 A1 | 12/2013 | Kan et al. | |
| 2015/0012497 A1 | 1/2015 | Clark et al. | |

OTHER PUBLICATIONS

Ferro, A Critique of Snapshot Isolation, Yahoo Research, Apr. 10-13, 2012, 14 pgs.

Thomson, Calvin: Fast Distributed Transactions for Partitioned Database Systems, May 20-24, 2012, 12 pgs.

Cahill, Seriallizable Isolation for Snapshot Databases, Jun. 9-12, 2008, 10 pgs.

Bernstein, Chapter 5—Multiversion Concurrency Control, Concurrency Control and Recovery in Database Systems, Jan. 1, 1987, 24 pgs.

Chang, Bigtable: A Distributed Storage System for Structured Data, Google, Nov. 2006, 14 pgs, research.google.com/archive/bigtable.html.

Elmasri, Chapter 20—Physical Database Design and Tuning, Fundamentals of Database Systems, 6th Ed., Addison-Nesley, Jan. 1, 2011, 16 pgs.

Garcia-Molina, Chapter 18—Concurrency Control, Database Systems: The Complete Book, Prentice-Hall, Jan. 1, 2002, 72 pgs.

Garcia-Molina, Chapter 1—The Worlds of Database Systems, Database Systems: The Complete Book, Prentice Hall, Jan. 1, 2002, 21 pgs.

Ghemawat, The Google File System, Proc. of the ACM Symposium on Operating Systems Principles, Oct. 19, 2003, pp. 1-15.

Google Inc., International Preliminary Report on Patentability, PCT/US2013/044105, dated Dec. 9, 2014, 4 pgs.

Google Inc., International Preliminary Report on Patentability, PCT/US2013/044163, dated Dec. 9, 2014, 9 pgs.

Google Inc., International Search Report and Written Opinion, PCT/US2013/042063, dated Dec. 13, 2013, 16 pgs.

Google Inc., International Search Report and Written Opinion, PCT/US2013/044105, dated Nov. 14, 2013, 6 pgs.

Google Inc., International Search Report and Written Opinion, PCT/US2013/044163, dated May 9, 2014, 11 pgs.

Google Inc., Invitation to Pay Additional Fees, PCT/US2013/042063, dated Jul. 30, 2013.

Ivanova, Self-Organizing Strategies for a Column-Store Database, Proc. 11th Int'l Conf. on Extending Database Technology Advances in Database Technology, EDBT'08, Mar. 25, 2008, pp. 157-168.

Zhang, Supporting Multi-Row Distributed Transactions with Global Snapshot Isolation Using Bare-Bones Hbase, 11th IEEE/ACM Int'l Cont. on Grid Computing, Piscataway, NJ, Oct. 25, 2010, pp. 177-184.

\* cited by examiner

Database Table 1200 → Figure 12A

| 1202 Customer ID | 1204 Last Name | 1206 First Name | 1208 Address | 1210 City | 1212 State | 1214 Orders |
|---|---|---|---|---|---|---|
| 454928806 | Value(s) | Value(s) | Value(s) | Value(s) | Value(s) | Subtable |
| 312257018 | Value(s) | Value(s) | Value(s) | Value(s) | Value(s) | Subtable |

1216, 1218, 1220, 1222, 1224

Address Values for Customer 312257018

| 1230 Address Timestamp | 1228 Address Value |
|---|---|
| 2009-01-02 13:12:21.5723 | 123 Main St. |
| 2011-09-15 18:15:53.0217 | 2388 First St. #12 |
| 2013-12-22 08:43:29.8293 | 9178 Sunset Avenue |

Orders Subtable for Customer 312257018

| 1250 Order ID | 1252 Order Date | 1254 Shipping Address | 1256 Order Items |
|---|---|---|---|
| AB0032117 | Value(s) | Value(s) | Subtable |
| QA1997233 | Value(s) | Value(s) | Subtable |

Items Subtable for Order QA1997233

| 1270 Item ID | 1272 Quantity | 1274 Price |
|---|---|---|
| 3815-90098 | Value(s) | Value(s) |
| 7752-81517 | Value(s) | Value(s) |

| Customer ID (1202) | [First Name] Last Write (1306) | [Address] Last Write (1308) | |
|---|---|---|---|
| 312257018 | 2009-01-02 13:12:21.5723 | 2013-12-22 08:43:29.8293 | ... |

Minimum Next New
Write Timestamp
(MNNWT)

| |
|---|
| 2014-03-15 21;12:49.4375 |

1320

Write Transaction 1400

Read Transaction 1450

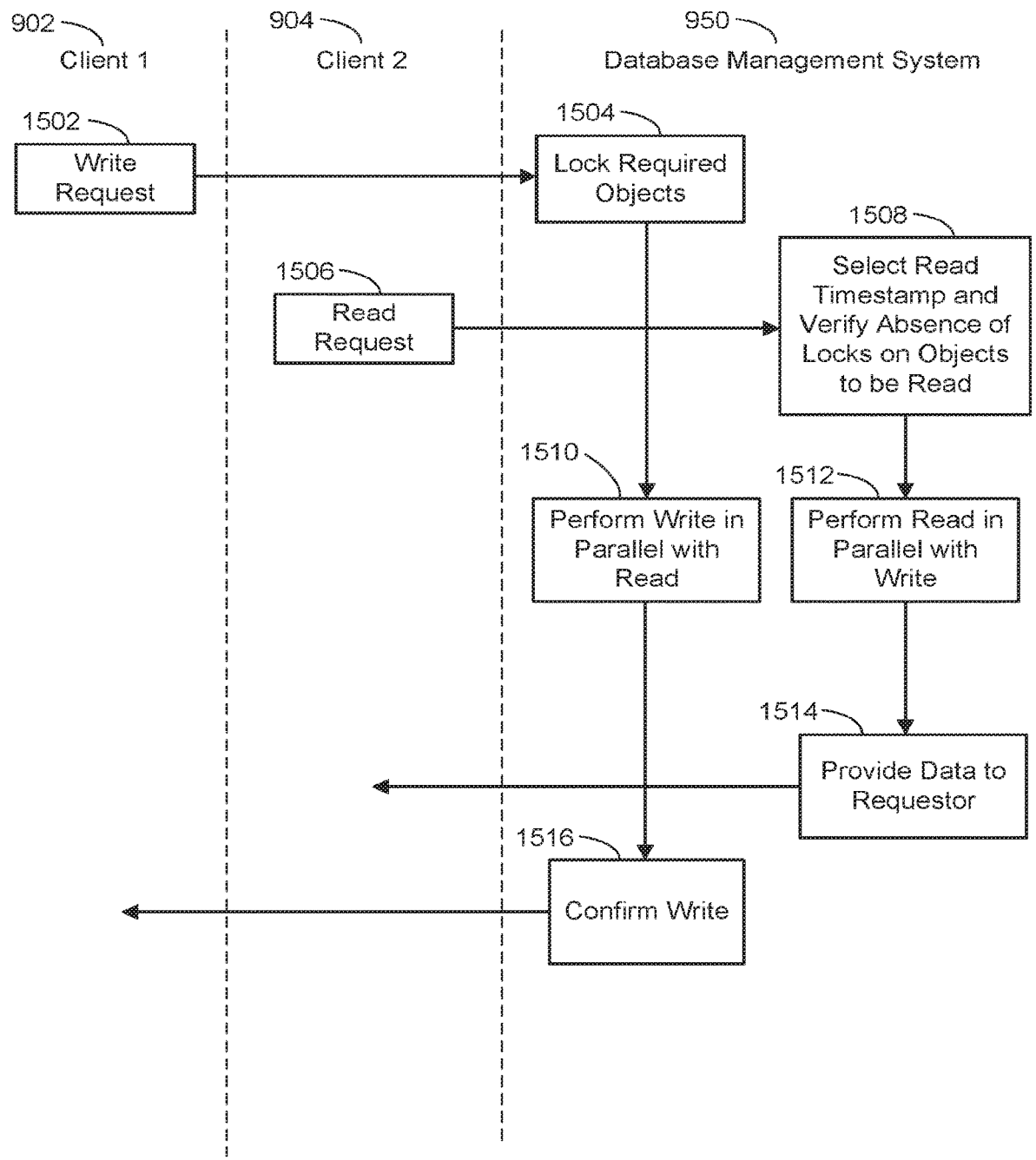

Processing a Single Write

Figure 20

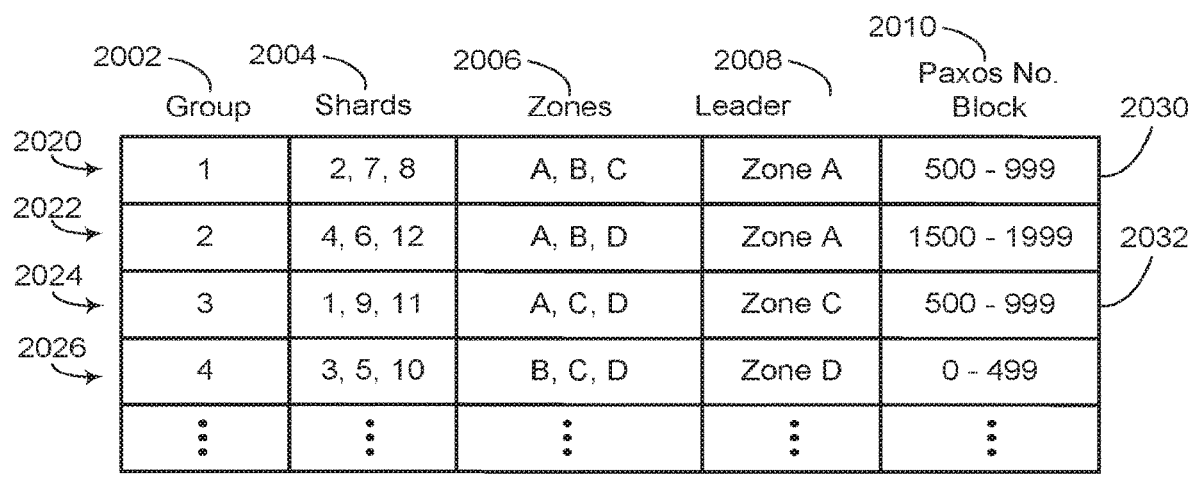

| Group | Shards | Zones | Leader | Paxos No. Block |
|---|---|---|---|---|
| 1 | 2, 7, 8 | A, B, C | Zone A | 500 - 999 |
| 2 | 4, 6, 12 | A, B, D | Zone A | 1500 - 1999 |
| 3 | 1, 9, 11 | A, C, D | Zone C | 500 - 999 |
| 4 | 3, 5, 10 | B, C, D | Zone D | 0 - 499 |
| ⋮ | ⋮ | ⋮ | ⋮ | ⋮ |

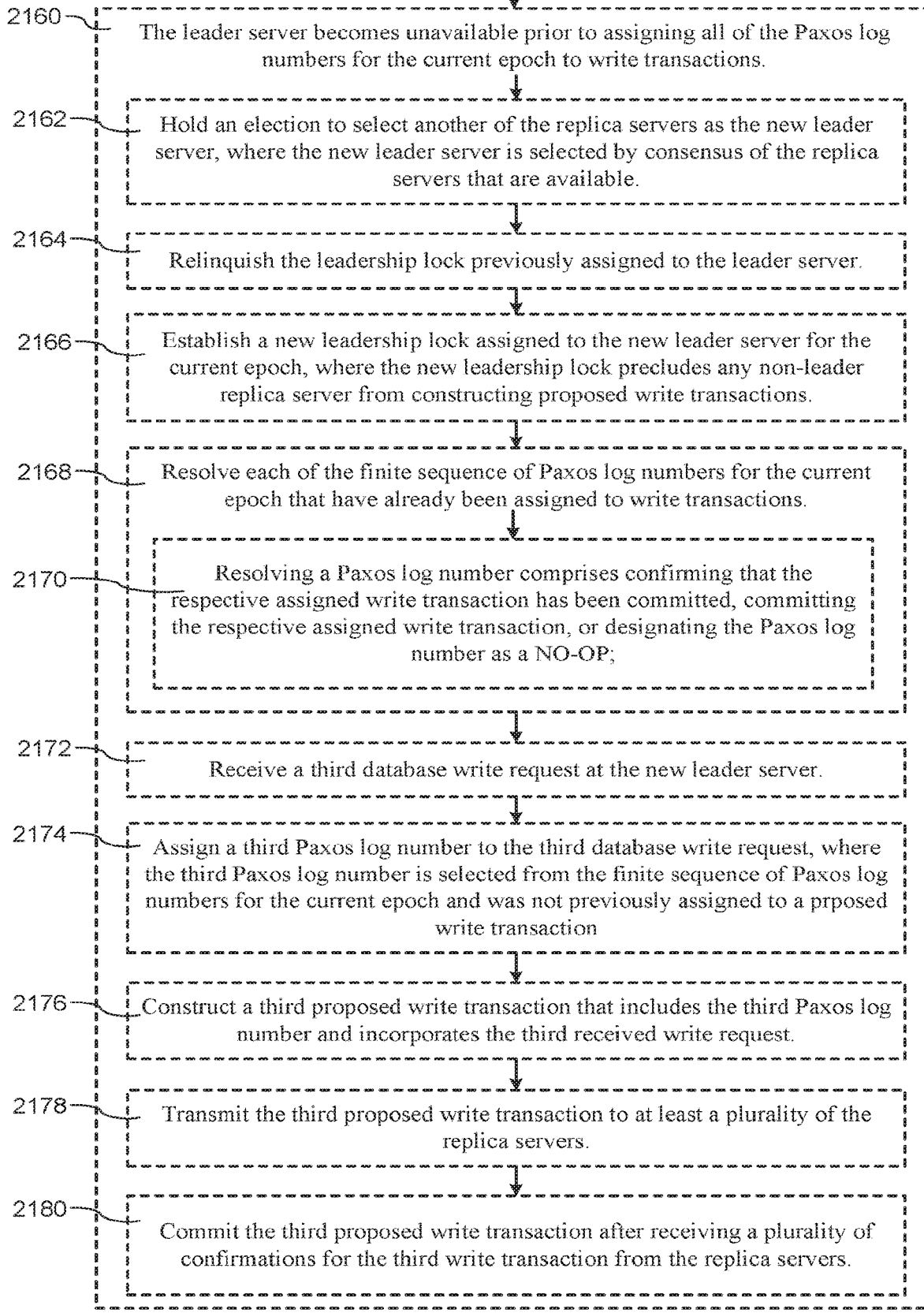

Figure 23
Leader Catchup Pseudocode

2300

```
PRECONDITION: Replica has applied entire preceding group epoch, and quorum that
made it leader is a majority of the current group. NOTE: The leader replica is not
necessarily a member of the group he is catching up from for a particular group
epoch. The code must take care to track what state the leader has without
inappropriately including him in quorum calculations.

// Create pipeline for (highest_applyable, end of group epoch]

PaxosPipeline pipeline;

// Start machine for each sequence num in appropriate state:
// - for committed, present proposals: DONE
// - for committed proposals: PENDING_FIND(commit.view_id)
// - for uncommitted proposals: PENDING_FIND(max view seen)
// - for present proposals we've learned are committed: PENDING_LOCALLOG pipeline.InitForCatchup(pending_md, NewLeader responses);

// Track manifests returned from NewLeader responses. Update this as
// NewLeader responses trickle in so we can use replicas that weren't
// part of the initial quorum here.

map<ReplicaId, Manifest> replica_manifests;
while (highest_applyable_seq < highest_known_seq) {
        if (pipeline.Done() ) {
           wait until local / loopback rpcs have completed;
           CHECK(local highest applyable is send of epoch);
           transition to LeaderTakeover;
        }
  on receipt of GetProposals response:
     pipeline.FindDone(...);
  on receipt of MultiPropose response:
     pipeline.ProposeDone(...);
  while (pipeline.BufferedProposalsBytes() < limit) {
     next_find = pipeline.GetPendingFinds();replica = PickBestNearest(next_find,
     replica_manifests, latency_stats);
     next_find = intersect(next_find, proposals in replica's manifest);
     pipeline.StartingFind(next_find);
     GetProposals(replica, next_find, available limit);
   }
  while (propose limit is not exceeded) {
     next_proposals = pipeline.StartPropose(remaining propose byte limit);
     next_commits = pipeline.StartCommit(); // no limit needed
     for each replica: MultiPropose(replica, next_proposals, next_commits);
   }
  if (pipeline.HasPendingLocalLog()) {
     MultiPropose(this replica, pipeline.StartLocalLog()); // no limit needed
   }
}
```

PIPELINING PAXOS STATE MACHINES

RELATED APPLICATIONS

The present application is a continuation of U.S. patent application Ser. No. 14/988,535, filed on Jan. 5, 2016, which is a continuation of U.S. patent application Ser. No. 13/910,004 filed Jun. 4, 2013, entitled "Pipelining Paxos State Machines," now U.S. Pat. No. 9,230,000 which claims the benefit of the filing date of U.S. Provisional Application Ser. No. 61/655,430, filed Jun. 4, 2012, entitled "Pipelining Paxos State Machines," the disclosures of which are hereby incorporated by reference.

TECHNICAL FIELD

The disclosed embodiments relate generally to database management systems and more specifically to reducing latency for database access in a distributed database.

BACKGROUND

For large scale databases, a key feature is fault tolerance. Loss of access to data for a day, an hour, or even a few minutes may not be acceptable. For example, an email user whose data is stored at a distant server expects access to the email at all times.

One way to address fault tolerance is to maintain multiple copies of data at distinct geographic locations. This is commonly called a distributed database. Even if one copy of the data is unavailable (e.g., due to a power outage or hardware failure), one of the other replicas can seamlessly provide the data. However, maintaining multiple copies of data at distinct sites introduces the potential problem of having different data at different replicas.

One technique introduced to keep multiple databases synchronized is the Paxos consensus algorithm. This methodology can successfully keep replicas synchronized under most typical scenarios, but is slower than desired, especially for large scale databases. One reason for the slow speed is that requests to write to the database within each Paxos group are single threaded.

SUMMARY OF THE INVENTION

Disclosed embodiments improve performance of database writes by processing multiple writes in parallel. This is sometimes referred to as pipelining because there can be multiple write transactions in the pipeline at the same time. To enable pipelining of writes, disclosed embodiments modify the basic Paxos algorithm in multiple ways. First, writes to the database are grouped into epochs, with a certain number of writes processed in each epoch. For example, some embodiments process 500 write transactions per epoch. Second, a single database server or group of servers is designated as the leader for each epoch, and the leader holds a lock on leaderhood for the duration of the epoch. In this way, only the one leader proposes writes during the epoch, so the database management system does not have to address conflicting write requests from multiple independent servers. The leader is able to prevent proposing conflicting writes based on granular tracking of what database objects each transaction will modify. For example, if two write requests intend to update the same column of the same row, there is an inherent conflict, so the two write requests cannot proceed in parallel. However, if two write requests do not have an inherent conflict, the leader can create write transactions for the requests that proceed in parallel.

Epochs provide a checkpoint for transactions. Prior to beginning a new epoch, all of the transactions in the previous epoch must be resolved. For example, each outstanding write transaction is either already applied to the database, or is applied to the database now, or is killed. In the absence of a failure at the leader, all of the write transactions are generally committed. This process essentially serializes epochs rather than serializing individual transactions within a Paxos group. There is freedom to parallelize transactions within an epoch, but all transactions within an epoch must be committed before proceeding to the next epoch.

Epochs provide additional benefits. Another benefit of epochs is that it places an upper bound on unresolved transactions. This can be particularly important if the leader becomes unavailable (e.g., hardware failure, power outage, network outage at or near the leader, etc.). When this occurs, a new leader must be selected, and the new leader must resolve all of the transactions proposed by the previous leader. Because of the parallel processing of transactions, there can be many proposed transactions that are uncommitted. The new leader resolves each of the outstanding proposed transactions, committing the transactions that already have a quorum of confirmations (i.e., acceptances by the replicas that the proposed transaction is okay), reproposing some proposed transactions, and replacing some proposed operations with NO-OPs (no operation). Because all transactions for each epoch are resolved at the end of an epoch, a new leader after a failure only needs to review the transactions for the current epoch.

At an epoch boundary, the database management system can also change the size of the next epoch and/or elect a new leader.

Pipelining is different from batching or "boxcarring" transactions. Pipelined transactions process independently and in parallel. Batching, on the other hand, groups multiple write requests together, essentially as a composite transaction. Batching generally reduces the overhead of processing individual transactions (thereby increasing throughput), but can actually increase latency by holding some transactions until the batch is "full." Pipelining, on the other hand, does not increase throughput, but decreases latency because write requests do not spend time waiting unnecessarily. Although the present disclosure addresses pipelining, some embodiments implement pipelining in conjunction with batching to achieve higher throughput and lower latency.

While pipelining increases the parallelism between distinct write transactions, disclosed embodiments also increase the parallelism between database reads and writes by maintaining more granular data on when objects were last modified. Each item (e.g., column) in a multiversion database is versioned and stored at a server-assigned timestamp. Old versions of an item can be read, but are typically subject to garbage-collection limits. Timestamps are causally consistent so that reads of data at old timestamps are guaranteed to reflect a causally consistent view of the database. For example, if transaction T1 completes before transaction T2 starts, then the timestamp of T1 must be less than the timestamp of T2, even if the transactions are on separate machines and do not overlap in terms of the data they access. Moreover, transaction T2 is guaranteed to "see" the effects of T1, and any transaction that "sees" T2 will also see T1. A read transaction with a timestamp T3 between T1 and T2 will see the effects of T1 but not T2, regardless of when the transaction T3 is issued. In other words, two reads of the same data with the same specified timestamp will return the same data.

When a client reads data from a multiversion database, the read can either specify a timestamp or allow the database management system to select the read timestamp within a specified bound on staleness. Selecting a timestamp within a staleness bound requires locking and/or blocking in order to prevent ambiguous staleness calculations.

Multiversion databases enable the calculation of a read timestamp by tracking the last time any change was made to a row of data. However, when the database tracks only the last time each row was modified, the algorithm for selecting a read timestamp locks the row, which will conflict with other operations on the same row, even if the other operation is not accessing the same columns or objects within the row. This methodology artificially limits concurrent access to a single row.

Rather than keeping a per-row or per-shard record of last-timestamp-written, disclosed embodiments keep track of the last-timestamp written for each object (e.g., column or field within a row). Because of this detail, read timestamps can be selected and reads can proceed without being blocked by concurrent writes as long as the ongoing write does not have locks on the specific objects required by the read operation.

In large scale computer systems, a single server computer is typically unable to handle all of the received requests (e.g., requests for web pages, requests for data, etc.). Therefore, arrays of server computers are networked together, typically with load balancing software (or a dedicated load-balancing server computer), to process all of the received requests. The array may include 10, 50, 100, or 1000 server computers as needed to accommodate the volume of requests. From the viewpoint of a client computer, the array appears to be a single "server." Accordingly, as used in this disclosure and the corresponding claims, the term "server" should be read to mean one or more server computers, operating jointly or in parallel to perform related tasks.

In accordance with some embodiments, a computer-implemented method executes at a plurality of replica servers at a plurality of distinct geographic locations, each replica server having one or more processors and memory. The memory stores one or more programs for execution by the one or more processors. The method pipelines Paxos transactions in a distributed database formed by the plurality of replica servers. The method selects a leader server from the plurality of replica servers based on a consensus of the replica servers. The method allocates a finite sequence of Paxos log numbers for a current epoch. The lowest log number in the finite sequence is greater than a highest log number allocated in previous epochs. The method establishes a leadership lock assigned to the leader server for the current epoch. The leadership lock precludes any non-leader replica server from constructing proposed write transactions. The leader server receives a first database write request, and assigns a first Paxos log number to the first database write request. The first Paxos log number is selected from the finite sequence of Paxos log numbers for the current epoch. The leader server constructs a first proposed write transaction that includes the first Paxos log number and incorporates the first received write request and transmits the first proposed write transaction to at least a plurality of the non-leader replica servers. The leader server also receives a second database write request. The second write request and the first write request access distinct objects in the distributed database. The leader server assigns a second Paxos log number to the second database write request. The second Paxos log number is selected from the finite sequence of Paxos log numbers for the current epoch and is distinct from the first Paxos log number. The leader server constructs a second proposed write transaction that includes the second Paxos log number and incorporates the second received write request, then transmits the second proposed write transaction to at least a plurality of the non-leader replica servers prior to committing the first proposed write transaction. The leader server commits the first and second proposed write transactions after receiving a plurality of confirmations for the first and second proposed write transactions from the replica servers. After all of the finite sequence of Paxos log numbers have been assigned to Paxos write transactions, the method performs one or more inter-epoch tasks prior to allocating additional Paxos log numbers for a subsequent epoch.

In accordance with some embodiments, a database management system comprises a plurality of replica servers at a plurality of distinct geographic locations, each replica server having one or more processors and memory. The memory stores one or more programs for execution by the one or more processors. The database management system pipelines Paxos transactions in a distributed database formed by the plurality of replica servers. The database management system selects a leader server from the plurality of replica servers based on a consensus of the replica servers. The database management system allocates a finite sequence of Paxos log numbers for a current epoch. The lowest log number in the finite sequence is greater than a highest log number allocated in previous epochs. The database management system establishes a leadership lock assigned to the leader server for the current epoch. The leadership lock precludes any non-leader replica server from constructing proposed write transactions. The leader server receives a first database write request, and assigns a first Paxos log number to the first database write request. The first Paxos log number is selected from the finite sequence of Paxos log numbers for the current epoch. The leader server constructs a first proposed write transaction that includes the first Paxos log number and incorporates the first received write request and transmits the first proposed write transaction to at least a plurality of the non-leader replica servers. The leader server also receives a second database write request. The second write request and the first write request access distinct objects in the distributed database. The leader server assigns a second Paxos log number to the second database write request. The second Paxos log number is selected from the finite sequence of Paxos log numbers for the current epoch and is distinct from the first Paxos log number. The leader server constructs a second proposed write transaction that includes the second Paxos log number and incorporates the second received write request, then transmits the second proposed write transaction to at least a plurality of the non-leader replica servers prior to committing the first proposed write transaction. The leader server commits the first and second proposed write transactions after receiving a plurality of confirmations for the first and second proposed write transactions from the replica servers. After all of the finite sequence of Paxos log numbers have been assigned to Paxos write transactions, the database management system performs one or more inter-epoch tasks prior to allocating additional Paxos log numbers for a subsequent epoch.

In accordance with some embodiments, a computer readable storage medium stores one or more programs configured for execution by a plurality of replica servers at a plurality of distinct geographic locations, each replica server having one or more processors and memory storing one or more programs for execution by the one or more processors. The one or more programs include instructions for pipelining Paxos transactions in a distributed database formed by the plurality of replica servers. The programs are configured to select a leader server from the plurality of replica servers based on a consensus of the replica servers. The programs are configured to allocate a finite sequence of Paxos log numbers for a current epoch. The lowest log number in the finite sequence is greater than a highest log number allocated in previous epochs. The programs are configured to establish a leadership lock assigned to the leader server for the current epoch. The leadership lock precludes any non-leader replica server from constructing proposed write transactions. The leader server receives a first database write request, and assigns a first Paxos log number to the first database write request. The first Paxos log number is selected from the finite sequence of Paxos log numbers for the current epoch. The leader server constructs a first proposed write transaction that includes the first Paxos log number and incorporates the first received write request and transmits the first proposed write transaction to at least a plurality of the non-leader replica servers. The leader server also receives a second database write request. The second write request and the first write request access distinct objects in the distributed database. The leader server assigns a second Paxos log number to the second database write request. The second Paxos log number is selected from the finite sequence of Paxos log numbers for the current epoch and is distinct from the first Paxos log number. The leader server constructs a second proposed write transaction that includes the second Paxos log number and incorporates the second received write request, then transmits the second proposed write transaction to at least a plurality of the non-leader replica servers prior to committing the first proposed write transaction. The leader server commits the first and second proposed write transactions after receiving a plurality of confirmations for the first and second proposed write transactions from the replica servers. The programs are configured to perform one or more inter-epoch tasks after all of the finite sequence of Paxos log numbers have been assigned to Paxos write transactions and prior to allocating additional Paxos log numbers for a subsequent epoch.

In accordance with some embodiments, a computer-implemented method executes at one or more server systems, each with one or more processors and memory. The memory stores one or more programs for execution by the one or more processors. The programs include instructions for reading and writing data from a database. The method includes creating a database table that has a plurality of rows. Each row has a primary key and a plurality of non-key columns. Each non-key column has one or more column values, each having an associated timestamp. The timestamp associated with a column value identifies when the column value was stored. Accordingly, the timestamps associated with the column values in each non-key column provide a unique order for the column values that comprise the non-key column. The method includes initiating a write transaction to update a first row in the database table, which includes placing a lock on a first non-key column of the first row. Prior to completion of the write transaction, the method initiates a read transaction to read from a second non-key column of the first row in the database table. The second non-key column is distinct from the first non-key column. The first transaction and the second transaction execute at the same time, operating on distinct columns of the same row. Completing the write transaction includes selecting a first timestamp that is greater than the timestamps associated with existing column values for the first non-key column of the first row, and inserting a new column value into the first non-key column of the first row of the database table. The new column value is associated with the first timestamp.

In accordance with some embodiments, a database management system includes one or more server systems, each with one or more processors and memory. The memory stores one or more programs for execution by the one or more processors. The programs include instructions for reading and writing data from a database. The database management system creates a database table that has a plurality of rows. Each row has a primary key and a plurality of non-key columns. Each non-key column has one or more column values, each having an associated timestamp. The timestamp associated with a column value identifies when the column value was stored. Accordingly, the timestamps associated with the column values in each non-key column provide a unique order for the column values that comprise the non-key column. The database management system initiates a write transaction to update a first row in the database table, which includes placing a lock on a first non-key column of the first row. Prior to completion of the write transaction, the database management system initiates a read transaction to read from a second non-key column of the first row in the database table. The second non-key column is distinct from the first non-key column. The first transaction and the second transaction execute at the same time, operating on distinct columns of the same row. The database management system completes the write transaction by selecting a first timestamp that is greater than the timestamps associated with existing column values for the first non-key column of the first row, and inserting a new column value into the first non-key column of the first row of the database table. The new column value is associated with the first timestamp.

In accordance with some embodiments, a computer readable storage medium stores one or more programs configured for execution by one or more server computers in a database management system, each server computer having one or more processors and memory storing one or more programs for execution by the one or more processors, the one or more programs comprising instructions for reading and writing data from a database. The computer readable storage medium includes instructions to create a database table that has a plurality of rows. Each row has a primary key and a plurality of non-key columns. Each non-key column has one or more column values, each having an associated timestamp. The timestamp associated with a column value identifies when the column value was stored. Accordingly, the timestamps associated with the column values in each non-key column provide a unique order for the column values that comprise the non-key column. The computer readable storage medium includes instructions to initiate a write transaction to update a first row in the database table, which includes placing a lock on a first non-key column of the first row. The computer readable storage medium includes instructions that are configured to execute prior to completion of the write transaction, which initiate a read transaction to read from a second non-key column of the first row in the database table. The second non-key column is distinct from the first non-key column. The instructions included in the computer readable storage medium are configured to execute the first transaction and the second transaction at the same time, operating on distinct columns of the same row. The computer readable storage medium includes instructions to complete the write transaction by selecting a first timestamp that is greater than the timestamps associated with existing column values for the first non-key column of the first row, and inserting a new column value into the first non-key column of the first row of the database table. The new column value is associated with the first timestamp.

Disclosed embodiments thus increase concurrency between multiple writes to a database as well as concurrency between reads and writes.

Other aspects of this disclosure may be advantageous for generating globally synchronized timestamps without incurring various types of network uncertainty inherent in explicit synchronization. The globally synchronized timestamps can be used by various services, e.g., to validate local timestamps and clocks, or to provide causality-respecting timestamps for database updates. By introducing techniques to track, calculate and record time data relative to a number of reliable time references, an easy-to-manage and low-cost time base may be provided for host machines in a distributed system.

One aspect of the disclosure provides a method that includes receiving an initial local timestamp, receiving reference timestamps transmitted from a plurality of time references, determining transmission delays associated with the time references, and calculating, using a processor, time offset intervals corresponding to the time references. Each time offset interval includes a set of time offsets that represent differences between a given reference timestamp and the initial local timestamp. In this regard, the set of time offsets compensate for the transmission delay associated with the corresponding time reference. The method also includes selecting at least one of the time offset intervals based on an occurrence of that time offset interval among the calculated time offset intervals. In one example, the selected time offset interval has a highest occurrence among the calculated time offset intervals. In another example, determining transmission delays includes estimating an amount of time associated with receiving reference timestamps from a given time reference. The method may also include determining a timing error in local timestamps generated based on a local clock by comparing the local timestamps to the reference timestamps, and adjusting the local timestamps with the time offsets from the selected time offset interval. In one example, adjusting the local timestamps includes waiting for a period of time to pass.

Another aspect of the disclosure provides a system that includes a memory, a local clock, a receiver module adapted to receive reference timestamps from a plurality of time references, and a processor coupled to the memory. The processor may be configured to receive an initial local timestamp based on the local clock, register in memory reference timestamps received by the receiver module, determine transmission delays associated with the time references, and calculate time offset intervals corresponding to the time references. Each time offset interval includes a set of time offsets that represent differences between a given reference timestamp and the initial local timestamp. In this regard, the set of time offsets compensates for the transmission delay associated with the corresponding time reference. The processor is also configured to select at least one of the time offset intervals based on an occurrence of that time offset interval among the calculated time offset intervals.

Yet another aspect of the disclosure provides a tangible, computer-readable storage medium that includes instructions that, when executed by a processor, cause the processor to perform a method. The method includes receiving an initial local timestamp, receiving reference timestamps transmitted from a plurality of time references, determining transmission delays associated with the time references, and calculating, using a processor, time offset intervals corresponding to the time references. Each time offset interval includes a set of time offsets that represent differences between a given reference timestamp and the initial local timestamp. In this regard, the set of time offsets compensates for the transmission delay associated with the corresponding time reference. The method also includes selecting at least one of the time offset intervals based on an occurrence of that time offset interval among the calculated time offset intervals.

BRIEF DESCRIPTION OF THE DRAWINGS

FIGS. 12A-12D illustrate exemplary data structures used in a multiversion database in accordance with some embodiments.

FIGS. 13A-13B illustrate data that is used by a multiversion database to assign read timestamps and write timestamps in accordance with some embodiments.

FIG. 15 is an exemplary flowchart for simultaneously reading and writing data from a table in a multiversion database in accordance with some embodiments.

FIG. 20 illustrates an exemplary data structure corresponding to the graphical illustration in FIG. 19 in accordance with some embodiments.

FIGS. 21A-21E illustrate an exemplary process for pipelining write transactions for a distributed database according to some embodiments.

FIG. 23 provides exemplary pseudocode for a leader catch-up process in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings.

In this disclosure, systems and methods are provided for generating globally coherent timestamps. This technology may allow distributed systems to causally order transactions without incurring various types of communication delays inherent in explicit synchronization. By globally deploying a number of time masters that are based on various types of time references (e.g., Global Positioning Systems (GPS) and atomic clocks), the masters may serve as primary time references for the distributed systems. Techniques described herein may be used to request, track, calculate and record data relative to each time master. This data can be cross checked against a number of time masters in order to assess which time masters may be malfunctioning and which time masters may provide validated causal timestamps to clients.

Figure 1:
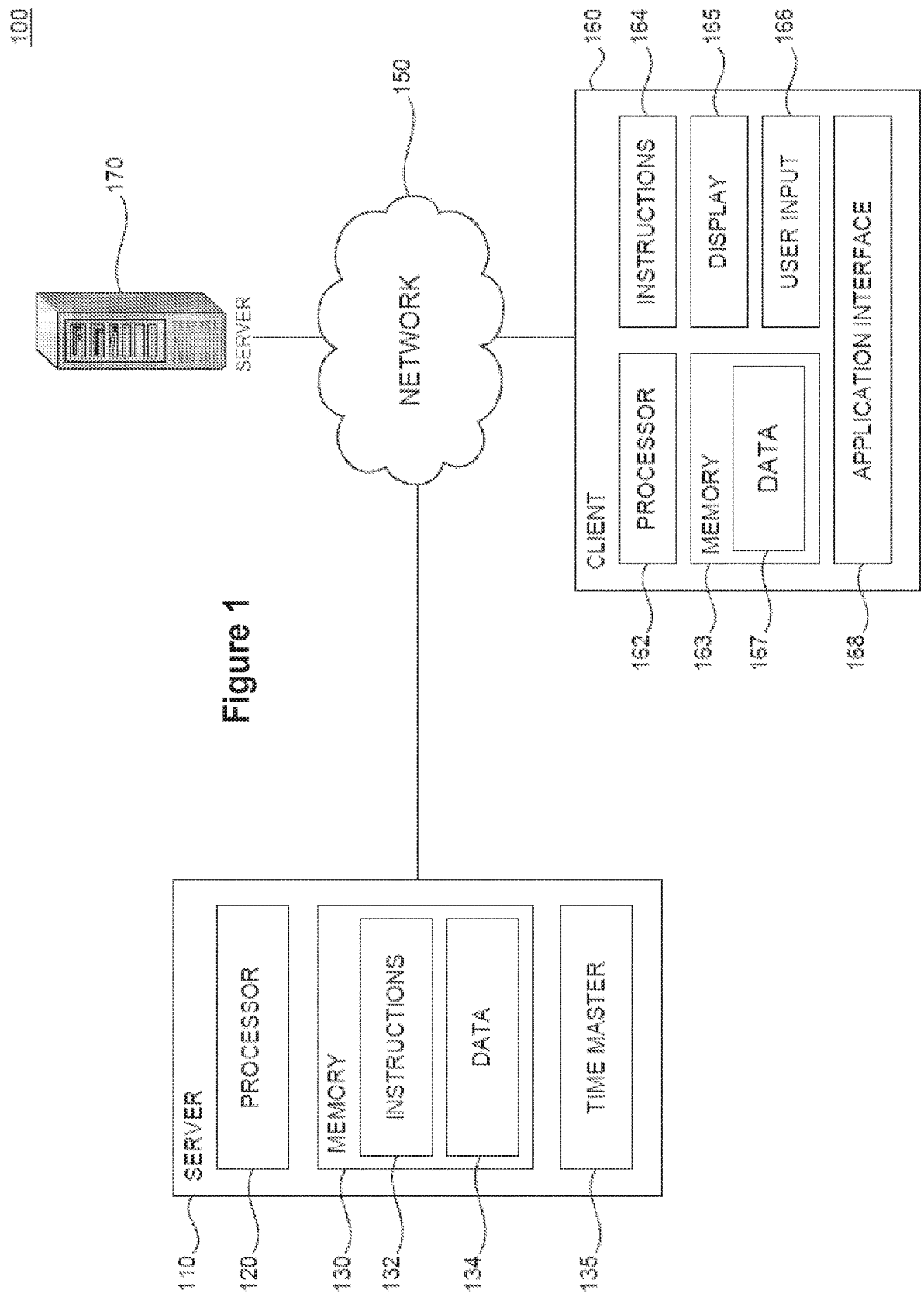
FIG. 1 is a diagram of a system according to aspects of the present technology.

FIG. 1 is a diagram of a system 100 in accordance with an aspect of the present technology. As shown, an exemplary embodiment of system 100 may include a number of servers 110 and 170 coupled to a network 150. The system may also include a client 160 capable of wireless communication with the servers 110 and 170 over the network 150.

A server 110 may contain a processor 120, memory 130, and other components typically present in general purpose computers. The memory 130 may store information accessible by the processor 120, including instructions 132 that may be executed by the processor 120. Memory may also include data 134 that can be retrieved, manipulated or stored by the processor 120. The memory 130 may be a type of non-transitory computer readable medium capable of storing information accessible by the processor 120, such as a hard-drive, memory card, ROM, RAM, DVD, CD-ROM, write-capable, and read-only memories. The processor 120 may be a well-known processor, such as processors from Intel Corporation or Advanced Micro Devices. Alternatively, the processor 120 may be a dedicated controller such as an ASIC.

The instructions 132 may be a set of instructions executed directly (such as machine code) or indirectly (such as scripts) by the processor 120. In this regard, the terms "instructions," "steps" and "programs" may be used interchangeably herein. The instructions 132 may be stored in object code format for direct processing by the processor 120, or other types of computer language including scripts or collections of independent source code modules that are interpreted on demand or compiled in advance. Functions, methods and routines of the instructions are explained in more detail below.

The data 134 may be retrieved, stored or modified by the processor 120 in accordance with the instructions 132. For instance, although the system and method is not limited by a particular data structure, the data 134 may be stored in computer registers, in a relational database as a table having a plurality of different fields and records, or XML documents. The data 134 may also be formatted in a computer-readable format such as, but not limited to, binary values, ASCII or Unicode. Moreover, the data 134 may comprise information sufficient to identify relevant information, such as numbers, descriptive text, proprietary codes, pointers, references to data stored in other memories (including other network locations) or information that is used by a function to calculate relevant data.

Although FIG. 1 functionally illustrates the processor 120 and memory 130 as being within the same block, it will be understood by those of ordinary skill in the art that the processor 120 and memory 130 may actually comprise multiple processors and memories that may or may not be stored within the same physical housing. For example, some of the instructions and data may be stored on a removable CD-ROM and others within a read-only computer chip. Some or all of the instructions and data may be stored in a location physically remote from, yet still accessible by, the processor 120. Similarly, the processor 120 may actually comprise a collection of processors, which may or may not operate in parallel.

As shown in FIG. 1, servers 110 and 170 may also include a time master module 135. The time master module 135 may be operable in conjunction with a receiver for receiving time signals. Time masters 135 may serve as accurate time references in a distributed system for (1) synchronizing machines and devices and (2) validating and monitoring that synchronization. This may include serving a reference time to a core network of machines and their supporting infrastructure. For example, an incoming time query from a client 160 may receive a timestamp determined by the time master 135. The timestamps may be based on various types of systems known in the arts for providing an accurate and reliable time reference (e.g., a GPS system).

According to aspects, servers 110 and 170 may consist of middleware software that may manage and integrate the time master module 135 with internal components of the servers 110 and 170. In one aspect, the middleware may consist of a set of services that allow multiple processes running from the time master module 135 to interact with the processor 120, memory 130, instructions 132 and data 134. In some aspects, it may be neither desirable nor possible to run other types of NTP services on a host server 110 in conjunction with a time master module 135. For example, system conflicts can occur over ports assigned to the NTP service severely impacting a time master's reliability.

Servers 110 and 170 may be at a node of network 150 and capable of directly and indirectly communicating with other nodes of the network 150. For example, the servers 110 and 170 may comprise a web server that may be capable of communicating with client device 160 via network 150 such that it uses the network 150 to transmit information to a client application. Servers 110 and 170 may also comprise a plurality of computers, e.g., a load balanced server farm, that exchange information with different nodes of a network for the purpose of receiving, processing and transmitting data to client devices. In this instance, the client computer will typically still be at different nodes of the network 150 than the computers comprising servers 110 and 170. Although only a few servers 110, 170 are depicted in FIG. 1, it should be appreciated that a typical system can include a large number of connected servers with each being at a different node of the network 150.

Each client 160 may be configured, similarly to servers 110 and 170, with a processor 162, memory 163, instructions 164, and data 167. Each client 160 may be a personal computer, intended for use by a person having all the internal components normally found in a personal computer such as a central processing unit (CPU), an optional display device 165 (for example, a monitor having a screen, a projector, a touch-screen, a small LCD screen, a television, or another device such as an electrical device that can be operable to display information processed by the processor), CD-ROM, hard drive, user input 166 (for example, a mouse, keyboard, touch screen or microphone), speakers, modem and/or network interface device (telephone, cable or otherwise) and all of the components used for connecting these elements to one another. Moreover, computers in accordance with the systems and methods described herein may comprise devices capable of processing instructions and transmitting data to and from humans and other computers including general purpose computers, PDAs, network computers lacking local storage capability, set top boxes for televisions, and other networked devices.

Although the client 160 may comprise a full-sized personal computer, the systems and methods of this disclosure may also be used in connection with mobile devices capable of wirelessly exchanging data over a network such as the Internet. By way of example only, a client 160 may be a wireless-enabled PDA, tablet PC, or a cellular phone capable of sending information via the Internet. The user may input information, for example, using a small keyboard, a keypad, or a touch screen.

As shown in FIG. 1, the client 160 may include an application interface module 168. The application interface module may be used to access a service made available by a server such as servers 110 and 170. The application interface module 168 may be a software module operable in conjunction with several types of operating systems known in the arts. For example, the client 130 may be connected to a SQL (Structured Query Language) database server that may operate in conjunction with the application interface module 168 for saving and retrieving information data. Memory 163 coupled to a client 160 may store data 167 accessed by the application module 168. The data 167 can also be stored on a removable medium such as a disk, tape, SD Card or CD-ROM, which can be connected to client 160.

Servers 110 and 170 and client 160 may be capable of direct and indirect communication such as over network 150. For example, using an Internet socket, a client 160 may connect to a service operating on remote servers 110 and 170 through an Internet protocol suite. Servers 110 and 170 may set up listening sockets that may accept an initiating connection for sending and receiving information.

The network 150, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Although certain advantages are obtained when information is transmitted or received as noted above, other aspects of the system and method are not limited to a particular manner of transmission of information. Yet further, although some functions may be indicated as taking place on a single server having a single processor, various aspects of the system and method may be implemented by a plurality of servers, for example, communicating information over network 150.

Figure 2:
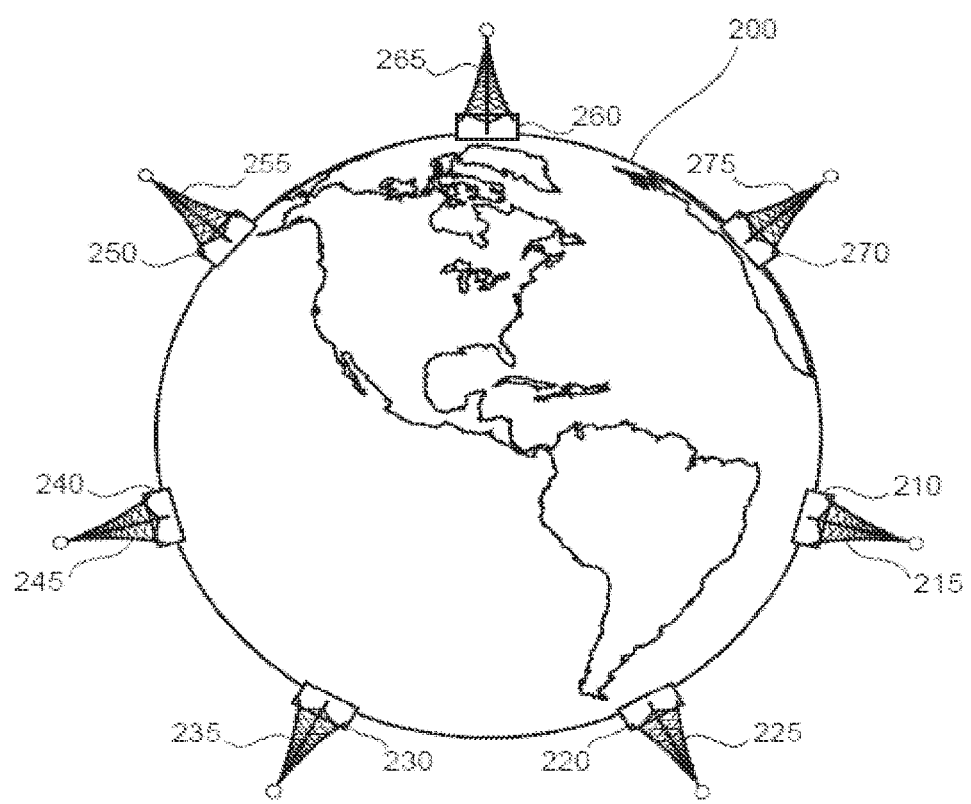
FIG. 2 is a geographical illustration of data centers positioned at various locations on earth according to aspects of the present technology.

FIG. 2 is a geographical illustration of data centers 210, 220, 230, 240, 250, 260 and 270 positioned at various locations on earth. In this example, because of the world wide coverage of a robust global navigation satellite system (GNSS), it may be possible to deploy time masters in data centers 210, 220, 230, 240, 250, 260 and 270 around the world 200. Other existing time distribution systems may not come close to a GNSS system when measured based on reliability, accuracy, coverage and cost. In one aspect, all major data centers in a distributed system may be equipped with redundant time masters, which may provide a stable low-latency time reference to the data center. Redundant time masters may also provide fail-over capability, fault detection, localization and a means for cross checking time masters.

As previously discussed, each host server may be connected to a receiver such as a GPS receiver for receiving time signals. For resilience, it may be preferable to employ several varieties of GPS receivers, e.g., SPECTRACOM Model TSync-PCIe, SYMMETRICOM Model bc637PCI-V2 and MEINBERG. The GPS receivers may require roof-mounted antennas 215, 225, 235, 245, 255, 265 and 275, which may be located on the roof above data centers 210, 220, 230, 240, 250, 260 and 270. Host servers may be housed in server racks located in the data centers 210, 220, 230, 240, 250, 260 and 270. As such, conduits may be installed to route antenna cables from a host server to the roof top antennas. It may be possible to share one antenna across several receivers. This can be achieved, for example, with an antenna splitter. However, antenna sharing may be undesirable because of the low possibility of an antenna failure.

It is conceivable that a GPS receiver may fail. For example, possible scenarios may include latent bugs in GPS receivers, software and satellite software upgrades, and a global catastrophe. In the case of a GPS failure, the ability of a time master to freewheel (e.g., run without a GPS time reference) for several months may allow for enough time to make alternate arrangements. This type of specially configured time master implemented for emergency situations is described in greater detail with respects to FIG. 3.

Figure 3:
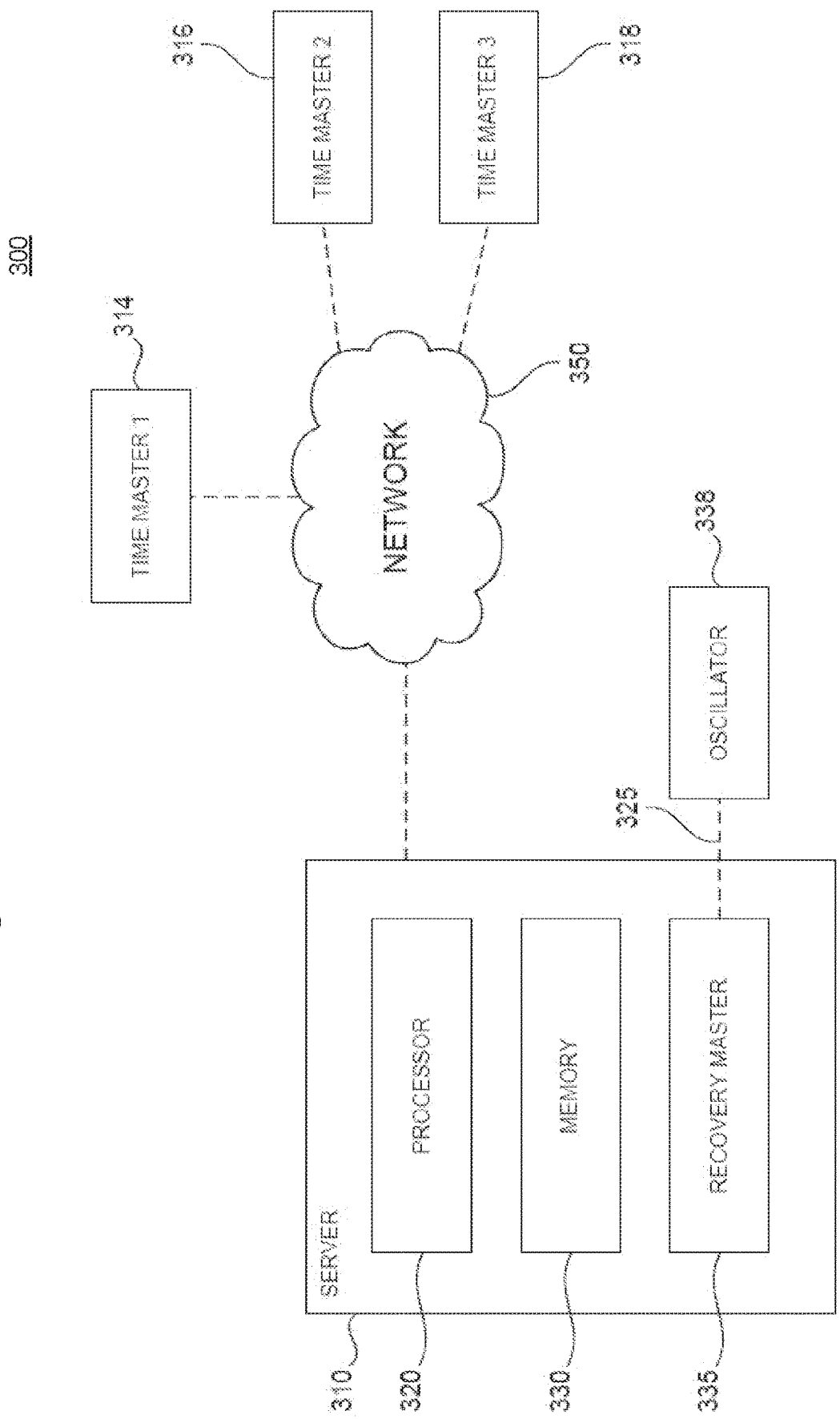
FIG. 3 is another diagram of a system according to aspects of the present technology.

FIG. 3 is another diagram of a system 300 in accordance with some aspects of the present technology. In FIG. 3, a specially configured server 310 may be employed during emergencies to support "Recovery" services. The server 310 may contain a processor 320, memory 330, and other components typically present in general purpose computers. Its components may interact in a similar manner as the components of the servers described with respects to FIG. 1.

As shown in FIG. 3, the server 310 may include a Recovery master module 335, which may replace a time master module. In this configuration, the Recovery master may be frequency-locked 325 to a very stable oscillator 338 instead of, for example, a GPS system. The stability of the oscillator 338 may determine how long and how accurately a Recovery master can serve time. For example, based on empirical data, an oven controlled crystal oscillator (OCXO) may have a short-term frequency stability of ±50 ppb (parts-per-billion, 10-9) with an aging rate of instability at 5 ppb per day, and a rubidium oscillator may have a frequency stability of ±1 ppb with an aging rate of instability at 0.03 ppb per day. It should be noted that time instability errors can accumulate linearly with the short-term stability and quadratically with the aging rate.

According to aspects, a Recovery master 335 can be calibrated against a fleet of time masters 314, 316 and 318 over a network 350. During re-calibration all available ordinary time masters may participate. Each time master 314, 316 and 318 may be synched, for example, to an individual time reference such as a GPS feed. Although only one Recovery master 335 is depicted in FIG. 3, it should be appreciated that a typical system 300 can include a number of Recovery masters, with each being at a different node of the network 350. According to aspects, re-calibrations may be staggered across several Recovery masters to avoid injecting undetected failures (e.g., GPS signal failures) into multiple Recovery masters.

An initial re-calibration interval between a Recovery master 315 and the ordinary time masters 314, 316 and 318 may be short to achieve a relatively rapid approximate synchronization. To achieve an increasingly accurate calibration, the interval may be doubled in each subsequent re-calibration until it reaches a configured constant (e.g., 60 days for Rubidium-based Recovery master and 2 days for OXCO-based Recovery master). Calibration parameters may be stored in a persistent file so that the parameters survive software restarts and server re-boots. For example, a calibrations file can be loaded into memory 330 whenever a server 310 starts. The calibrations file may contain a reference number corresponding to time master 314, 316 and 318 and corresponding calibration parameters. The re-calibrations may be discarded whenever a frequency reference is disturbed (e.g., when a time reference is power cycled).

In addition to the components described above and illustrated in the figures, various operations will now be described. It should be understood that the following operations do not have to be performed in the precise order described below. Rather, various steps may be handled in a different order or simultaneously. Steps may also be added or omitted unless otherwise stated.

According to aspects, to ensure that timestamps computed in a disturbed system are trustworthy, a subroutine, referred to herein as a time synchronization daemon, may be executed. Time synchronization daemons may be employed on one or a number of host machines simultaneously (e.g., client and time master host machines). By querying a fleet of time masters to determine a current timestamp, the time synchronization daemons may periodically compare the host's machines notion of time against the fleet of time masters. Once the fleet time masters have been queried for the current time, the time synchronization daemon may track the round-trip query delay associated with querying each time master. In some aspects, the time synchronization daemon can calculate synchronization offset intervals that may be relative to a time master (e.g., an interval between local time and a time master's notion of current time).

To detect and reject offset intervals derived from possibly malfunctioning time masters (e.g., time masters that have failed but are still producing timestamps), a voting method may be used such as a variant of Marzullo's algorithm. As a result of the voting method, the time synchronization daemon may accept output from validated time masters or reject output from certain time masters, for example, malfunctioning time masters.

Figure 4:
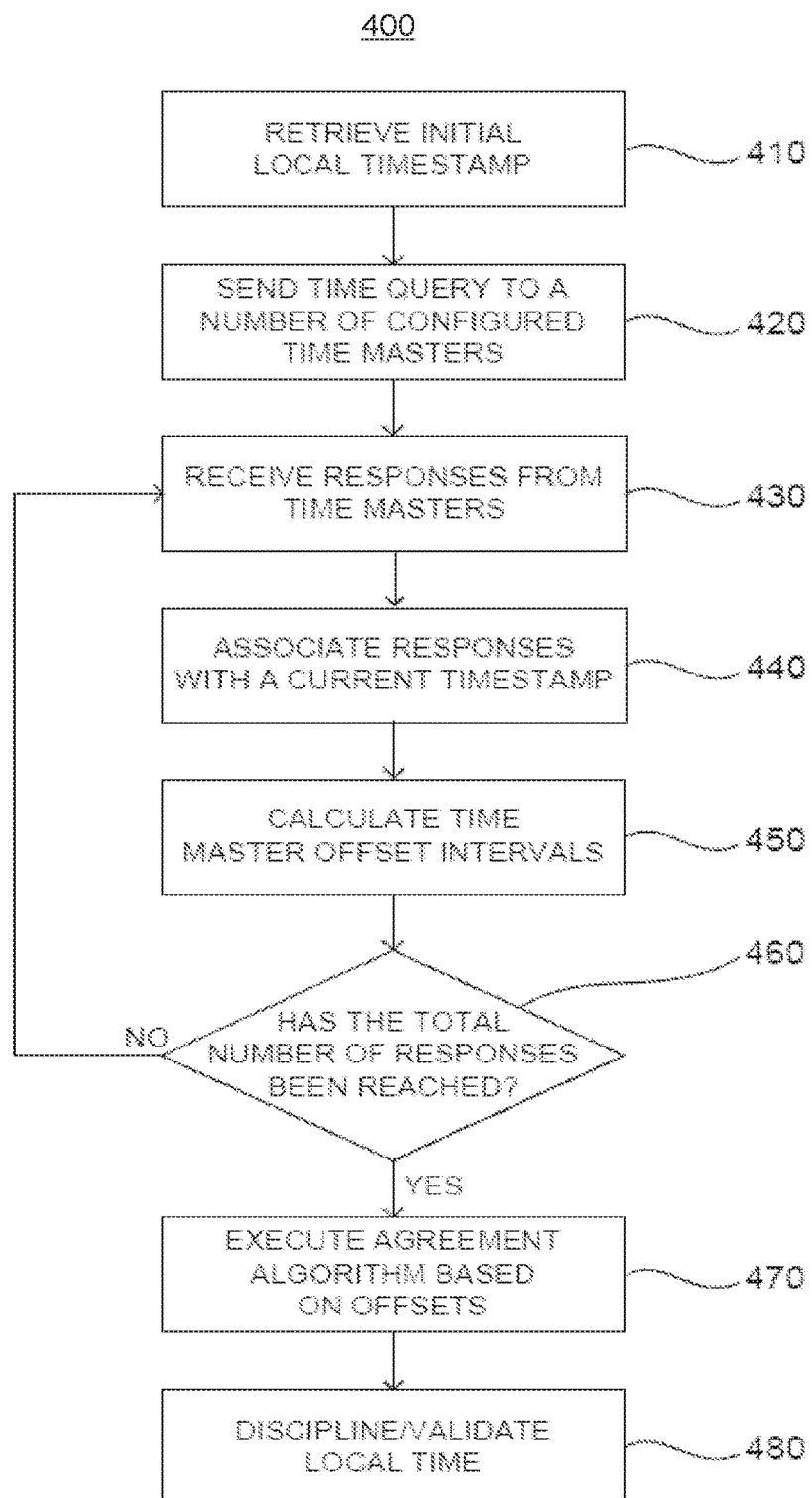
FIG. 4 is a flow diagram illustrating an example of a method for synchronizing a host machine to a set of time references according to aspects of the present technology.

FIG. 4 is a flow diagram illustrating an example of a method 400 for synchronizing a host machine (e.g., GPS-fed time master, Recovery masters and client host machine) to a set of time references. As previously discussed, time synchronization may involve time querying a configured subset of time masters and executing a voting algorithm on the query results to determine which time masters are producing accurate current timestamps.

In block 410, an initial local timestamp may be retrieved. For example, method 400 may access a registry for storing a host machine's notion of a current date and time. This may reflect time from an internal time clock on the host machine. The timestamps can be encoded in various time formats used to describe instants of time such as Coordinated Universal Time (UTC), Unix epoch and the unambiguous International Atomic Time epoch (TAI).

In block 420, time queries may be sent to a pre-determined number of time masters (e.g., 5 to 10 time masters). For example, an application interface may be utilized to make a connection to a time master for sending and receiving information. In one aspect, the time masters may operate at Stratum 1 or Stratum 2. It is also possible for time masters to operate at any arbitrary number such as from [1 . . . K]. The basic definition of a Stratum-1 time master is that it may be directly linked (e.g., not over a network connection) to a reliable source of time such as a GPS receiver. A Stratum-2 time master may be connected to one or more Stratum-1 time masters over, for example, a network connection. In this example, a Stratum-2 time master may get its time via a network request to one or more Stratum-1 time master. In this regard, if a Stratum master is fed by a master operating at stratum K or less, it may be described as a Stratum-(K+1).

In block 430, responses may be received from the time masters queried in block 420. For example, as a result of the time request a time master may generate a timestamp. According to aspects, time masters may publish timestamps over a network connection in a distributed system. In one aspect, the application interface used to request a timestamp in block 420 may also be used to retrieve timestamp responses. Various other techniques for transmitting data over a network socket can be used to publish and receive timestamp responses, e.g., Transmission Control Protocol/Internet Protocol (TCP/IP), World Wide Web's Hypertext Transfer Protocol (HTTP), File Transfer Protocol (FTP), Telnet (Telnet) protocols and other types of communication protocols.

In block 440, a received time query response may be associated with a current local timestamp. For example, the current local timestamp may denote respective events of reception of the time query response according to a local time scale. In some aspects, associating the current local time with the time query response may be accomplished by storing both in memory, a data structure or by inserting both in a suitable computer readable medium capable of storing information accessible by a processor.

In block 450, a time offset interval may be calculated for each time masters that was queried in block 420. The offset interval's width (e.g., a length of time duration) may represent transmission delays associated with a time request to and from a particular time master. The timestamps from each non-malfunctioning time master may correspond to an instant of time somewhere between the initial local timestamp taken in block 410 and the local timestamp associated with a time master's response in block 440.

A level of uncertainty (e.g., transmission delays) may also affect the time offset interval calculation. In this regard, to calculate the offset interval for each time master, the following equations may be used:

$$D(m)=T(m)-((L(m)+L(0)/2)$$

$$U(m)=(L(m)-L(0))/2$$

In the above equations, D(m) represents the time offset relative to time master m, T(m) represents the timestamp provided by master m, U(m) represents an uncertainty related to a time master m, L(m) represents the local time captured at the time when a time query response was received from time master m and L(0) represents a local timestamp taken prior to dispatching the time queries to the time masters. Thus, with respects to a time master m, local time may be in error by an offset D(m) plus or minus the uncertainty calculation U(m) or in other words an interval range of [D(m)−U(m) to D(m)+U(m)].

In block 460, it may be continually tested whether the total number of time query responses has been reached. If the number has been reached, then method 400 may proceed to block 460. Otherwise, method 400 may repeat block 430 and receive another time query response.

In block 470, an agreement algorithm may be employed to analyze an aggregate of the time master offset intervals calculated in block 450. Because time masters may occasionally fail, an agreement algorithm (e.g., Marzullo's algorithm) may determine a smallest time offset interval consistent among a selected group of time masters. In some aspects, the agreement algorithm may be employed more than once.

In an initial run of the agreement algorithm, a group of local time offsets calculated in block 450 may be selected. The selection may be based on a corresponding time master's configuration such as whether a time master is operating at Stratum 1. Each calculated offset may represent the local clock error relative to a particular time master. A determination may be made by method 400 for a maximal set of intersecting local time offsets from the group. In one example, if no two offset intervals intersect method 400 may stop. Method 400 may also stop if more offsets in the group disagree than agree. If at least two offset intervals intersect than an agreement validated offset interval (e.g., a smallest interval containing all points lying in the intersection of at least k−1 of the k intervals in the group) may be assigned for the group.

In one aspect, a level of uncertainty may be reflected in a group of offsets in an interval (e.g., the width of the group from smallest to largest offset). This level of uncertainty may be relatively small because typically several time masters may be nearby. Thus, the agreement validated offset determined in block 470 should be relatively accurate plus or minus a level of group uncertainty.

According to some aspects, the agreement algorithm may be employed a second time. In this iteration of the agreement algorithm, local time offsets calculated in block 450 may be selected from a group of time masters configured differently than the first group. For example, this selection may be based on time masters not operating at Stratum 1. The offset intervals corresponding to the non-Stratum 1 time masters may be clipped against the Stratum 1 offset interval. The second round may be used to steer local clocks when there is no nearby Stratum 1 time master, thus improving consistency among nearby hosts.

The second iteration of the agreement algorithm may be then applied to the clipped non-Stratum 1 offsets. This second iteration may yield a final validated offset interval which may be accurate plus or minus a level of uncertainty related to the second group of time masters. Typically, this final validated offset interval should be within the uncertainty range resulting from the first run of the agreement algorithm. In one example, the second iteration results may be discarded if the results are outside of the uncertainty range of the first iteration.

In block 480, local time on a host machine may be disciplined or validated depending on the machine's configuration. For example, if the machine employing method 400 is a GPS-fed time master, the offset interval from block 470 may be used to validate time published by the GED-fed master. If the machine is a client host or a Recovery master, the offset interval from block 470 may be used to adjust the host machine's local clock. For example, if the offset interval is [−2, −1] the local clock can be somewhere between 1 and 2 seconds ahead of the masters. If the interval is [1, 2] the local clock can be 1 to 2 seconds behind the masters. If the interval is [1, −1] the local clock can be somewhere between 1 second behind to 1 second ahead of the master.

In this regard, a host server's local system clock may be disciplined to help keep precise time. For example, small adjustments (e.g. the validated offset from block 470) may be applied to the system clock periodically. These adjustments may be applied using various utilities for accessing a system's local clock such as the utility application adjtimex. In one aspect, adjtimex may be used in PLL mode (phase-locked loop). In this example, PLL constants and offset clamps values may be chosen to bind the local clock rate error to approximately 1000 ppm. Some applications, for example, distributed lease protocols, may depend on time progressing at a similar rate on each host. For such applications to work properly clock rates need to be controlled.

Figure 5:
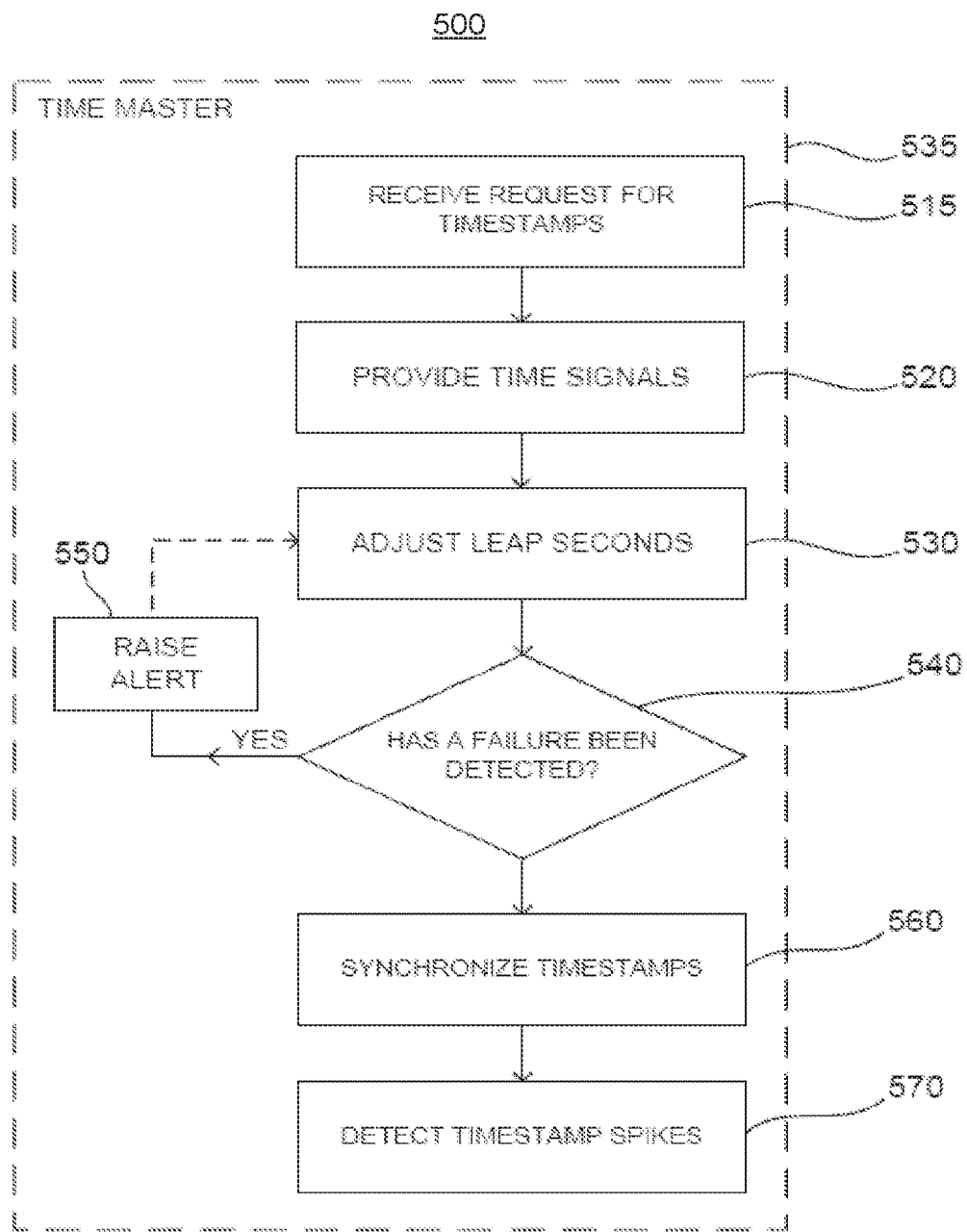
FIG. 5 is a flow diagram illustrating an example of a method for providing validated timestamps according to aspects of the present technology.

FIG. 5 is a flow diagram illustrating an example of a method for providing validated timestamps. According to aspects, cross checked and synchronized time masters 535 may be used to transmit timestamps to clients in a distributed system. In some examples, the timestamps may be used to order transactions and/or synchronize local clocks.

In block 515, a request for a timestamp may be received. For example, a client may open a socket connection to time master's host server to initiate a connection for sending and receiving information. Through this connection, the time master may act as a NTP server that transmits timestamps to the client.

In block 520, time signals may be provided from a reliable time reference. For example, GPS timestamps may be provided by a GPS disciplined oscillator (e.g., a SPECTRACOM PCI-Express Model TSync-PCIe) connected to a host server. In some aspects, timestamps may be served directly from the system's oscillator. According to aspects, this may help avoid several sources of time corruption such as time-keeping bugs related to operating systems, and Time Stamp Control (TSC) deficiencies that plague many microprocessors.

In block 530, GPS timestamps may be adjusted based on a leap second. A leap second may be a positive or negative one-second adjustment to a time scale that may keep it close to mean solar time. In some aspects, leap seconds may be amortized over a period of ten hours on either side of the leap second, thus rendering the leap second invisible to a client requesting a timestamp. Several techniques may be used to amortize leap seconds, for example, they may be linearly amortized over a window of time (e.g., 10 hours on either side). A standard leap file disseminated by the National Institute of Standards and Technology (NIST) may govern leap second insertions.

In block 540, possible system failure conditions may be continually monitored. For example, a failure can be a discovered disagreement between the NIST leap file and leap seconds advertised by a connected GPS system. Other possible failures may include when the NIST file is about to expire, poor satellite signal reception, a shorted antenna cable, parity errors, etc. If a failure condition is detected, method 500 may raise an alert at block 550. Otherwise it may proceed to block 560.

In block 550, a failure alert may be raised. Once a failure condition has been detected a time master 535 may block or discard incoming time queries until the alert has been resolved. Typically, many failures may require some type of repair to be preformed. For example, some alerts may be resolved by making a request to a service for an updated NIST file for adjusting leap seconds. In this example, method 500 may optionally repeat block 530 to adjust leap seconds based on the newly provisioned NIST file. Other failures may be resolved by repairing a GPS receiver or other hardware.

In block 560, timestamps may be synchronized with an external reference. For example, timestamps from a secondary device such as a High Precision Event Timer (HPET) attached to a time master host may be used as a sanity check. According to aspects, on a server running an Intel processor, the HPET may be a fairly reliable timing device. HPET accesses can impact processing time by several microseconds. This, however, may be an acceptable impact in performance.

In block 570, timestamp spikes may be detected. If a timestamp lies outside of a determined range, it may be considered a spike. The spikes may be logged, but not transmitted to clients. In one example, spikes may be detected by planting guideposts to demark an acceptable range for the timestamps. In this example, a guidepost can be correlated GPS and HPET timestamps planted periodically. Each GPS timestamp may be checked against the bounds since the last guidepost was planted. This check may provide a measure of protection against, for example, GPS system faults and satellite signal spoofing attacks. The spike-detection process employed in block 560 is further described with respects to FIG. 6.

Figure 6:
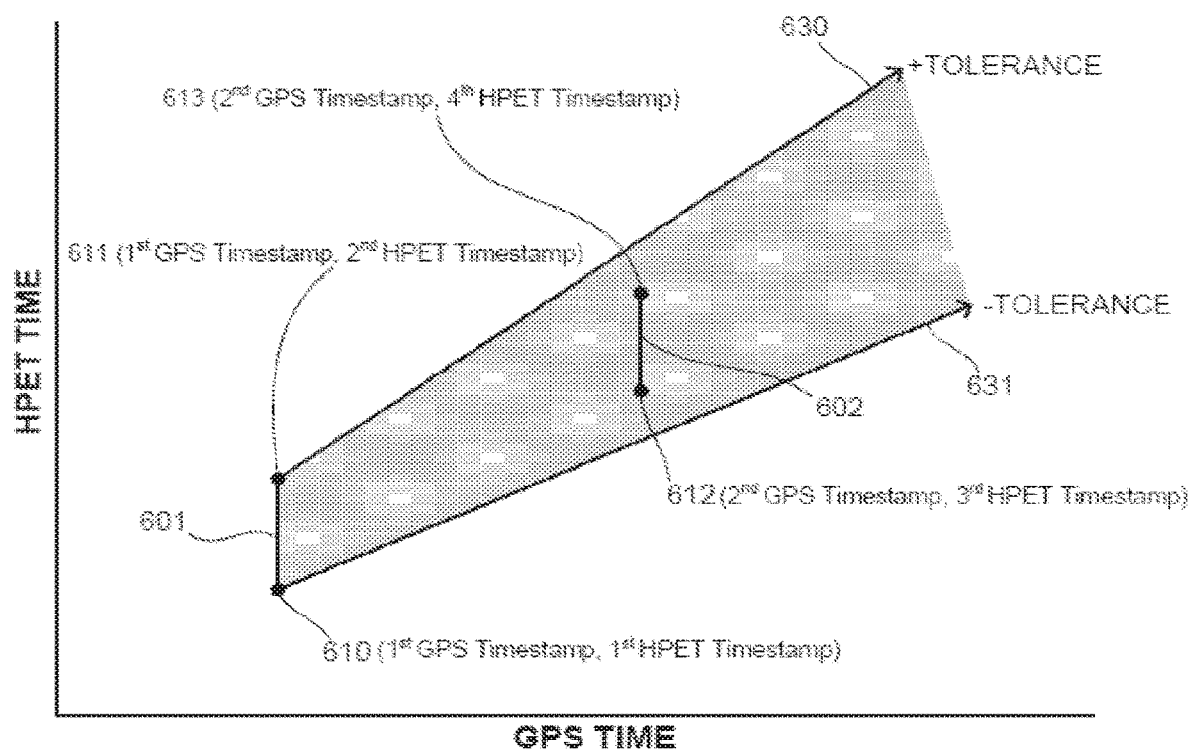
FIG. 6 is a graph of correlated time stamps according to aspects of the present technology.

FIG. 6 is a graph of correlated time stamps. In some aspects, correlated GPS and HPET time stamps may be represented as a graph. As shown in Figure, guideposts 601 and 602 are associated with a series of GPS and HPET time stamps 610, 611, 612 and 613 plotted on the graph (e.g., (x, y) coordinates). For example, plot points 610 and 611 are determined by a pair of GPS and HPET time stamp readings. According to aspects, guidepost 601 may be associated with three timestamps taken in the following order: a 1st HPET timestamp, a 1st GPS timestamp and a 2nd HPET timestamp. In one aspect, dumbbell 601 may be used as a guidepost to validate subsequent GPS timestamp readings as further described below.

As illustrated, emanating from the initial guidepost 601 are rays 630 and 631 positioned at angles. A shaded region (e.g., the cone of uncertainty) between the rays reflects an uncertainty about the precision of the HPET frequency plus or minus a predetermined tolerance level. According to aspects, if a subsequent reading of a GPS timestamp intersects the shaded region, it may be accepted as a valid timestamp. If it does not intersect the shaded region, it may then be declared a spike because it violates the HPET frequency error bounds 630 and 631.

The guidepost 601 may be advanced at a rate determined by roughly balancing the uncertainty induced by HPET frequency errors, the GPS system and HPET read latencies. In one example, guideposts are advanced approximately every 100 milliseconds. A new guidepost, such as guidepost 602, may be planted when the previous guidepost 601 expires and a new valid GPS timestamp is obtained for verification. The newly obtained GPS timestamp may also become an anchor in the new guidepost. For example, plot points 612 and 613 of guidepost 602 are determined by a subsequent pair of GPS and HPET time stamp readings. In one aspect, the guidepost 602 may be associated with three timestamps taken in the following order: a 3rd HPET timestamp, a 2nd GPS timestamp and a 4th HPET timestamp.

According to aspects, spikes with high-frequency synchronization errors that exceed approximately 20 microseconds may be detected. As well as, low frequency wander spikes exceeding the worst-case HPET variation. In some aspects, it may be desirable to use a number of spike detectors, each advancing at a different rate. In this regard, a spike detector advancing at a rapid rate may be better at detecting high-speed spikes, while a detector advancing at a slower rate may be better at detecting gradual frequency shifts in a time master.

Figure 7:
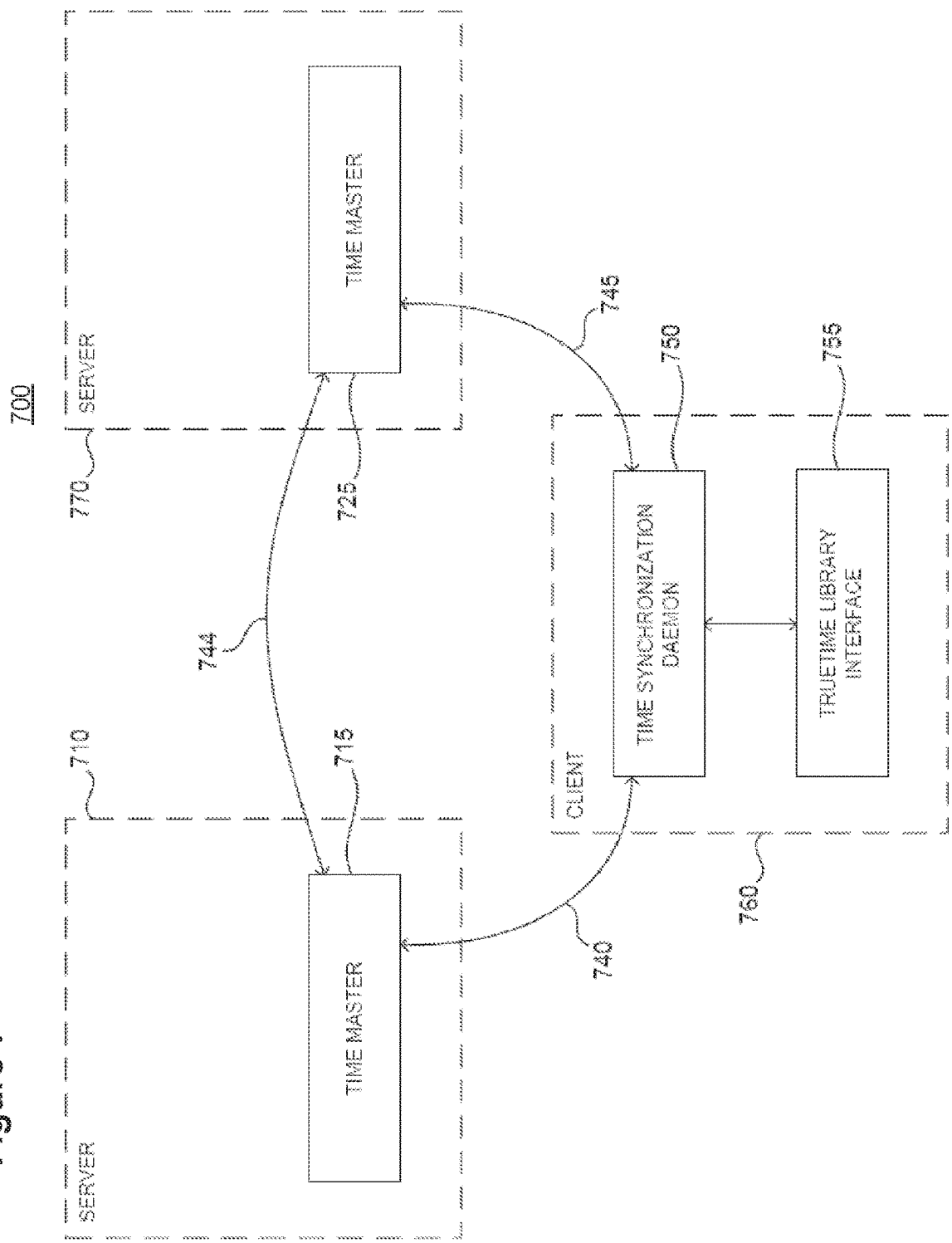
FIG. 7 is another diagram of a system according to aspects of the present technology.

FIG. 7 is yet another diagram of a system 700 in accordance with an aspect of the present technology. As shown, system 700 may consist of at least three major modules: a time master (e.g., time masters 715 and 725) that may serve as a reliable time reference, a time synchronization daemon 750 that may synchronize local time by periodically querying multiple time masters and a TrueTime library interface 755 for providing a current time interval interface to applications. The three modules may be capable of direct and indirect communication over, e.g., a network connection 740 and 745. Each module may consist of middleware software that may manage and integrate the modules with a host machines 710, 760 and 770 such as the servers and client described with respects to FIG. 1.

According to aspects, time masters 715 and 725 may serve as primary time references in a distributed system. As previously discussed, the time masters' internal clocks may be synchronized with, e.g., a GPS signal, atomic clock or other types of accurate timekeeping technologies known in the arts. The time masters may be designed for high reliability and may be deployed at multiple sites throughout a distributed system. Although only two time masters are depicted in FIG. 7, it should be appreciated that a typical system 700 can include a large number of time masters communicating with each other over, e.g., a network connection 744.

The time synchronization daemon 750 may periodically query multiple time masters 715 and 725 for a current timestamp. The daemons may calculate synchronization offset intervals relative to each time master 715 and 725 by tracking round-trip delays related to a time query. Sets of time master offsets may be validated against each other using, e.g., clock synchronizing techniques as described with respects to FIG. 4. As previously discussed the clock synchronizing techniques may employ an agreement algorithm to detect and reject offsets from malfunctioning time masters. An intersection of surviving offset intervals may be used to determine a client's local time synchronization error, which may have occurred at the time a query was made to a time master 715 and 725. Accordingly, the client's local clock rate may be updated based on the surviving offset intervals.

A TrueTime library interface 755 may be employed to transmit validated timestamps requested by client applications. For example, a client may use an application programming interface (API) that may be operable in conjunction with the TrueTime library in order to communicate with modules of system 700. The TrueTime library may also calculate a local time offset interval (e.g., a difference between local time and a time reference) based on such factors as a local clock, known rate errors related to the local clock, and an offset interval determined by the time synchronization daemon 750 at the last time the time masters 715 and 725 were polled.

In some instances, it may be difficult to determine an order of events in a distributed system because system clocks are not always synchronized. However, event ordering can be determined using timestamps generated with the TrueTime library rather than using a machine-local approximation of current time. In one aspect, timestamps determined by employing the TrueTime library can be used as a basis for making causally dependant information available to host clients in a distributed system. For example, this information can be used by an application associated with a host client to causally order event transactions.

Figure 8:
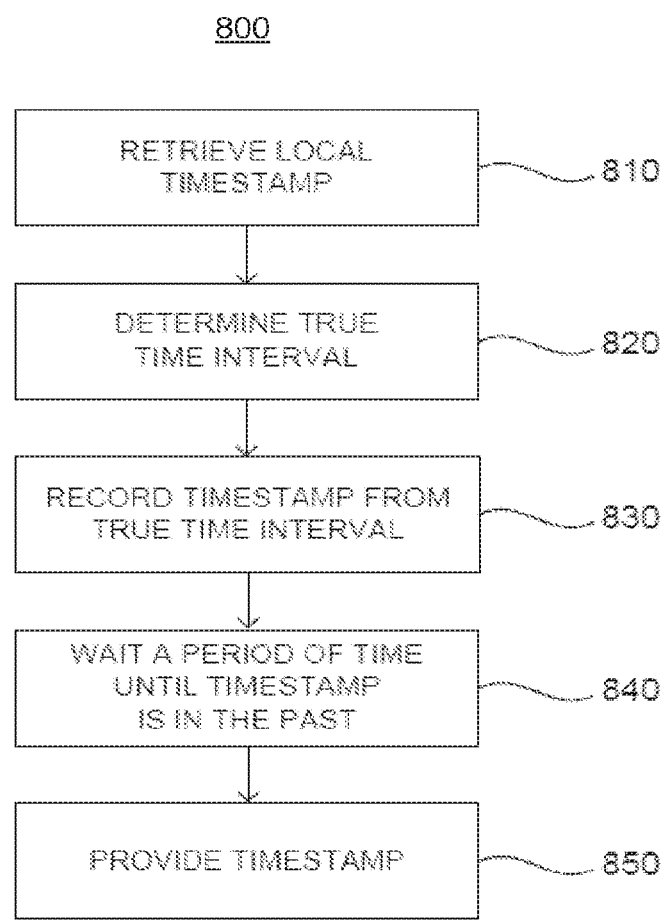
FIG. 8 is a flow diagram illustrating an example of a method for generating causal timestamps according to aspects of the present technology.

FIG. 8 is a flow diagram illustrating an example of a method 800 for generating causal timestamps. For example, a host client may employ an application interface (e.g., TrueTime library interface), which may provide globally consistent timestamps with explicit uncertainty bounds (e.g., network transmission delays) associated with transmitting the timestamps. The timestamps may be then used, for example, to order events in a distributed system.

In block 810, an initial local timestamp may be retrieved. For example, a host client's notion of a current date and time may be accessed and stored. This may reflect time from an internal time clock, memory registry or other means of tracking time on the host machine.

In block 820, a time interval may be determined (e.g., a difference between the local timestamp and a time reference). For example, a software module operable in conjunction with a TrueTime library interface may request a time interval provided by the TrueTime library. As previously discussed the TrueTime library may provide a time interval interface to host clients requiring meaningful globally-coherent timestamps. The TrueTime library may determine the time interval from a time synchronization daemon employed locally on a host client. As described with respect to FIG. 7, host clients may employ a time synchronization daemon, which may track a correlation between local clocks and causal time by computing uncertainty bounds on that correlation. The time synchronization daemon may derive a causal time by querying a number of time masters deployed throughout a distributed system. In some aspects, the time synchronization daemon may determine a time interval consistent among a selected group of time masters by employing an agreement algorithm on the selected group.

In block 830, a timestamp from the time interval may be recorded. For example, the latest timestamp in the time interval determined in block 820 may be selected. According to aspects, this timestamp may be larger than the timestamp of other causal predecessors. In one aspect, the timestamp may be recorded and maintained in a predetermined format. For example, the timestamp can be encoded in a time format used to describe instants of time such as UTC. Consistent time formatting may, for example, allow for comparison of the timestamp with local timestamps from one or more different systems.

In block 840, a period of time may pass after a timestamp is recorded from the time interval. The time period for waiting may be chosen so that after the waiting period the time of recorded timestamp has passed. According to aspects, waiting may preserve the causal order of events by ensuring that causal successors (e.g., logically ordered transactions) will be assigned respectively larger timestamps. For example, if the current time is between 3:50 PM and 4:00 PM, and a 10 minute waiting period is chosen, then after the waiting period it will be later than 4:00 PM and, thus any future-chosen timestamps will be later than 4:00 PM. It will be appreciated that in some aspects other types of client computations can occur in block 840 while the time period is passing.

In block 850, the recorded timestamp may be provided. For example, a programming interface may be used by a host client to access the recorded timestamp from block 830. The timestamp may also be returned as a result of a call to a computer program, library class function or other types of programming techniques known in the arts. The host client may then associate the timestamp, e.g., with host client events thereby ensuring a causal order of event transactions for services accessed at the client.

The above-described aspects of the technology may be advantageous for generating globally synchronized timestamps without incurring various types of network uncertainty inherent in explicit synchronization. The globally synchronized timestamps can be used by various services, e.g., to validate local timestamps and clocks, or to provide causality-respecting timestamps for database updates. By introducing techniques to track, calculate and record time data relative to a number of reliable time references, an easy-to-manage and low-cost time base may be provided for host machines in a distributed system. Moreover, the various techniques and parameters disclosed within may be further reconfigured to increase overall timestamp accuracy.

As noted above, in large scale computer systems a single server computer is typically unable to handle all of the incoming requests, so arrays of server computer are networked together to form a single "virtual server." The array may include many server computers as needed to accommodate the volume of requests. Because the array appears as a single server, it is convenient to refer to such an array as a "server." This disclosure and the corresponding claims thus use the term "server" broadly to mean one or more server computers, operating jointly or in parallel, to perform related tasks.

Figure 9:
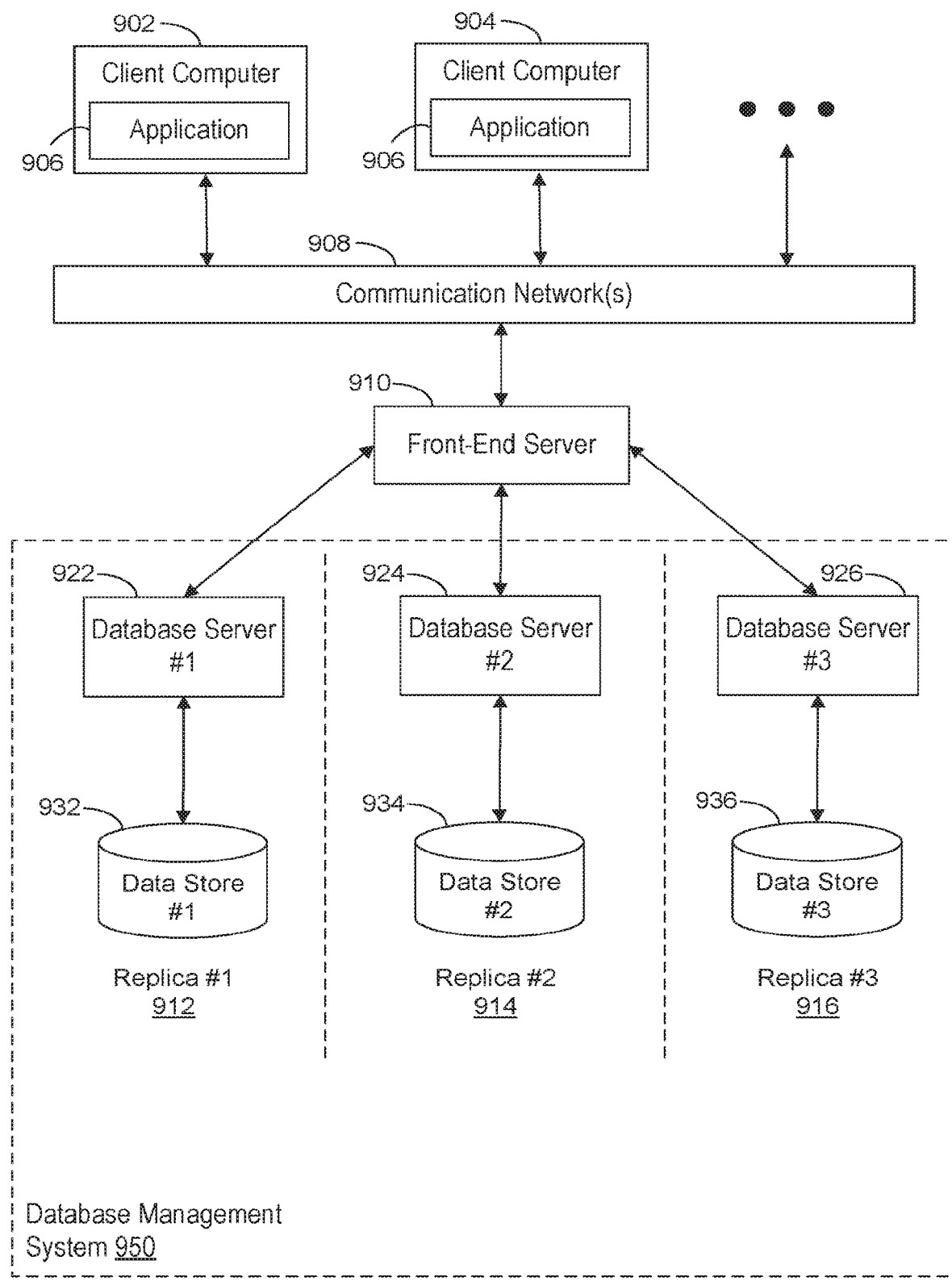
FIG. 9 is a conceptual block diagram of a database management system in accordance with some embodiments.

FIG. 9 is a conceptual block diagram of a database management system 950 in accordance with some embodiments. In this embodiment, three distinct replicas 912, 914, and 916 of the database are maintained at three distinct geographic locations. In some embodiments, the Paxos consensus algorithm is used is guarantee consistency of the data across the multiple replicas. Consensus decisions require only a plurality vote (not a unanimous vote). Replica 912 has a data store 932, which physically stores the data. In some embodiments, the data store 932 is a file system maintained by a plurality of file servers. In some embodiments, the data store 932 comprises one or more Bigtables or Bigtable cells. At replica 912, one or more database servers 922 read and write data to the data store 932. Although FIG. 9 illustrates only a single database server 922 accessing the data store 932, most embodiments include a plurality of database servers 922, such as 100 or 1000 servers 922.

Replica 914 includes database server(s) 924 and data store 934, similar to replica 912, and replica 916 includes database server(s) 926 that access data store 936, again like replica 912. In some embodiments, one or more of the replicas 912, 914, or 916 is designated as read-only. A read-only replica is kept synchronized with the other replicas, but cannot be designated to respond to client requests to write data (only client read requests).

As illustrated in FIG. 9, client computers 902 and 904 can access the data from the database management system 950 by sending the requests over a communications network 908, such as the Internet. The requests are sent from a software application 906 executing on a client computer 902 or 904, which may be a web application 906 that runs in a web browser 1020. The client requests to read or write data are received by a front end server 910, which directs the requests to an appropriate replica of the database. In some embodiments, the front end server includes a load balancing module 1174 to spread out the incoming requests among the replicas. Although FIG. 9 illustrates only a single front-end server 910, many embodiments include a plurality of front-end servers 910, such as 10, 20, or 50 servers.

Figure 10:
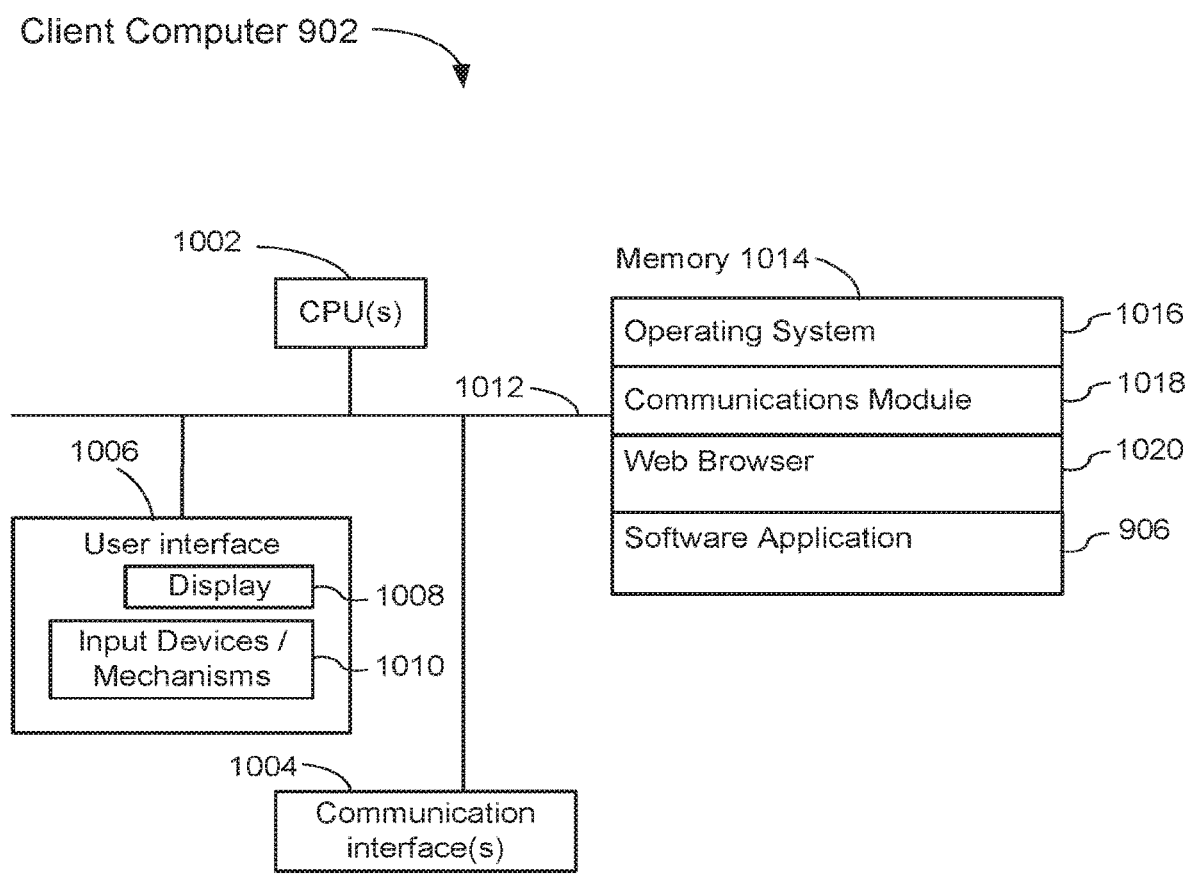
FIG. 10 is a functional block diagram of a client computer in accordance with some embodiments.

FIG. 10 illustrates a typical client computer 902. A client computer 902 generally includes one or more processing units (CPUs) 1002, one or more network or other communications interfaces 1004, memory 1014, and one or more communication buses 1012 for interconnecting these components. The communication buses 1012 may include circuitry (sometimes called a chipset) that interconnects and controls communications between system components. A client computer 902 includes a user interface 1006, for instance a display 1008 and one or more input devices 1010, such as a keyboard and a mouse. Memory 1014 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1014 may include mass storage that is remotely located from the central processing unit(s) 1002. Memory 1014, or alternately the non-volatile memory device(s) within memory 1014, comprises a computer readable storage medium. In some embodiments, memory 1014 or the computer readable storage medium of memory 1014 stores the following programs, modules and data structures, or a subset thereof:

- an operating system 1016 (e.g., WINDOWS, MAC OS X, ANDROID, or iOS) that generally includes procedures for handling various basic system services and for performing hardware dependent tasks;
- a network communications module 1018 that is used for connecting the client computer 902 to servers or other computing devices via one or more communication networks 908, such as the Internet, other wide area networks, local area networks, metropolitan area networks, and the like;
- a web browser 1020, which allows a user of the client computer 902 to access web sites and other resources over the communication network 908; and
- a software application 906, which may be a web application. The software application 906 accesses web resources, including data from the database management system 950.

Figure 11A:
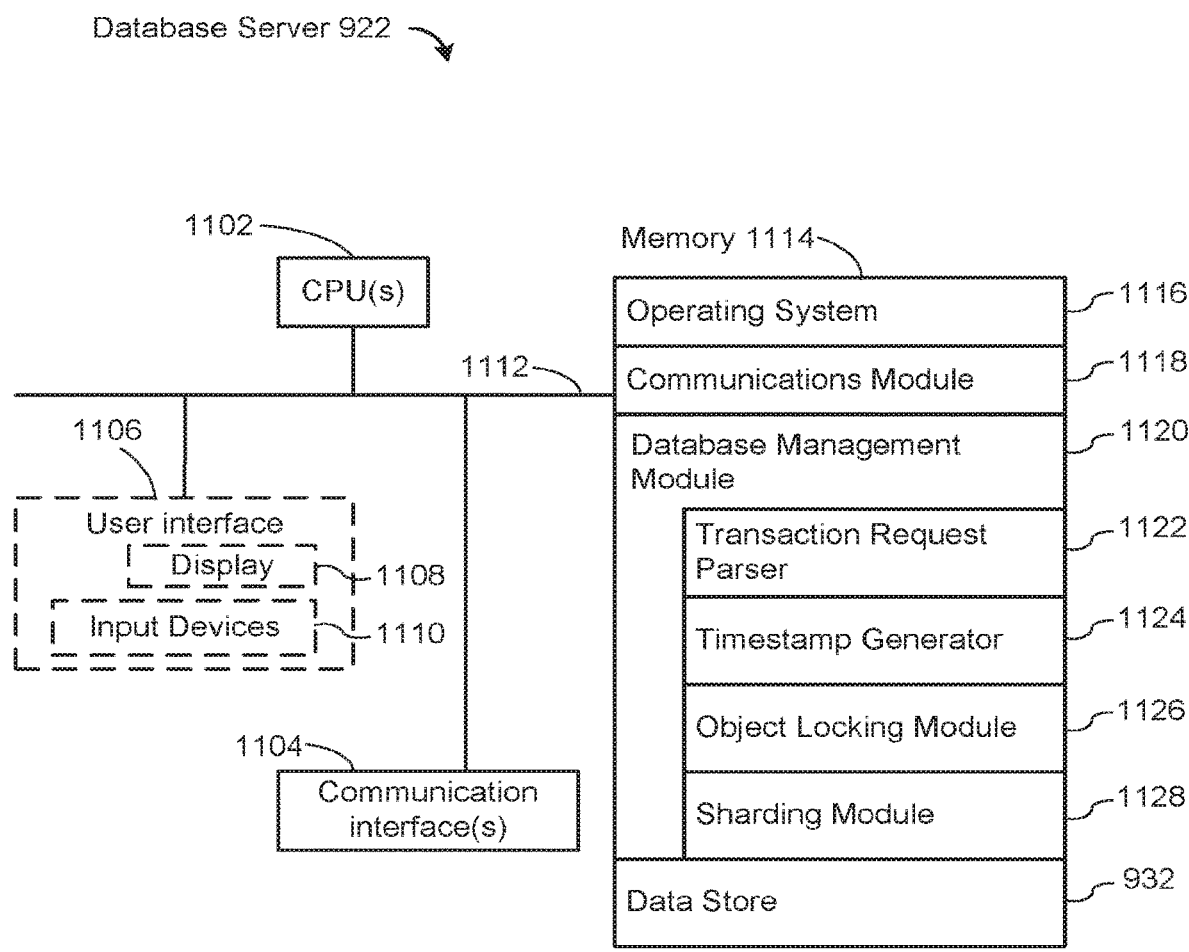
FIG. 11A is a functional block diagram of a database server in accordance with some embodiments.

Referring to FIG. 11A, a database server 922 generally includes one or more processing units (CPUs) 1102, one or more network or other communications interfaces 1104, memory 1114, and one or more communication buses 1112 for interconnecting these components. The communication buses 1112 may include circuitry (sometimes called a chipset) that interconnects and controls communications between system components. A database server 922 may optionally include a user interface 1106, for instance a display 1108 and a keyboard 1110. Memory 1114 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1114 may include mass storage that is remotely located from the central processing unit(s) 1102. Memory 1114, or alternately the non-volatile memory device(s) within memory 1114, comprises a computer readable storage medium. In some embodiments, memory 1114 or the computer readable storage medium of memory 1114 stores the following programs, modules and data structures, or a subset thereof:

- an operating system 1116 (e.g., LINUX or UNIX) that generally includes procedures for handling various basic system services and for performing hardware dependent tasks;
- a network communications module 1118 that is used for connecting the database server 922 to other servers or other computing devices via one or more communication networks 908, such as the Internet, other wide area networks, local area networks, metropolitan area networks, and the like;
- a database management module 1120, which includes various procedures and modules for handling requests to read or write data in the data store 932;
- a transaction request parser 1122 included in the database management module 1120, which parses incoming transaction requests to determine the type of transaction (e.g., read or write), the rows and columns accessed, etc.;
- a timestamp generator 1124 included in the database management module 1120, which generates timestamps for read and write requests. This is described in more detail below with respect to FIGS. 14A, 14B, and 15;
- an object locking module 1126 included in the database management module 1120, which locks objects as necessary to guarantee data integrity, and blocks processes that require a lock on an object that is already locked by another process;
- a sharding module 1128 included in the database management module 1120, which splits a row into multiple shards when the size of the row exceeds a threshold size, and tracks the locations of the multiple shards so that the sharding is transparent to client requests. Sharding is described in greater detail with respect to FIGS. 12E-12G below; and
- a data store 932, which physically stores the data. In some embodiments, the data store 932 is part of the database server 922 (e.g., the physical hard disks of the database server). In many embodiments, the data store 932 is separate from the database server(s) 922 as illustrated in FIG. 9, and includes permanent storage distributed across a large number of physical disks or other permanent storage media.

In many embodiments, there are multiple database servers 922, such as 100 or 1000, each accessing data from the data store 932. The database servers 924 and 926 illustrated in FIG. 9 are similar to database server 922.

Figure 11B:
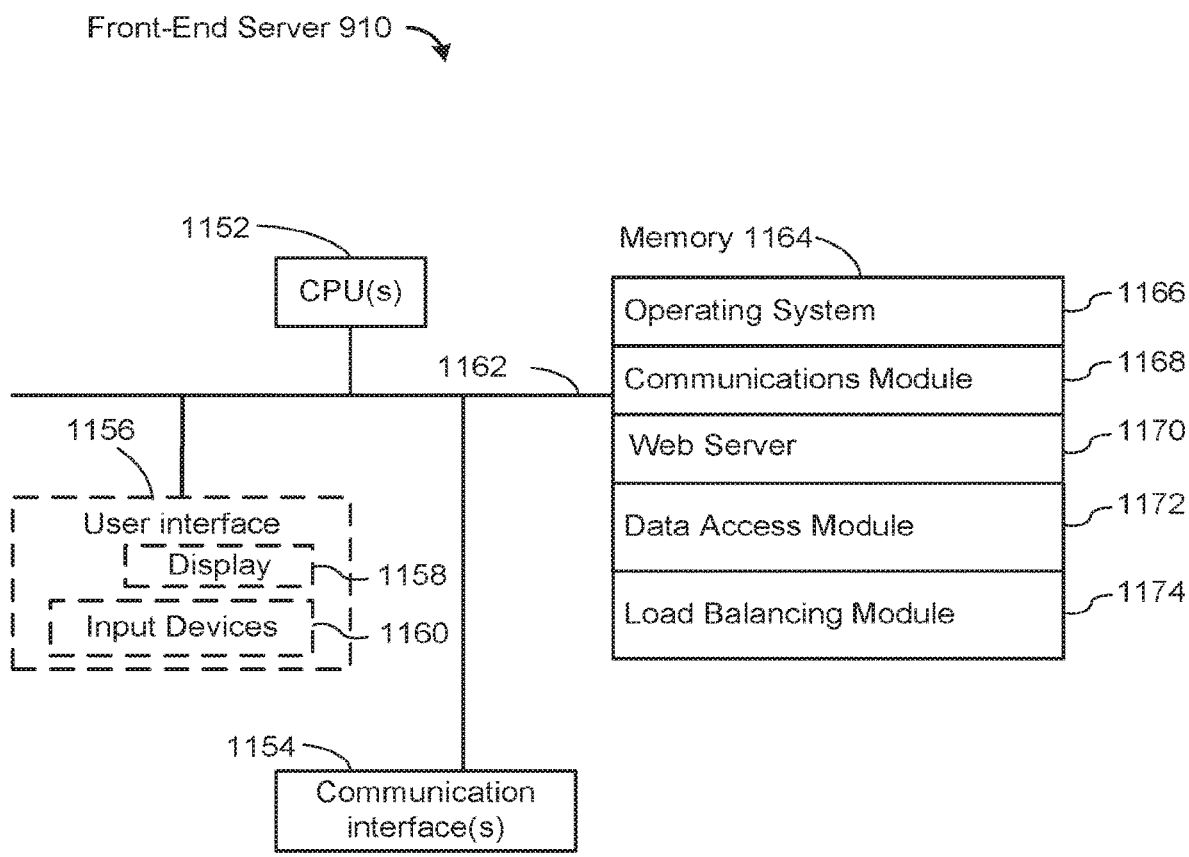
FIG. 11B is a functional block diagram of a front-end server in accordance with some embodiments.

Referring to FIG. 11B, a front-end server 910 generally includes one or more processing units (CPUs) 1152, one or more network or other communications interfaces 1154, memory 1164, and one or more communication buses 1162 for interconnecting these components. The communication buses 1162 may include circuitry (sometimes called a chipset) that interconnects and controls communications between system components. A front-end server 910 may optionally include a user interface 1156, for instance a display 1158 and a keyboard 1160. Memory 1164 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1164 may include mass storage that is remotely located from the central processing unit(s) 1162. Memory 1164, or alternately the non-volatile memory device(s) within memory 1164, comprises a computer readable storage medium. In some embodiments, memory 1164 or the computer readable storage medium of memory 1164 stores the following programs, modules and data structures, or a subset thereof:

- an operating system 1166 (e.g., LINUX or UNIX) that generally includes procedures for handling various basic system services and for performing hardware dependent tasks;
- a network communications module 1168 that is used for connecting the front-end server 910 to other servers or other computing devices via one or more communication networks 908, such as the Internet, other wide area networks, local area networks, metropolitan area networks, and the like;
- a web server 1170, which receives requests from clients for web pages or database access (reads or writes), and responds to those requests;
- a data access module 1172, which forwards data access requests from clients to an appropriate database server 922, and generates appropriate database access requests based on selected web pages; and
- a load balancing module 1174, which monitors the utilization of each of the database replicas, and directs new database access requests to an appropriate database server to even out the load among the database servers. In some embodiments, the load balancing module 1174 of the front-end server 910 balances the load among the replicas and the load among the database servers within each replica; in other embodiments, the load balancing module 1174 at the front end server 910 only balances load across the replicas. In these latter embodiments, load balancing for a replica is performed by one or more servers at the replica rather than the front end server 910.

FIG. 9 illustrates a single front-end server, but many embodiments include multiple front-end servers, such as 5, 20, or 50, depending on usage.

Although FIGS. 10, 11A, and 11B illustrate various client and server computers, these figures are intended more as functional illustrations of the various features that may be present in a single computer or set of computers, rather than a structural schematic of the embodiments described herein. In practice, and as recognized by those of ordinary skill in the art, items shown separately could be combined and some items could be separated. For example, some items shown separately in FIG. 9 (such as database server 922 and data store 932) could be implemented on a single server and single items could be implemented by one or more servers. The actual number of servers used to implement a database management system 950, and how features are allocated among them will vary from one embodiment to another, and may depend in part on the amount of data traffic that the system must handle during peak usage periods as well as during average usage periods.

Each of the methods described herein may be performed by instructions that are stored on a computer readable storage medium. The instructions are executed by one or more processors of one or more servers or clients. Each of the operations shown in FIGS. 10, 11A, and 11B may correspond to instructions stored in a computer memory or computer readable storage medium.

FIGS. 12A-12D illustrate exemplary data structures used in a multiversion database in accordance with some embodiments. FIG. 12A illustrates two rows 1216 and 1218 in a database table 1200. In an actual embodiment, a database table 1200 may contain millions or billions of rows. The illustrated database table 1200 has a Customer ID 1202 as the primary key. Each row has a distinct primary key value, such as the value 312257018 (1220) for the second row 1218. The database table 400 has several non-key columns, including Last Name 1204, First Name 1206, Address 1208, City 1210, State 1212, and Orders 1214. Each non-key column has a specific data type, which may be numeric, string, Boolean, date, or protocol buffer. In some embodiments, the data types for the non-key columns are specified in greater detail, such as single precision, double precision, or fixed decimal numeric types. String data types may be fixed length or variable length. A protocol buffer is a language-neutral, platform-neutral, extensible mechanism for serializing structured data—similar to XML, but smaller, faster, and simpler. A protocol buffer defines structured data, and can easily be written to or read from a variety of data streams using a variety of programming languages. In the illustrated database table, the first five non-key columns use a string data type (either fixed length or variable length depending on implementation). The Orders column 1214, however, has values that are themselves a table. For example, the row 1218 has subtable 1224 as the value for the Orders column 1214. As illustrated below in FIGS. 12C and 12D, subtables can be further nested.

Unlike an ordinary SQL database, an individual column of an individual row in a multiversion database comprises a set of values rather than a single value. For example, in the Address column 1208 of the row 1218 comprises a set of values 1222. This set of values 1222 is illustrated in FIG. 12B. Each Address Value 1228 has an associated Address Timestamp 1226, which specifies when the Address Value 1228 was written to the database table 1200. In the illustrated embodiment, timestamps are stored with an accuracy of $1/10000$ of a second, but other embodiments have greater or lesser precision. FIG. 12B illustrates that the customer with Customer ID 312257018 (1220) has had three addresses, beginning with 123 Main St. (1232) as of Jan. 2, 2009 at about 1:12 PM (1230). This timestamp indicates when the address was saved in the database table 1200, not when the customer actually began living at 123. Main Street (1232). (The timestamps are not user entered "effective dates" that appear in some software applications.)

FIG. 12B illustrates that Customer 312257018 (1220) updated the address to 2388 First St. #12 (1236) on Sep. 15, 2011 about 6:15 PM (1234), and then updated the address to 9178 Sunset Avenue (1240) on Dec. 22, 2013 about 8:43 AM (1238). Any subsequent write to the Address column 408 for Customer 312257018 will have an Address Timestamp 1226 that is later than Dec. 22, 2013 at 8:43 AM (1238). This is described in more detail below with respect to FIGS. 13A, 13B, and 14A.

Having multiple versions of data allows a read in the past that sees the data as it was at that time. For example, a read of row 1218 for customer 322257018 at a read timestamp of Jan. 1, 2010 will return the Address Value 123 Main Street (1232), whereas a read of the same row at a read timestamp of Jan. 1, 2012 will return 2388 First St. #12 (1236). (Of course an actual read timestamp also specifies the time of day, but the time of day would not make a difference in the above two examples.) Due to storage space limits of the data store 932, old versions of column values are subject to garbage collection based on user-defined criteria. For example, entries can be subject to removal when the number of entries for a column exceeds a designated threshold or the entries are older than a threshold staleness.

As illustrated by the sequence of three values for the customer addresses for customer 312257018, the timestamps for the values create a unique order for the values. The database management system 950 guarantees that the timestamps for the values are monotonically increasing, even when new values are inserted in rapid succession.

Although the Database Management System 950 supports multiple versions for the values in non-key columns, multiple versions are not required. For example, people do not generally change their first names, and thus each customer row would typically have only a single value in the First Name column 1206. The timestamp for the single value in this instance would be the timestamp when the row was inserted.

As illustrated in FIG. 12C, The Orders column 1214 has values that are tables. FIG. 12C illustrates the subtable 1224 of orders for customer 312257018. In this illustration, the subtable 1224 has only two orders 1260 and 1262, but there can be any number of orders. The abbreviated subtable 1224 illustrated in FIG. 12C has four columns, including an Order ID 1250 as the primary key, and three non-key columns Order Date 1252, Shipping Address 1254, and Order Items 1256. Like the root table 1200, the values for the non-key columns have specified data types, which can be numbers, strings, dates, Boolean values, protocol buffers, or subtables.

Although Order Date 1252 and Shipping Address 1254 in the subtable 1224 can store multiple values, there would generally be a single value for each of these columns. However, additional values would be added if the customer corrects an invalid entry. For example, the customer might recognize that the shipping address 1266 for order QA1997233 (1264) was mistyped or used an old address. When the customer corrects the error, a new shipping address value would be added, but the previous value would still be in the set of values 1266. This also illustrates the point that a user cannot "change history." Once a value is saved, it will continue to exist in the database until some time later when it is removed by garbage collection.

The order QA1997233 (1264) includes a subtable 1268 that specifies the Order Items 1256 within the order. This illustrates that subtables may be nested inside other subtables. FIG. 12D illustrates an abbreviated set of columns to identify the items within subtable 1268. Similar to the root table 1200 and subtable 1224, the subtable 1268 has a primary key Item ID 1270, and some non-key columns. The non-key columns include a Quantity 1272 and Price 1274. FIG. 12D illustrates a subtable with two rows 1276 and 1278, but there could be any number of rows. In row 1278, the Item ID is 7752-81517 (1280), the Quantity is a value in the set of quantity values 1282, and the price is a value in the set of price values 1284. In general there would be a single value for the quantity 1282 and price 1284, but there would be multiple values if the data changed after it was originally saved. (E.g., the customer decides to get three of an item rather than two.)

Figure 12E:
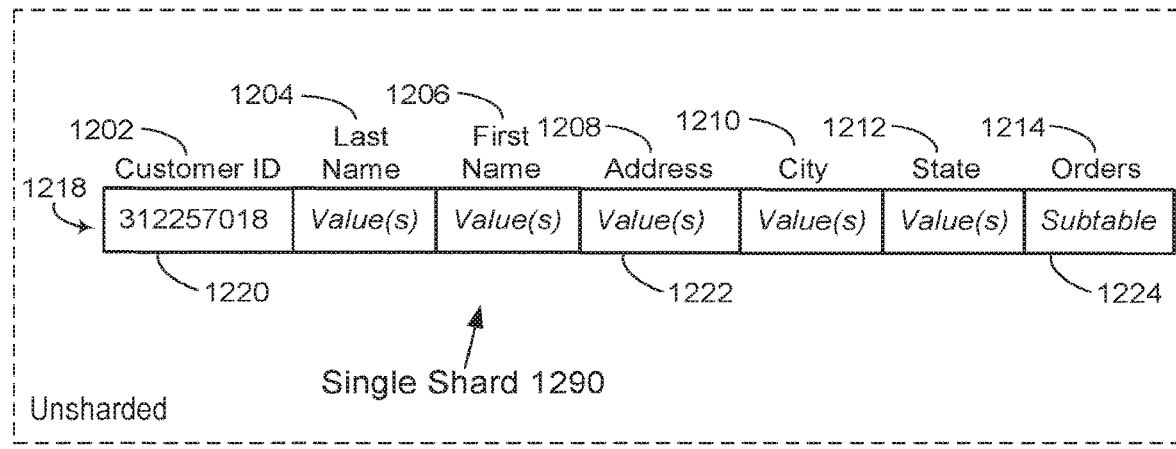
FIGS. 12E-12F illustrate sharding of a row in a database table in accordance with some embodiments.
Figure 12F:
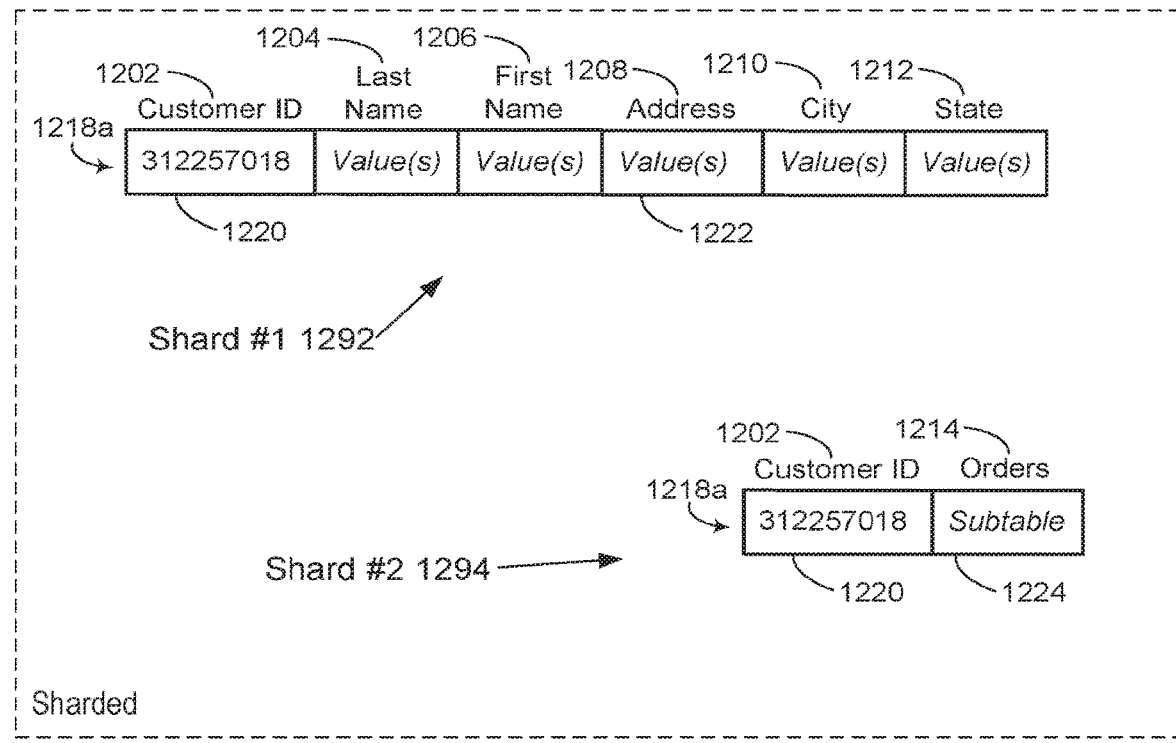

FIGS. 12E-12F illustrate sharding of a row in a database table in accordance with some embodiments. FIG. 12E illustrates a row 1218 of a database table 1200 that is saved as a single shard 1290. That is, the primary key 1202 and all of the non-key columns are stored together. As long as the total physical size of a row 1218 is not too large, the row consists of a single shard 1290. As used herein, a shard is also referred to as a "split." The threshold size for a single shard depends on implementation (e.g., the threshold size could be 10 Megabytes or 10 Gigabytes), and the threshold size is a "soft" limit. That is, a row 1218 can grow larger than the threshold size before it is sharded. Typically, most rows consist of a single shard.

FIG. 12F illustrates one way that a root row 1218 can be split into two shards 1292 and 1294. In this example, each shard includes the primary key Customer ID 1202, and a subset of the non-key columns. The non-key columns Last Name 1204, First Name 1206, Address 1208, City 1210, and State 1212 are included in the first shard 1292, and the non-key column Orders 1214 is included in the second shard 1294. In this example, each non-key column is included in exactly one shard, and the primary key is included in each of the shards. As illustrated in FIG. 12F, splitting into shards occurs on individual rows. Therefore, row 1218 may be split into a portion 1218*a* in a first shard 1292 and a second portion 1218*b* in a second shard 1294, whereas row 1216 (see FIG. 12A) may remain as a single shard.

Figure 12G:
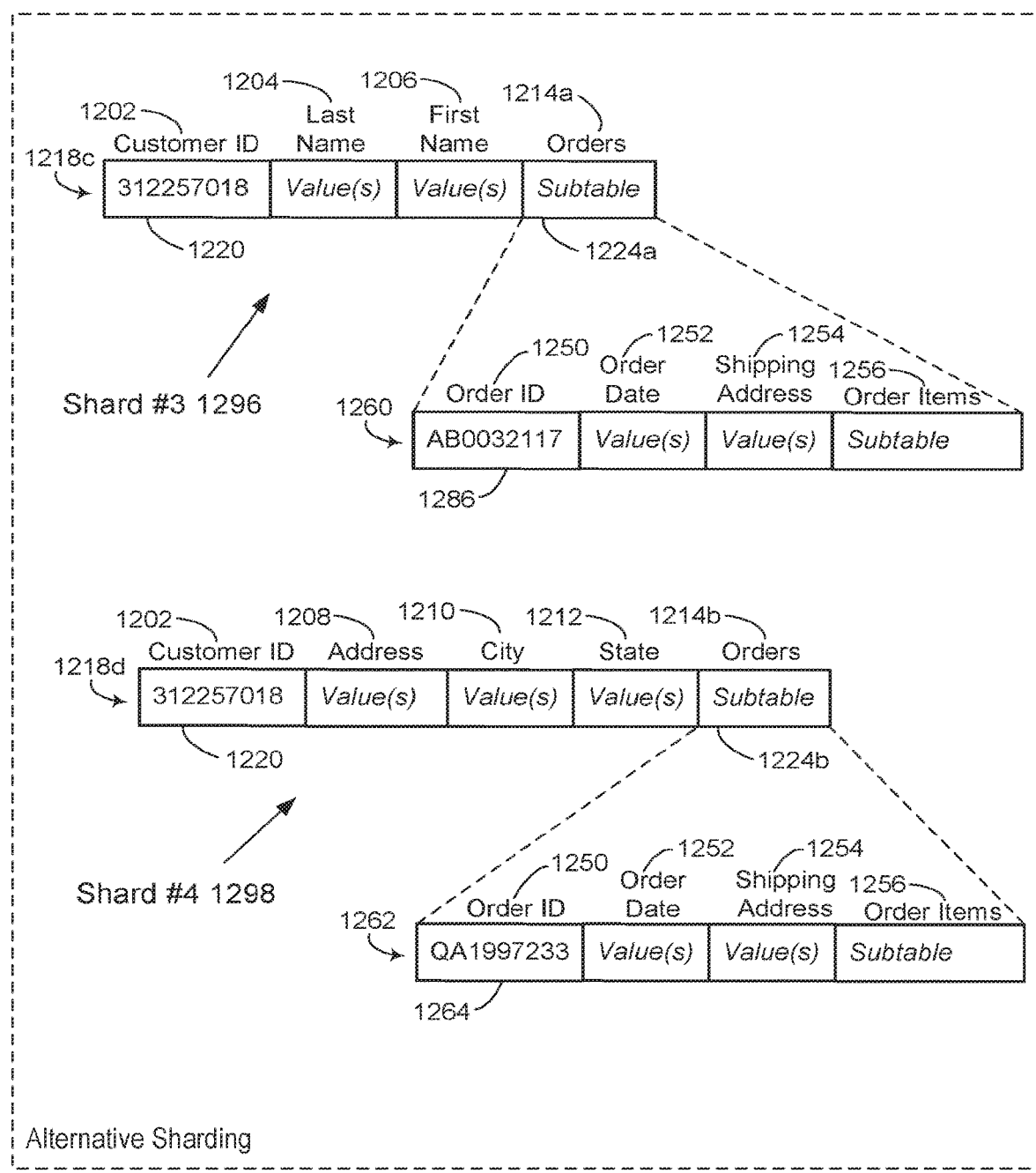
FIG. 12G illustrates an alternative way to split a row 418 into shards in accordance with some embodiments.

FIG. 12G illustrates an alternative way to split a row 1218 into shards 1296 and 1298 when the row includes one or more non-key columns that are subtables. One shard 1296 includes a portion 1218*c* of the original row 1218, which includes the primary key Custom ID 1202, two non-key columns Last Name 1204 and First Name 1206, as well as a portion 1214*a* of the Orders subtable that contains a subset 1224*a* of the rows of the subtable 1224 from the original row 1218. In particular, the subset 1224*a* includes order AB0032117 (1286). Another shard 1298 includes a portion 1218*d* of the original row 1218, which includes the primary key Custom ID 1202, three non-key columns Address 1208, City 1210, and State 1212, as well as a portion 1214*b* of the Orders subtable that contains a subset 1224*b* of the rows of the subtable 1224 from the original row. In particular, the subset 1224*b* includes order QA1997233 (1264). In this alternative sharding method, ordinary non-key columns are relocated to exactly one of the shards, but a non-key column that is a subtable may have the rows of the subtable split among the shards.

FIG. 13A illustrates a data structure that some embodiments use for selecting read timestamps and write timestamps. This data structure includes the timestamp for the last write of each column. The data row 1318 illustrated corresponds to database table row 1218 in FIG. 12E. In some embodiments, this data is stored in persistent storage in data store 932 or in memory 1114, whereas in other embodiments, this information is computed when needed based on the timestamps associated with the column values in each column. The Customer ID 1202 correlates this data with the appropriate customer. The actual data structure includes "last-write" timestamps for each non-key column of the database table 1200, but FIG. 13A illustrates just two of them. The [First Name] Last Write 1306 indicates the timestamp of the last write to the First Name column 1206. The [Address] Last Write 1308 indicates the timestamp of the last write to the Address column 1208. Based on the three column values illustrated in FIG. 12B and their associated timestamps, the last write was Dec. 22, 2013 at 8:43 AM (plus 29.8293 seconds to be precise). Comparing the [Address] Last Write 1308 in FIG. 13A to the data in FIG. 12B illustrates that the last-write data for each column can be calculated (e.g., select the highest timestamp associated with the column values); however, when the overhead cost in time and space for storing this redundant information is small, some embodiments store the data in permanent storage or store the data in memory 1114.

As FIG. 13A illustrates, the last-write timestamp is known for each column in the database table 1200. This granularity enables selection of read and write timestamps without blocking other transactions that access different columns of the same row.

FIG. 13B illustrates a piece of data 1320 that is used by the database management system 950 to ensure that the timestamps for write transactions are monotonically increasing. The Minimum Next New Write Timestamp (MNNWT) 1320 is tracked for each database or database replica. When the next write transaction arrives, it is assigned a write timestamp that is greater than or equal to MNNWT 1320.

When a database server receives a read request, the read is assigned a timestamp that is greater than last-write timestamp of the accessed columns and less than MNNWT 1320. This serializes the read after the last write and before the next new write. The read can proceed in parallel with any new writes that are received by the database server because the database maintains multiple versions of column values; the read accesses the existing data, and any new writes will create new versions of data with timestamps greater than or equal to MNNWT.

When the database server receives a write request, the write transaction is assigned a timestamp greater than or equal to MNNWT (typically greater than) and increases MNNWT to be greater than the assigned timestamp.

When a client computer 902 needs to perform a read at a time that is consistent across multiple database servers, the client 902 may specify a read timestamp. As long as that timestamp is less than the MNNWT 1320 of each database server, the read may safely proceed at each database server, and the read results are guaranteed to be stable if the read is repeated at the same timestamp.

In some embodiments, there are one or more database replicas (e.g., replica 916) that are capable of serving writes but not reads or vice versa. In some of these embodiments, the limited replica periodically receives a MNNWT value from another replica. A replica with knowledge of MNNWT may independently serve a read at a timestamp less than MNNWT without having to communicate with other database servers. In the absence of writes, a database server periodically increases the value of MNNWT so that replica entities may serve reads at increasing timestamps.

Figure 14A:
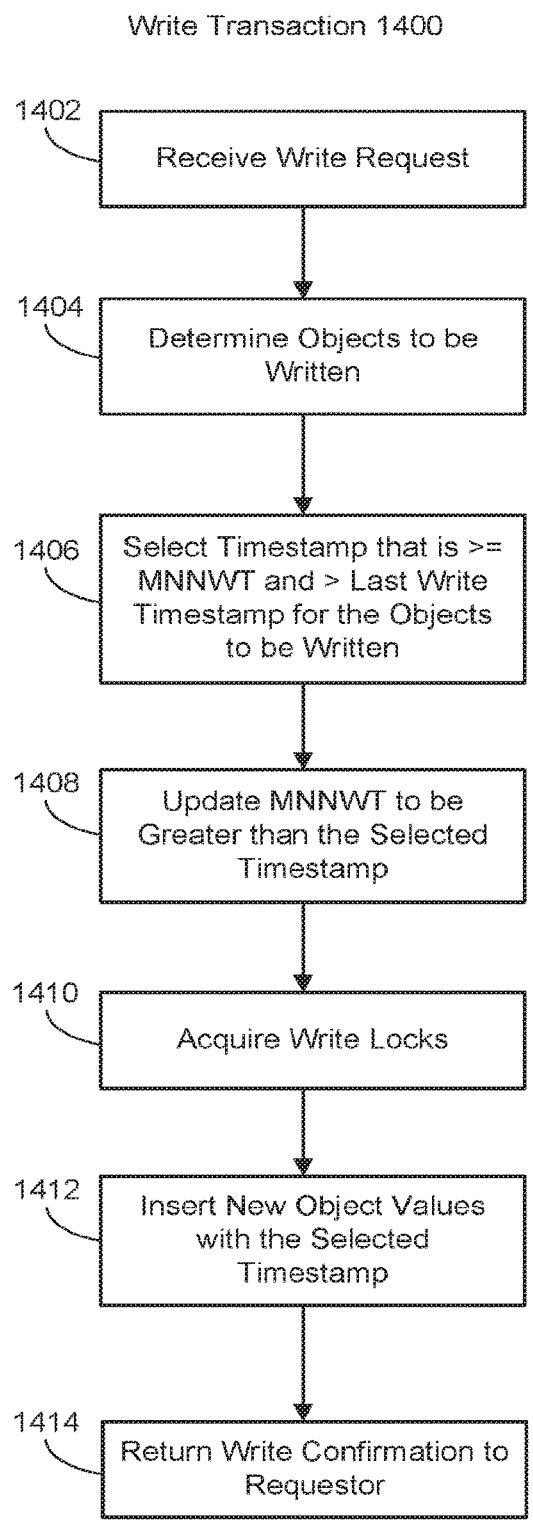
FIGS. 14A-14B are exemplary flowcharts for reading and writing data from a table in a multiversion database in accordance with some embodiments.
Figure 14B:
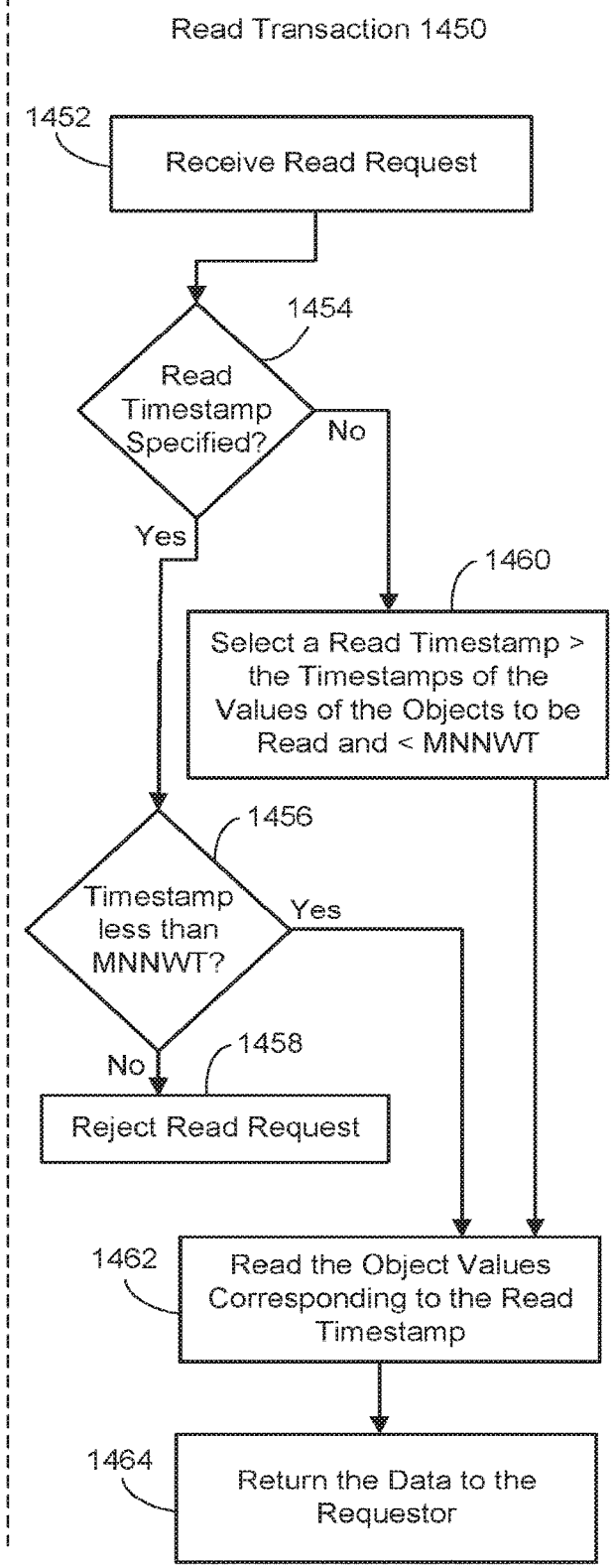

FIGS. 14A and 14B are exemplary flowcharts that summarize the relevant aspects of read and write transactions. In FIG. 14A, the database management system 950 receives (1402) a write transaction 1400. A database server determines (1404) what objects need to be written (e.g., columns of a row in a database table). The database server then selects (1406) a write timestamp that is greater than or equal to MNNWT 1320 and that is greater than the last write timestamp for the objects to be written. Some embodiments omit the second check because the MNNWT 1320 should always be greater than any previous write timestamps. The database server updates (1408) MNNWT 1320 so that MNNWT is greater than the timestamp just selected. The database server acquires (1410) write locks on the objects to be written, then inserts (1412) new object values with the selected timestamp into the set of object values. The database server then returns (1414) a write confirmation to the client computer 902 that initiated the write transaction 1400.

FIG. 14B illustrates a read transaction 1450. The database management system 950 receives (1452) the read request, and determines (1454) whether the read request specifies a read timestamp. If the read request does include a read timestamp, the database management system 950 determines (1456) whether the specified timestamp is less than MNNWT. If the specified read timestamp is greater than or equal to MNNWT 1320, some embodiments reject (1458) the request. In other embodiments, when the specified read timestamp is greater than or equal to MNNWT 1320, the read transaction 1450 will block until MNNWT 1320 is increased.

If the read request does not include a read timestamp, the database management system 950 selects (1460) a read timestamp that is greater than the last-write timestamp of the values of the objects to be read and that is less than MNNWT 1320. MNNWT 1320 is guaranteed to be greater than all of the timestamps of the previous writes, so it is always possible to select a read timestamp meeting these criteria.

Whether the read timestamp is specified by the client 902 or selected by the database management system 950, a database server proceeds to read (1462) the desired data at the specified timestamp and returns (1464) the data to the client 902.

FIG. 15 is a high level view of the operations performed at a server when a write transaction and a read transaction access the same database table row at approximately the same time. In this illustration, the read and write transaction are received from two distinct client computers 902 and 904, but the two transactions could easily originate from the same client 902. For example, a graphical user interface at a client may issue a write, then issue an immediate read so that the interface is refreshed with the current data. As another example, the two requests may be issued by independent asynchronous processes. Furthermore, essentially the same description would apply if the read transaction were received before the write transaction, there were two nearly simultaneous read transactions, or two nearly simultaneous write transactions. In this example, the write request 1502 is received by the database management system 950 before the database management system 950 receives the read request 1506. If the read request 1506 seeks to read any of the objects that the write request is going to modify, then there is an inherent conflict, and the read will have to wait until the write is complete. Therefore, FIG. 15 represents read and write transactions that do not have an inherent conflict.

The database server 922 processing the write transaction locks (1504) the appropriate object and proceeds with the write. This is described in more detail above with respect to FIG. 14A. In this illustration, the read request 1506 is received a moment after the database management system 950 receives the write request. As illustrated in FIG. 14B, a database server selects (1508) a read timestamp and verifies (1508) that there are no locks on the objects to be read. Then the database server performs (1510) the write in parallel with the read, and performs (1512) the read in parallel with the write. In this illustration, the read completes first and provides (1514) the read data to the requestor. Afterwards the database server completes the write and confirms (1516) the write with the write requestor. In some instances the write request would complete prior to completion of the read.

Figure 16A:
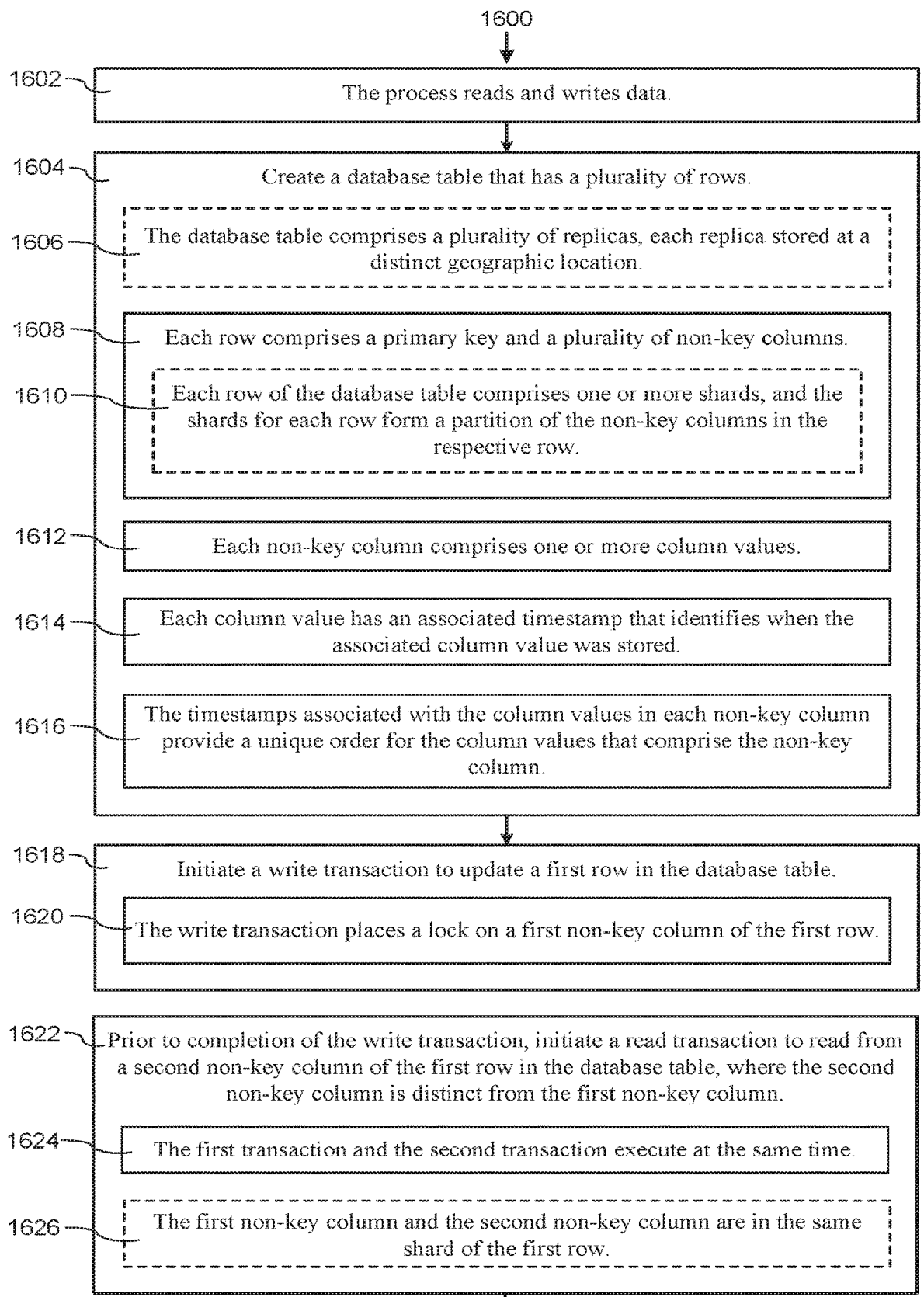
FIGS. 16A-16B illustrate an exemplary process for reading and writing data from a table in a multiversion database according to some embodiments.
Figure 16B:
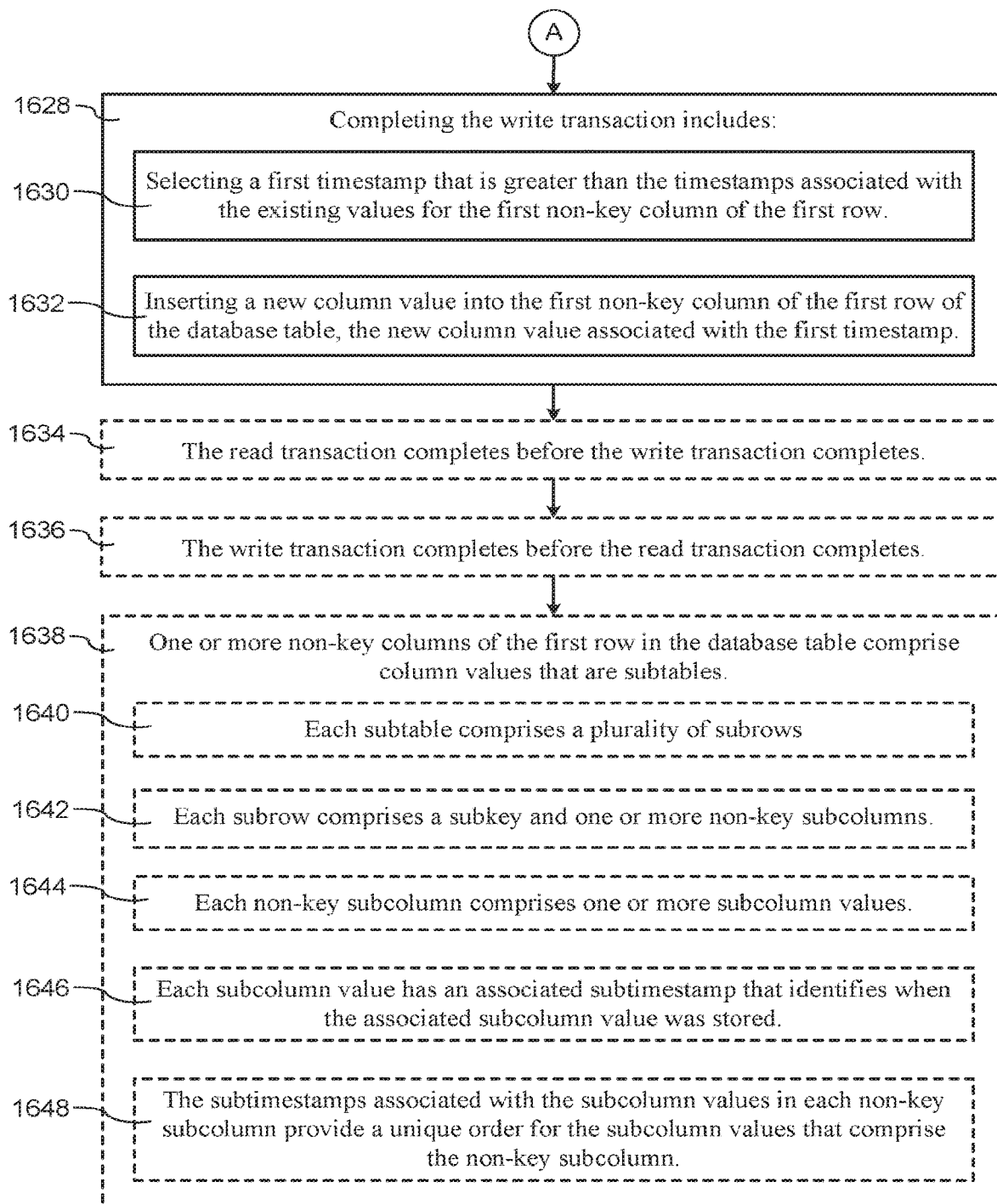

FIGS. 16A-16B illustrate an exemplary process 1600 that reads (1602) and writes (1602) data in a multiversion database. The process 1600 is performed by a database management system 950, which includes one or more servers, each having one or more processors and memory. In process 1600, the system 950 creates (1604) a database table 1200 that has a plurality of rows. In some embodiments, the database table 1200 comprises (1606) a plurality of replicas, each replica stored at a distinct geographic location. The table replicas are part of the database replicas 912, 914, and 916 identified in FIG. 9. That is, a replica of a database table would be located at a database replica, such as replica 912.

Each row of the database table comprises (1608) a primary key, which uniquely identifies the row, and a plurality of non-key columns. In some embodiments, each of the rows of the database table comprises (1610) one or more shards. This was described in greater detail above with respect to FIGS. 12E-12G. In some embodiments, the shards for each row form (1610) a partition of the non-key columns in the respective row. In some embodiments, the shards for each row form a partition of the non-key columns whose values are not subtables. This is described in greater detail above with respect to FIGS. 12E-12G.

As described in greater detail above with respect to FIG. 12B, each non-key column has (1612) one or more column values. Each column value has (1614) an associated timestamp that identifies when the associated column value was stored. This enables the database management system 950 to read data from the database table 1200 as it appeared at any point in the past. The timestamps associated with the column values in each non-key column provide (1616) a unique order for the column values that comprise the non-key column. When a new column value is inserted, its associated timestamp represents when the new column value is stored, and thus the associated timestamp is greater than all of the previous timestamps for the previously existing column values for the same column.

The process 1600 initiates (1618) a write transaction to update a first row in the database table 1200. In some embodiments, a single write transaction can update a plurality of root rows. The write transaction places (1620) a lock on a first non-key column of the first row. This first non-key column represents a column that the write transaction will update.

Prior to completion of the write transaction, the process 1600 initiates (1622) a read transaction to read from a second non-key column of the first row in the database table 1200. The second non-key column is (1622) distinct from the first non-key column. Because the timestamps are stored for each individual non-key column, and the columns accessed by the read and write transactions are distinct, they do not block each other. Therefore, the first transaction and the second transaction execute (1624) at the same time. In embodiments where database tables 1200 can be sharded, the first and second non-key columns can be (1626) in the same shard of the first row, or can be (1626) in different shards of the first row.

Completing the write transaction includes (1628): selecting (1630) a first timestamp that is greater than the timestamps associated with the existing values for the first non-key column of the first row; and inserting (1632) a new column value into the first non-key column of the first row of the database table 1200. The new column value is associated (1632) with the first timestamp.

In some instances, the read transaction completes (1634) before the write transaction completes. In other instances, the write transaction completes (1636) before the read transaction completes.

In some instances, the first row of the root database table 1200 includes (1638) one or more non-key columns that comprise column values that are subtables. Each subtable comprises (1640) a plurality of subrows (i.e., rows of the subtable). Each subrow comprises (1642) a subkey that uniquely identifies the subrow within the subtable and one or more non-key subcolumns (i.e., a column within the subtable). Each non-key subcolumn comprises (1644) one or more subcolumn values (i.e., values for the subcolumn). Furthermore, each subcolumn value has (1646) an associated subtimestamp that identifies when the associated subcolumn value was stored in the database. The subtimestamps associated with the subcolumn values in each non-key subcolumn provide (1648) a unique order for the subcolumn values that comprise the non-key subcolumn.

Figure 17:
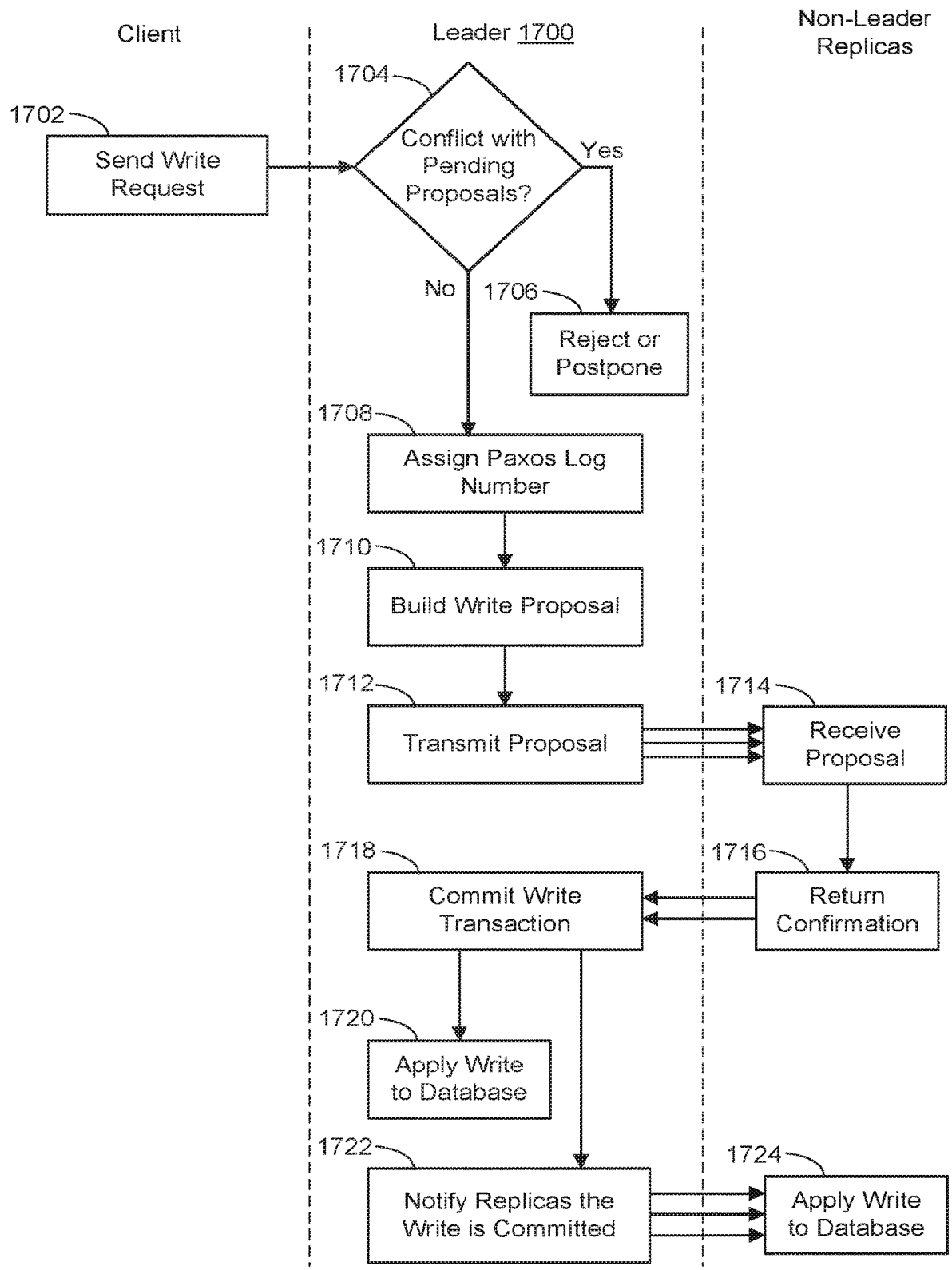
FIG. 17 is an exemplary flowchart for a single write to a database in accordance with some embodiments.

FIG. 17 provides a flowchart for processing a single write request from a client 902. First, the client 902 sends (1702) the write request to the database management system 950. In this illustration, the write involves a single row in a single shard, so the write is directed to the leader of the Paxos group that contains the relevant shard. If the write request includes updates to multiple rows and/or multiple shards that are in distinct Paxos groups, the portions of the write pertaining to each Paxos group are directed to the proper leader for the respective group, and there is a two phase commit to coordinate the writes. This process is described in greater detail with respect to FIG. 19 below.

The leader 1700 determines (1704) whether the write request conflicts with any pending proposals. Conflicts arise when the write request will update an object that is not already committed to the database. E.g., the write request and an existing pending request will update the same column of the same root row. When there is a conflict, some embodiments reject (1706) the write request, informing the client 902 of the rejection. Because the request conflicts with a pending write to the same data, the request may have been made based on a version of the data that will no longer be accurate. In other embodiments, when there is a conflict, the new write request is postponed (1706) until the previous write is committed.

Figure 18:
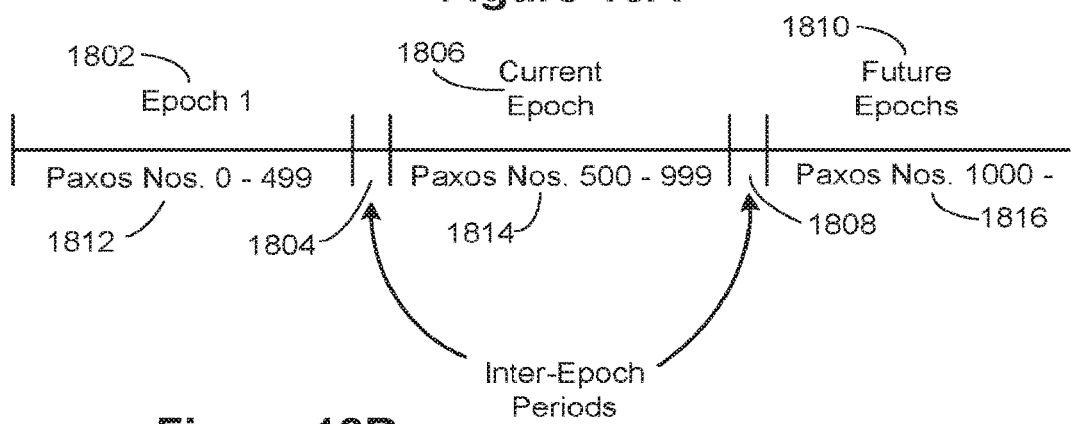
FIG. 18A graphically illustrates epochs in accordance with some embodiments.
FIG. 18B illustrates a single block of Paxos number for an epoch, and the states assigned to the Paxos numbers as they are assigned to write transactions in accordance with some embodiments.
FIG. 18C illustrates a single Paxos write proposal in accordance with some embodiments.

If the write request does not conflict with a pending write, the leader 1700 assigns (1708) a Paxos log number (see FIG. 18B) to the write, and changes the status of the assigned Paxos log number to "Proposed." The leader 1700 builds (1710) a write proposal 1860 that includes the Paxos number 1864 and identifies the proposed changes 1868. This is illustrated in FIG. 18C below. The leader 1700 then transmits (1712) the proposal to at least a plurality of the replicas. There must be a plurality of confirmations (i.e., acceptances) for the proposal 1860 before it is committed.

The replicas receive (1714) the proposal 1860, and confirm (1716) the proposal. In general, the replicas are in distinct geographical locations, so the network latency between the leader and the non-leader replicas varies. In addition, one or more of non-leader replicas may not receive the proposal due to a network outage, corruption of the proposal message en route, or other failure at the replica site. When a plurality of the replicas (leader plus non-leader replicas) accept (1716) the write proposal 1860, the write is "logically committed." When the leader is notified of the plurality of confirmations, the leader commits (1718) the write. As illustrated in FIG. 18B below, some embodiments commit (1718) a write transaction by changing the status of the corresponding Paxos number to "Committed." Once the proposal 1860 is committed, the leader 1700 applies (1720) the write to the database and notifies (1722) the non-leader replicas that the write has been committed. Each of the non-leader replicas then applies (1724) the write to its copy of the database.

FIG. 18A illustrates how the processing of write transactions for a Paxos group is split into a sequence of epochs. In this illustration, the first epoch 1802 was allocated Paxos numbers 0-499 (1812), and has already finished processing. The current epoch 1806 is allocated Paxos numbers 500-999 (1814), and future epochs 1810 will be allocated Paxos numbers 1000 and greater (1816). FIG. 18A can also be viewed as a timeline, with higher Paxos numbers assigned to write transactions that are received later in time. In this regard, the inter-epoch periods 1804 and 1808 identify portions of time in the timeline where special processing occurs.

Within an epoch, such as the current epoch 1806, Paxos numbers are generally assigned sequentially to write requests as they arrive. Each implementation specifies the number of write transactions that can be pending at a single time, which is referred to as the depth of the pipeline. The pipeline depth cannot be greater than the total number of Paxos numbers allocated to an epoch (e.g., 500), but is generally a smaller number, such as 5, 10, or 20 transactions.

Certain processing occurs at the end of each epoch, in the inter-epoch periods 1804 and 1808 prior to the beginning of the next epoch. One important activity in an inter-epoch period 1804 or 1808 is to resolve all transactions from the epoch that just ended. In a standard non-pipelined Paxos implementation, all of the individual transactions are serialized, so no new transaction is proposed until the prior transaction is committed. Therefore, a leader for a Paxos group would not have more than a single pending transaction for the group and any point in time. When Paxos transactions are pipelined, however, there can be as many pending transactions as the depth of the pipeline. All of the pending transactions are resolved prior to beginning the next epoch. Resolving the transaction includes committing all proposed transaction for which there is a plurality of confirmations among the replicas. In some embodiments, the leader re-proposes transactions for which there is not yet a plurality of confirmations. In some embodiments, transactions for which a plurality of confirmations has not been received in a predefined amount of time will be replaced with a no-op (no operation). In some embodiments, resolving the transactions for an epoch includes applying all of the committed transactions to the database.

In some inter-epoch periods, a new election is held to determine a new leader for the upcoming epoch. In some embodiments, the existing leader tracks data regarding the "health" and performance of the replicas during each epoch. Using this data, the leader makes a recommendation to hand-off leadership to another replica that can process the data more efficiently, more timely, with greater throughput, lower latency, or is preferable for various other criteria. Based on the tracked data about replicas, the leader may also determine that it should renew its leadership for the next epoch. In some embodiments, an election for the new leader is held regardless of the current leader's recommendation, but the recommendation may carry some weight in the voting process.

Although FIG. 18A illustrates epochs with the same number of write transactions in each epoch, this is not required. During an inter-epoch period, the size of the next epoch can be changed.

FIG. 18B illustrates a Paxos number block 1830 allocated to a leader 1700 for a single Paxos group for one epoch. An allocated Paxos number block 1830 identifies each Paxos log number 1832 as well as the corresponding status or state 1834. For example, Paxos number 500 (1836) has already been assigned to a transaction, and the transaction has been committed and Applied 1846. Paxos number 682 (1838) has been assign to a transaction and Committed 1848, but not yet applied to the database. Paxos numbers 683 and 684 (1840 & 1842) have been assigned to write transactions and Proposed 1850 & 1852, but have not yet been committed. This illustrates that two or more distinct transactions can be pending simultaneously. At the end of the Paxos number block 1830 are some Paxos numbers that are Unassigned 1854, such as Paxos number 998 (1844).

During each inter-epoch period, such as period 1808, there will be no more Unassigned 1854 Paxos numbers, and any transactions that are still in a "Proposed" state 1850 are resolved. In some embodiments, Committed 1848 transactions are considered resolved because there is no ambiguity that it will be applied to the database. In some embodiments, all outstanding transactions from the epoch are Applied 1846 to the database prior to beginning the next epoch.

FIG. 18C illustrates some basic elements included in a Paxos write proposal 1860. Each proposal 1860 includes the assigned Paxos log number 1862 and the corresponding write request 1866. In this illustrated example, the assigned Paxos log number is 683 (1864), and includes the rows, columns, and values (1868) for the write. In some embodiments, the write request data 1868 is in the same format as received from the client that initiated the request. In other embodiments, the format of the write request data 1868 in the Paxos proposal 1860 is in a different internal format.

Figure 19:
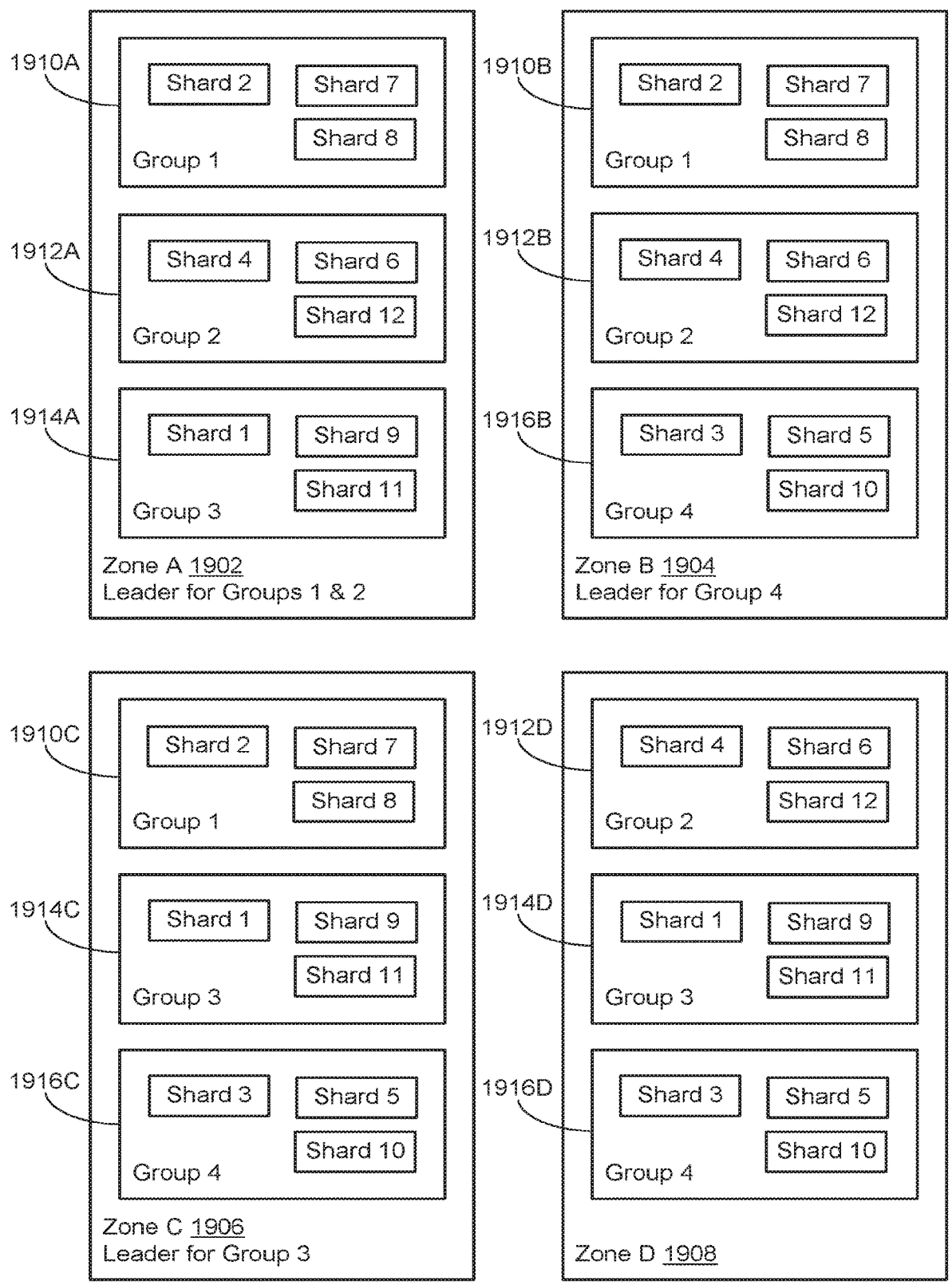
FIG. 19 graphically illustrates the interrelationship between zones, Paxos groups, leaders for the Paxos groups, and the shards included in Paxos groups in accordance with some embodiments.
Figure 21A:
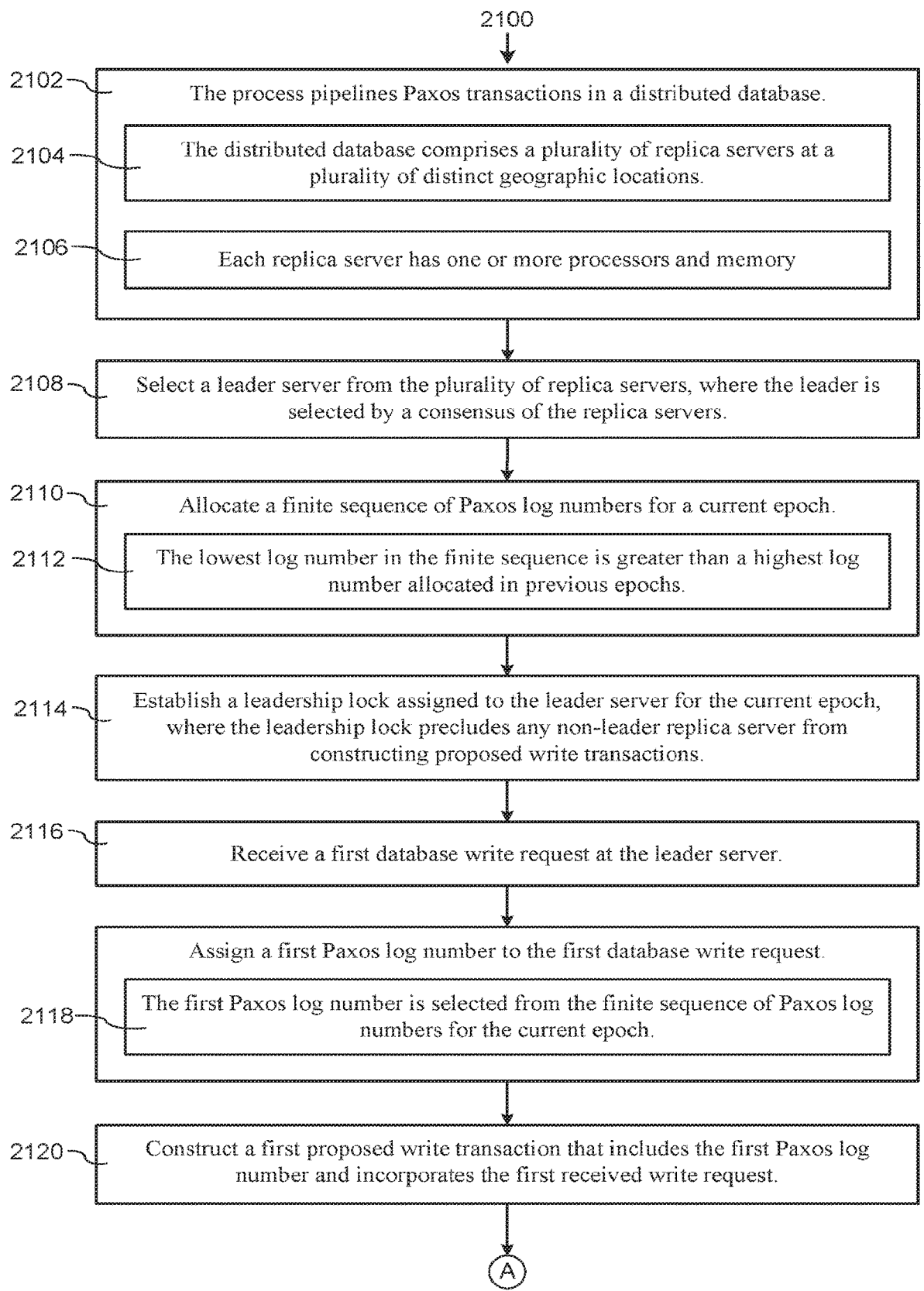
Figure 21B:
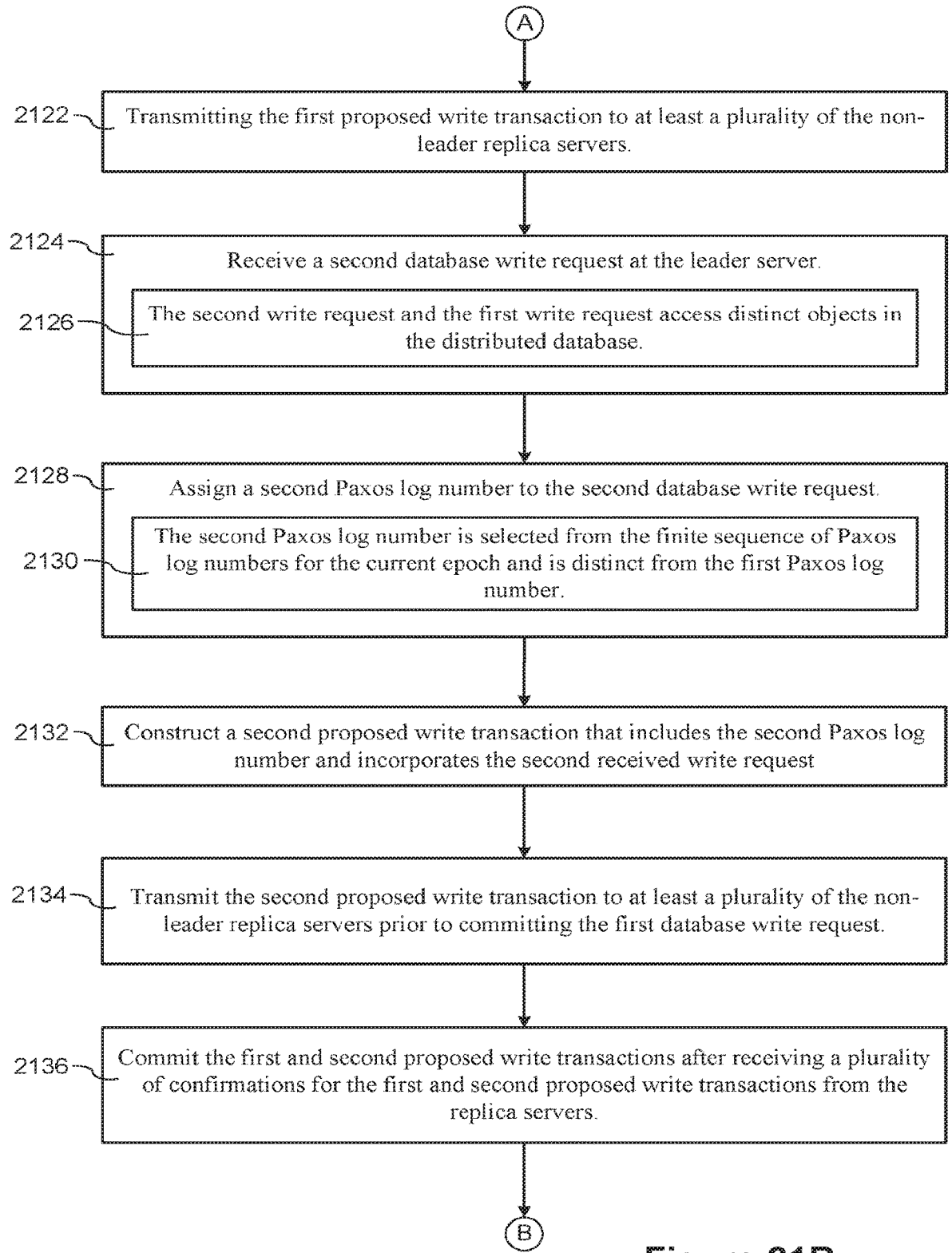
Figure 21C:
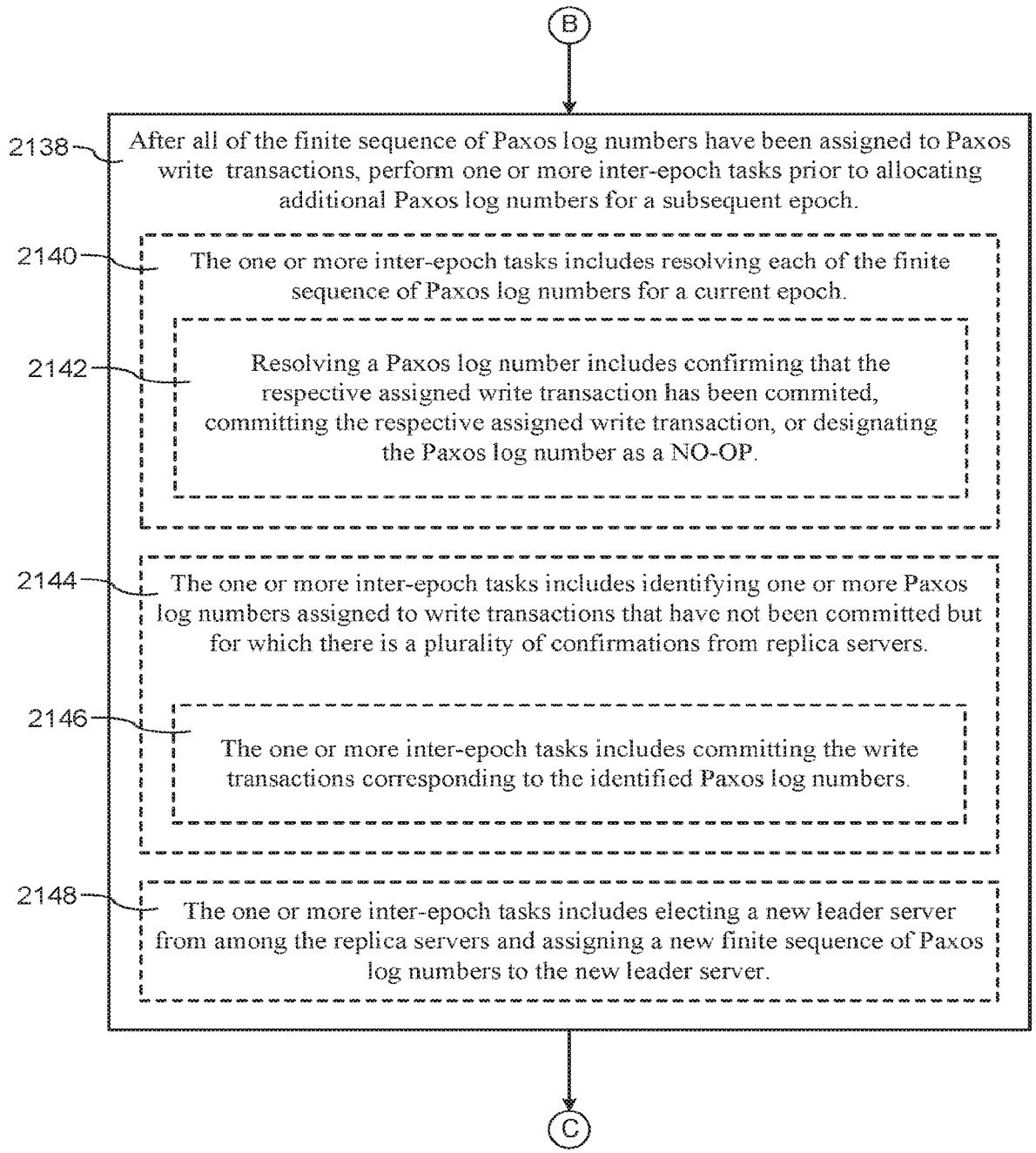
Figure 21D:
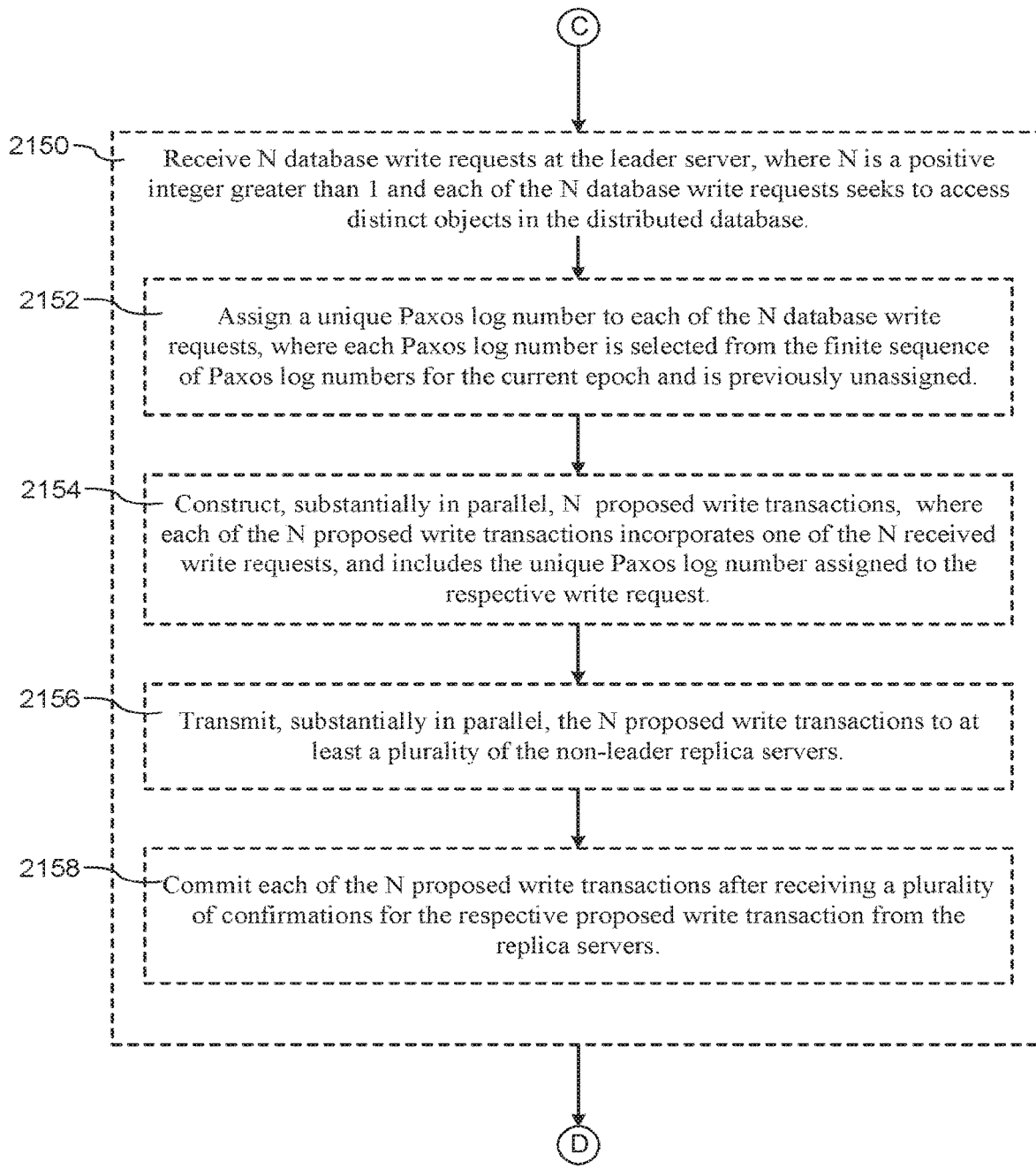

FIG. 19 illustrates the interrelationships between shards, groups, group leaders, and zones in accordance with some embodiments. As illustrated in FIGS. 12E-12G, each row of a root table comprises one or more shards. FIG. 19 illustrates 12 shards. (In an actual embodiment there are millions or billions of shards.) The shards are grouped into Paxos groups to reduce the system overhead with potentially billions of small shards. A Paxos group has a target size, such as 1 gigabyte or 10 gigabytes. In general, when a single root row is split into multiple shards, each of the shards for the row is in a distinct Paxos group. Each Paxos group has replicas in multiple zones, such as zones A, B, C, and D illustrated in FIG. 19. The replicas for a group are all identical (subject to latency in updates), and are sometimes referred to as tablets. That is, a tablet refers to a replica in a specific zone.

Each of the zones Zone A 1902, Zone B 1904, Zone C 1906, and Zone D 1908 is in a geographically distinct location so that an outage is unlikely to affect two distinct zones simultaneously. The tablets 1910A, 1910B, and 1910C for Group 1 are located in zones A 1902, B (1904), and C (1906). The leader for Group 1 is at Zone A 1902, so write proposals 1860 for the shards in Group 1 originate from Zone A 1902. In this illustration, Zone A 1902 also has the leadership role for Group 2. For Group 2, there is a tablet 1912A in Zone A 1902, as well as tablet 1912B in Zone B 1904 and tablet 1912D in Zone D 1908. The tablets 1914A, 1914C, and 1914D are spread across zones A 1902, C 1906, and D 1908, with leadership at Zone C 1906. Finally, tablets 1916B, 1916C, and 1916D are spread across zones B 1904, C 1906, and D 1908, with leadership at Zone B 1904.

FIG. 19, although simple, illustrates several key points. First, shards are grouped together in Paxos groups for purposes of replication. Second, each Paxos group has its own elected leader. Third, each Paxos group is replicated to a set of zones that is independent of the other Paxos groups.

FIG. 20 is an exemplary data structure that provides the information depicted graphically in FIG. 19. The data structure includes a group number or ID 2002, a set of zones or zone IDs 2004, an identification 2006 of leadership for the group, and a Paxos block 2008 currently assigned to the group. The first row 2010 indicates that Group 1 has replicas in Zones A, B, and C, with leadership at Zone A 1902. The currently active block is the set of Paxos numbers 500-999. The rows 2012, 2012, and 2016 similarly indicate the group, zones, leader, and assigned Paxos block. As illustrated in this figure, Paxos log numbers for each Paxos group are independent of the Paxos log numbers for other groups. Thus, it is not a problem for Groups 1 and 3 to be using the same set of numbers 2030 and 2032.

FIGS. 21A-21E illustrate an exemplary process 2100 to pipeline (2102) write transactions for a distributed database according to some embodiments. A distributed database has (2104) multiple replicas of the same data at distinct locations. In general, the distinct locations are geographically separated so that outages (e.g., due to extreme weather conditions causing power outages) would not affect more than one location. The geographic locations within a distributed database system are sometimes referred to as zones, as illustrated in FIG. 20. A "replica server" refers to one or more server computers operating at a replica site. The number of physical server computers that comprise a replica server may depend on the volume of data, as well as the average and peak access to that data. Each of the physical server computers at a replica has (2106) one or more processors and memory as illustrated in FIGS. 11A and 11B.

The process 2100 selects (2108) a leader replica from the plurality of replicas for each Paxos group as previously illustrated in FIG. 20. To simply the discussion of process 2100, the discussion will address a single Paxos group. The same description applies to pipelining of transactions within each of the Paxos groups.

The process 2100 allocates (2110) a finite sequence of Paxos log numbers for a current epoch. The Paxos log numbers are also referred to as Paxos numbers or log numbers. In some embodiments, the Paxos log numbers are non-negative integers. In some embodiments, the finite sequence is a contiguous set of 500 integers, such as 0-499 or 500-999. The Paxos log numbers for each epoch are greater than the Paxos log numbers used in previous epochs. In particular, the lowest log number in the current epoch is (2112) greater than the highest log number used in previous epochs.

The process 2100 also establishes (2114) a leadership lock assigned to the leader replica 1700 for the current epoch 1806. The leadership lock precludes (2114) any non-leader replica from constructing proposed write transactions. This is different from the standard Paxos algorithm, in which multiple distinct replicas can propose write transactions, which can potentially conflict. In the disclosed embodiments, there is a single leader 1700 for each Paxos group, so the non-leader replicas (i.e., all of the replicas other than the leader 1700) are not attempting to propose their own distinct transactions.

The leader 1700 receives (2116) a first database write request, and assigns (2118) a first Paxos log number to the request. The leader 1700 selects (2118) the first Paxos log number from the finite sequence of Paxos log numbers for the current epoch. In preferred embodiments, the selected Paxos log number is the smallest log number in the finite sequence that has not already been assigned to another write request. The leader 1700 then constructs (2120) a first proposed write transaction 1860 that includes the first Paxos log number and incorporates the first received write request. This was illustrated above with respect to FIG. 18C.

The leader 1700 transmits (2122) the first proposed write transaction 1860 to at least a plurality of the non-leader replicas. In some embodiments, the leader 1700 transmits the proposal 1860 to all of the non-leader replicas.

The leader 1700 also receives (2124) a second database write request. The first and second write requests seek to access (2126) distinct objects in the distributed database. For example, the two requests may seek to access different root rows, or different columns within the same root row. The leader 1700 assigns (2128) a second Paxos log number to the second database write request. The leader 1700 selects (2130) the second Paxos log number from the finite sequence of Paxos log numbers for the current epoch 1806. The second Paxos log number is (2130) distinct from the first Paxos log number. In preferred embodiments, the second Paxos log number is greater than the first Paxos log number when the second write request arrives at the leader 1700 after the first write request. In preferred embodiments, the second Paxos log number is selected as the smallest unassigned Paxos log number in the finite sequence of log numbers for the current epoch 1806.

The leader 1700 constructs (2132) a second proposed write transaction, which includes the second Paxos log number and incorporates the second received write request. The leader 1700 then transmits (2134) the second proposed write transaction to at least a plurality of the non-leader replicas. In some instances, the leader 1700 transmits (2134) the second proposed write transaction prior to committing the first database write transaction. The leader 1700 commits (2136) the first and second proposed write transactions after receiving a plurality of confirmations for the first and second proposed write transactions from the replicas. The first and second proposed write transactions are not necessarily committed in the order in which the write requests were received; each proposed write transaction is committed after there is a plurality of confirmations for the proposed write transaction. Each write transaction is applied to the database at some point after the transaction is committed.

After of the finite sequence of Paxos log numbers has been assigned to Paxos write transactions, the process 2100 performs (2138) one or more inter-epoch tasks prior to beginning the next epoch. In some embodiments, an epoch begins by allocating a sequence of Paxos log numbers for the epoch. In these embodiments, the inter-epoch tasks are performed (2138) prior to allocating additional Paxos log numbers for the subsequent epoch.

In some embodiments, the one or more inter-epoch tasks includes (2140) resolving each of the finite sequence of Paxos log numbers for the current epoch. In some embodiments, resolving a Paxos log number includes (2142): confirming that the respective assigned write transaction has been committed; or committing the respective assigned write transaction; or designating the Paxos log number as a NO-OP ("no operation").

In some embodiments, the one or more inter-epoch tasks includes (2144) identifying one or more Paxos log numbers assigned to write transactions that have not been committed but for which there is a plurality of confirmations from replica servers. When such Paxos numbers are identified, the one or more inter-epoch tasks includes (2146) committing the write transactions corresponding to the identified Paxos log numbers.

In some embodiments, the one or more inter-epoch tasks includes electing (2148) a new leader from among the replicas and assigning (2148) a new finite sequence of Paxos log numbers to the new leader.

In some embodiments, the leader receives (2150) N database write requests, where N is a positive integer greater than 1, and each of the N database write requests seeks to access distinct objects in the distributed database. The relevant scenario here is when the N requests arrive at the leader about the same time, so that they are processed in parallel. The leader 1700 assigns (2152) a unique Paxos log number to each of the N database write requests. Each of the Paxos log numbers is selected (2152) from the finite sequence of log numbers for the current epoch that were (2152) previously unassigned.

The leader constructs (2154), substantially in parallel, N proposed write transactions, where each of the N proposed write transactions incorporates (2154) one of the N received write requests and includes (2154) the unique Paxos number assigned to the respective write request. In some embodiments, occurring substantially in parallel means that there is a point in time at which all N write requests have been received but none of them have been committed.

The leader transmits (2156), substantially in parallel, the N proposed write transactions to at least a plurality of the non leader replicas. In some embodiments, transmitting substantially in parallel means that all N proposed write transactions are transmitted to the replicas before any of them is committed. Subsequently, the leader 1700 commits (2158) each of the N proposed write transactions after receiving a plurality of confirmations for the respective proposed write transaction from the replicas. In some embodiments, the leader 1700 is one of the replicas; in other embodiments, the leader manages the process of receiving the write requests, making the proposed write transactions, and committing the transactions as they receive a plurality of confirmations, but does not have a copy of the tablet for the relevant Paxos group. Note that committing the N proposed write transactions can occur in any order depending on when a plurality of confirmations is attained for each proposed write transaction.

In some circumstances, an unexpected event takes the leader out of service. This can happen due to a hardware failure at the leader, a power outage at the leader, a network failure at or near the leader, or any other event that disconnects the leader from the rest of the Internet. In any of these circumstances, the leader is now unavailable. The other replicas, which are generally in other geographic regions, are still available. To provide seamless fault-tolerant access to the distributed database, the database management system must select a new leader, resolve whatever transactions are in progress from the previous leader, and begin handling new write requests.

In some circumstances, the leader becomes (2160) unavailable prior to assigning all of the Paxos log numbers for the current epoch to write transactions. (A statistically less probably event is having the leader become unavailable after assigning all of the Paxos log numbers to transactions but before the inter-epoch tasks have begun.) In this case, the process 2100 holds (2162) an election to select another of the replicas as the new leader. The new leader is selected (2162) by consensus of the replicas that are available. In some embodiments, consensus requires a plurality of the replicas to agree on the new leader; in other embodiments, consensus requires that one potential leader receives greater support than all others, but the support may be less than a plurality. In some embodiments, the replicas track various statistics that identify qualities potentially relevant to leadership selection (e.g., latency in response to messages between replicas), and use the statistics to assign preferential weights to potential leaders. In some of these embodiments, consensus is determined by summing preferential weights.

The leadership lock previously assigned to the former leader is relinquished (2164), and the process 2100 establishes (2166) a new leadership lock assigned to the new leader for the current epoch. As before, the leadership lock precludes (2166) any non-leader replica from constructing proposed write transactions.

The new leader must first resolve (2168) each of the finite sequence of Paxos log numbers for the current epoch. Because the former leader is unavailable, the status of some of the write transactions may not even be known. The new leader polls each of the replicas and resolves each of the Paxos numbers according to the aggregate information from the polling. In some embodiments, any transaction identified as committed by any of the replicas will be marked as committed by the new leader (this would include transactions that have been committed and applied at one or more replicas). In some embodiments, any proposed write transaction that has a plurality of confirmations (i.e., acceptances) from replicas is committed by the new leader if not already committed. In some embodiments, any proposed write transaction that has less than a plurality of confirmations will be re-proposed by the new leader as long as there are not two distinct outstanding proposed write transactions with the same Paxos log number. When a Paxos log number is assigned to two or more distinct proposed write transactions, and none has a plurality of confirmations, some embodiments designate the Paxos log number as a NO-OP (no operation).

In some circumstances, the former leader may have received one or more write requests and assigned Paxos log numbers to the requests, but encountered the outage before transmitting corresponding proposals to any other replicas. In this case, no replica is aware of the writes, so the Paxos log numbers previously assigned by the former leader are identified as unassigned by the new leader. The new leader is thus free to assign these Paxos numbers to future write requests. (If the former leader comes back online quickly, this can lead to Paxos numbers assigned to two distinct proposed transactions. However, the relevant Paxos log numbers are likely to be included in new transactions quickly, and once confirmed by a plurality of replicas, these numbers are part of committed transactions.)

In some embodiments, the new leader resolves (2170) each Paxos log number by: determining that the Paxos log number has not been assigned to any write transaction that is known by any of the replicas; or confirming that the Paxos log number is assigned to a write transaction that has been committed; or determining that the Paxos log number is assigned to a respective write transaction and committing that write transaction; or determining that the Paxos log number is assigned to a respective write transaction and reproposing that write transaction; or designating the Paxos log number as a NO-OP.

After resolving all outstanding Paxos transactions from the former leader, the new leader can begin processing new write requests. Of course the front end server(s) 910 need to direct the write requests to the new leader.

The new leader receives (2172) a third database write request and assigns (2174) a third Paxos log number to the third database write request. The third Paxos log number is selected (2174) from the finite sequence of Paxos log numbers for the current epoch that have not been previously assigned to a proposed write transaction. The new leader constructs (2176) a third proposed write transaction that includes the third Paxos log number and incorporates the third received write request. The new leader transmits (2178) the third proposed write transaction to at least a plurality of the replicas, and commits (2180) the third proposed write transaction after receiving a plurality of confirmations for the third write transaction from the replicas. Subsequently, the leader and the non-leader replicas apply the third write transaction to the database.

An Exemplary Implementation

Standard Paxos won't accept a proposal unless it has committed the preceding proposal. In other words, there are no "holes" in the log. Preventing holes greatly simplifies the role of a recovering potential leader, because for all but the last log position there exists a quorum that knows what was committed. Disclosed embodiments allow log holes in order to reduce latency of writes. Otherwise, a lagging replica can prevent progress in a healthy quorum. The presence of log holes, however, means that a recovering leader may need to use Paxos to roll forward many log entries that are in progress.

Pipelining does not introduce any throughput benefit relative to boxcarring multiple user writes into each round of Paxos writes. However, pipelining does reduce latency. The latency benefit comes from removing the propose-quorum delay that a write would have to wait in an un-pipelined system.

Pipelined writes require several types of locking. First, the leader holds a synchronous (time-based) exclusive lock on leadership. This exclusive lock on leadership for a Paxos group allows the leader to dispense read leases and to complete writes unimpeded by contenders. While that lock is valid, no competing leader is issuing conflicting proposals. Standard Paxos, in contrast, is fully asynchronous and cannot guarantee that a leader is exclusive. Therefore, an asynchronous leader can never rule out the possibility of writes competing with its own.

Second, transaction locks guarantee that writes concurrently submitted to the Paxos leader do not conflict. Transaction locks weed out conflicting writes before they are submitted to Paxos, as a transaction cannot be reverted once proposals are issued. Strong writes acquire exclusive locks before they are submitted to the leader's Paxos state machine. Although a Paxos write can be acknowledged as inevitable after a quorum of Propose messages is acknowledged, write locks must be held until the write is applied to the database.

Third, the leader respects any restrictions imposed by read leases. A holder of a read lease can serve strong reads without consulting other replicas. To render this safe, the leaseholder must know about any writes that have potentially been acknowledged or applied. The Paxos leader honors read leases by ensuring that all leaseholders have acknowledged a proposal before it can be considered committed.

The set of leases is known for certain only by the leader who dispensed them. A read lease term must be shorter than the leader's and be nullified on any incoming message from a higher-numbered leader.

A simple implementation has a replica relinquish its entire read lease when it receives a proposal, only regaining it when that proposal has been committed and applied. This shortens the duty cycle of strong reads on that replica. For the entire period between propose and commit, reads on that replica must block even for unrelated data items.

Disclosed embodiments perform better by utilizing fine-grained transaction locks. Consider a read lease as analogous to a shared lock on the entire directory (though none is physically held). On receipt of a proposal, a Paxos replica acquires an exclusive lock for all cells identified in the proposal before acknowledging it to the leader. If the leader does not commit until all leaseholders have acknowledged a write, it ensures no locked reads will be served during its leadership that neglect to reflect a committed write. If the leader's lease expires and some new leader completes the write, all read leases have expired in the mean time and the write can be safely committed.

As illustrated in FIG. 20, individual shards are grouped together in Paxos groups. Over time the sizes of the shards change (generally getting bigger), so some shards have to be reallocated to other Paxos groups (or create new Paxos groups). If a shard changes groups around the same time that the current group leader has an outage, there is some complexity about what group the shard belongs to and how the new leader can recover.

When a new leader takes over in a new epoch or after an outage of the previous leader, the new leader may need to resolve the previous leader's incomplete writes. The Paxos rules that ensure that possibly-committed writes get recommitted require the leader to re-propose the highest-numbered proposal returned by a quorum. To do so, the leader must know what replicas can form a quorum at the log sequence number in question. Since a directory's set of replicas (its Paxos group) is changed via Paxos writes to that directory, there is a problem about which replicas to consult.

Some embodiments address this issue by allowing group changes only in the last log entry of an epoch. For example, with Paxos blocks of 500 numbers, group changes could occur at Paxos log sequence 499 or 999, and so on. This restriction allows concurrently catching up log entries within a group epoch so long as the preceding epoch was entirely applied. Leader catch-up will only be pipelined one group epoch at a time.

The Paxos algorithm itself prevents conflicting transactions from being decided at a single log sequence number. In unpipelined Paxos, any quorum knows the global high-water mark of proposed sequence numbers. It is at most one position beyond the last committed sequence number.

In pipelined Paxos, however, each time a new leader takes over, it determines from a quorum the high-water mark prior leaders have committed to operate within. Via catch-up (Paxos on each outstanding sequence number), it kills or commits all proposals that may have been written by prior leaders. That is, all proposals up to and including that high-water mark. In particular, if any sequence numbers up to that high-water mark went unused, then the new leader must fill them with no-ops. It can then safely issue transaction locks and pipelined proposals. Future leaders catching up from any quorum will at worst re-propose values already known to this leader. The pseudocode 2300 in FIG. 23 identifies the catch-up process used in some embodiments.

Thus, following catch-up, a leader may only issue new proposals at the sequence number following the lowest high-water mark known to any quorum. Before putting multiple writes in flight simultaneously, it must notify the quorum of an extended high-water mark. Whenever the leader has failed to secure a window of sequence numbers in which to issue concurrent proposals, it reverts to keeping a single proposal in flight.

Figure 22:
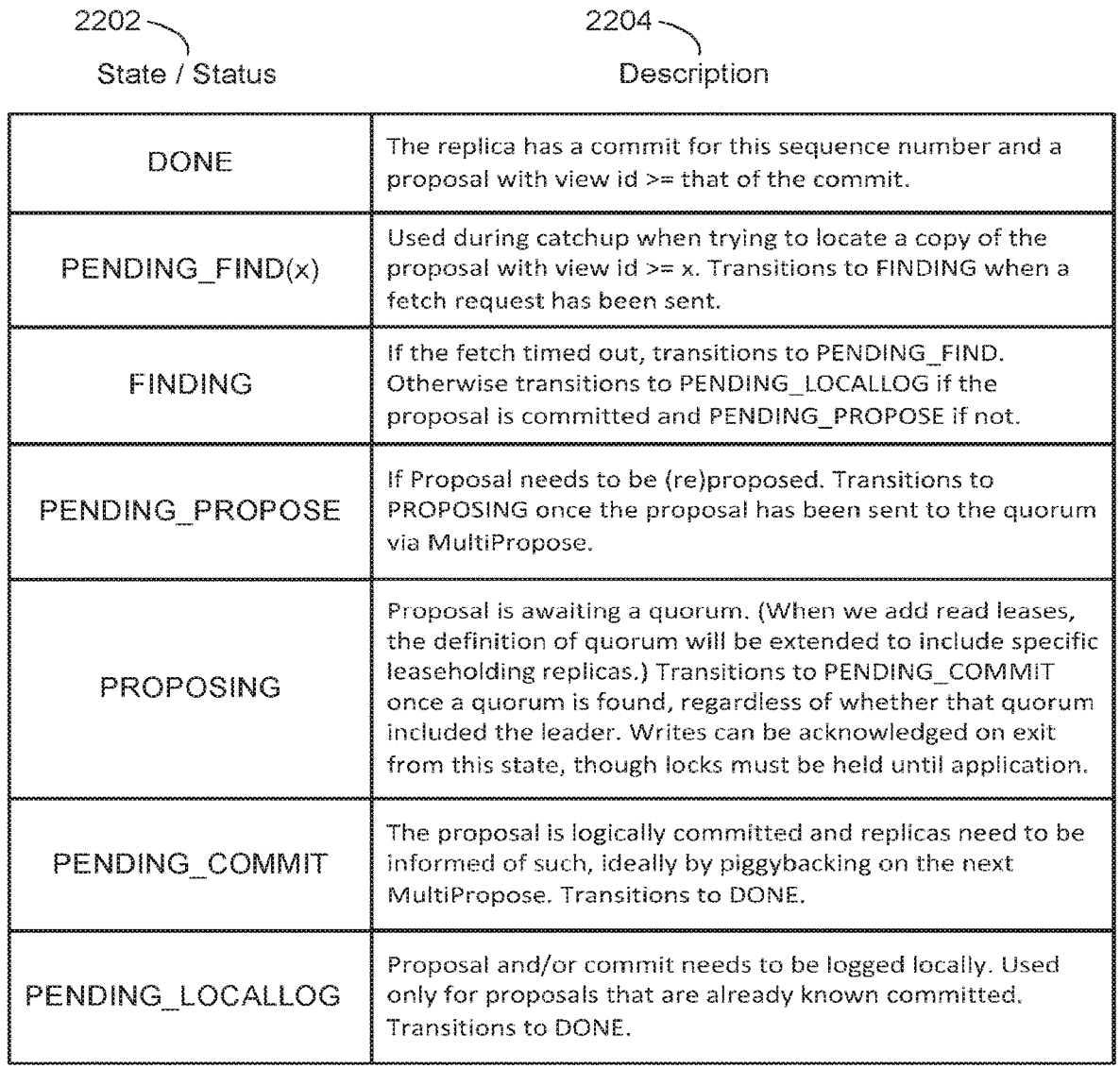
FIG. 22 provides an exemplary set of states for a Paxos state machine in accordance with some embodiments.

A small state machine is maintained for each log position with states roughly corresponding to those in a single-position (unpipelined) implementation. Exemplary states for each Paxos log number are illustrated in FIG. 22. For each state 2202, the description 2204 identifies how the state is used and how it transitions to other states. The PENDING2 states are used in some embodiments to allow greater control over the size and number of outgoing messages. There is no mention of applying in these states because applying committed proposals is handled independently.

When a leader is caught-up, it receives incoming writes from clients. Incoming writes are assigned to empty slots in the Paxos pipeline as they arrive. Some embodiments introduce a small artificial delay during periods of heavy load so that many writes can be bundled into a single outgoing propose round (i.e., boxcarring). When boxcarring multiple writes, preferred embodiments impose a limit on the size or number of writes in a single batch.

Writes are not allowed to span a group epoch boundary. Once an epoch boundary is reached, the flow is the same as in leader catch-up: the pipeline drains, and then the leader seeks re-election or passes off leadership to a newly elected leader.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of pipelining transactions in a distributed database comprising a plurality of replica servers at a plurality of distinct geographic locations, each replica server having one or more processors and memory, the method comprising:
    receiving N database write requests at a leader server, wherein N is a positive integer greater than 1 and each of the N database write requests seeks to access distinct objects in the distributed database;
    assigning a unique identifier to each of the N database write requests, wherein each of the unique identifiers is associated with a status of a respective write request, and wherein the status includes one of: applied, committed, proposed, and unassigned;
    constructing, in parallel, N proposed write transactions, wherein each of the N proposed write transactions incorporates a respective one of the N received write requests, and includes the unique identifier assigned to the respective write request;
    transmitting, in parallel, a plurality of the N proposed write transactions to a respective plurality of non-leader replica servers;
    receiving, at the leader server, confirmations from the plurality of non-leader replica servers for the plurality of write transactions;
    for each confirmation received, committing the respective transaction; and
    updating the status associated with the respective unique identifier for the committed transaction.

2. The method of claim 1, further comprising:
    allocating a finite sequence of unique identifiers for a current epoch, wherein a lowest unique identifier in the finite sequence is greater than a highest unique identifier allocated in previous epochs;
    wherein each of the assigned unique identifiers is selected from the finite sequence of unique identifiers for the current epoch and is previously unassigned.

3. The method of claim 2, further comprising: after all of the finite sequence of unique identifiers have been assigned to write transactions, performing one or more inter-epoch tasks prior to allocating additional unique identifiers for a subsequent epoch.

4. The method of claim 3, wherein the one or more inter-epoch tasks includes resolving each of the finite sequence of unique identifiers for the current epoch, wherein resolving a unique identifier comprises confirming that the respective assigned write transaction has been committed, committing the respective assigned write transaction, or designating the unique identifier as a NO-OP.

5. The method of claim 3, wherein the one or more inter-epoch tasks includes:
    identifying one or more unique identifiers assigned to write transactions that have not been committed but for which there is a plurality of confirmations from replica servers; and
    committing the write transactions corresponding to the identified unique identifiers.

6. The method of claim 3, wherein the one or more inter-epoch tasks includes electing a new leader server from among the replica servers and assigning a new finite sequence of unique identifiers to the new leader server.

7. The method of claim 1, further comprising: establishing a leadership lock assigned to the leader server for a current epoch, wherein the leadership lock precludes any non-leader replica server from constructing proposed write transactions.

8. A database management system, comprising a plurality of replica servers at a plurality of distinct geographic locations, each replica server including one or more processors; memory; and one or more programs stored in the memory for execution by the one or more processors, the one or more programs comprising instructions for:
    receiving, at a leader server, N database write requests, wherein N is a positive integer greater than 1 and each of the N database write requests seeks to access distinct objects in the distributed database; assigning a unique identifier to each of the N database write requests, wherein each of the unique identifiers is associated with a status of a respective write request, and wherein the status includes one of: applied, committed, proposed, and unassigned;
    constructing, in parallel, N proposed write transactions, wherein each of the N proposed write transactions incorporates a respective one of the N received write requests, and includes the unique identifier assigned to the respective write request;
    transmitting, in parallel, a plurality of the N proposed write transactions to a respective plurality of non-leader replica servers;
    receiving confirmations from the plurality of non-leader replica servers for the plurality of write transactions;
    for each confirmation received, committing the respective transaction; and
    updating the status associated with the respective identifier for the committed transaction.

9. The database management system of claim 8, wherein the one or more programs further comprise instructions for:

allocating a finite sequence of unique identifiers for a current epoch, wherein a lowest unique identifier in the finite sequence is greater than a highest unique identifier allocated in previous epochs; wherein each of the assigned unique identifiers is selected from the finite sequence of unique identifiers for the current epoch and is previously unassigned.

10. The database management system of claim 9, wherein the one or more programs further comprise instructions for: after all of the finite sequence of unique identifiers have been assigned to write transactions, performing one or more inter-epoch tasks prior to allocating additional unique identifiers for a subsequent epoch.

11. The database management system of claim 10, wherein the one or more inter-epoch tasks includes resolving each of the finite sequence of unique identifiers for the current epoch, wherein resolving a unique identifier comprises confirming that the respective assigned write transaction has been committed, committing the respective assigned write transaction, or designating the unique identifier as a NO-OP.

12. The database management system of claim 10, wherein the one or more inter-epoch tasks includes:
identifying one or more unique identifiers assigned to write transactions that have not been committed but for which there is a plurality of confirmations from replica servers; and
committing the write transactions corresponding to the identified unique identifiers.

13. The database management system of claim 10, wherein the one or more inter-epoch tasks includes electing a new leader server from among the replica servers and assigning a new finite sequence of unique identifiers to the new leader server.

14. The database management system of claim 8, wherein the one or more programs further comprise instructions for: establishing a leadership lock assigned to the leader server for a current epoch, wherein the leadership lock precludes any non-leader replica server from constructing proposed write transactions.

15. A non-transitory computer readable storage medium storing one or more programs configured for execution by a plurality of replica servers at a plurality of distinct geographic locations, each replica server having one or more processors and memory storing one or more programs for execution by the one or more processors, the one or more programs comprising instructions for:
at a leader server, receiving N database write requests, wherein N is a positive integer greater than 1 and each of the N database write requests seeks to access distinct objects in the distributed database;
assigning a unique identifier to each of the N database write requests, wherein each of the unique identifiers is associated with a status of a respective write request, and wherein the status includes one of: applied, committed, proposed, and unassigned;
constructing, in parallel, N proposed write transactions, wherein each of the N proposed write transactions incorporates a respective one of the N received write requests, and includes the unique identifier assigned to the respective write request;
transmitting, in parallel, a plurality of the N proposed write transactions to a respective plurality of non-leader replica servers, wherein i is a positive integer;
receiving, at the leader server, confirmations from the plurality of non-leader replica servers for the plurality of write transactions;
for each confirmation, committing the respective transaction; and
updating the status associated with the respective unique identifier for the committed transaction.

16. The non-transitory computer readable storage medium of claim 15, wherein the one or more programs further comprise instructions for:
allocating a finite sequence of unique identifiers for a current epoch, wherein a lowest unique identifier in the finite sequence is greater than a highest unique identifier allocated in previous epochs;
wherein each of the assigned unique identifiers is selected from the finite sequence of unique identifiers for the current epoch and is previously unassigned.

17. The non-transitory computer readable storage medium of claim 16, wherein the one or more programs further comprise instructions for: after all of the finite sequence of unique identifiers have been assigned to write transactions, performing one or more inter-epoch tasks prior to allocating additional unique identifiers for a subsequent epoch.

18. The non-transitory computer readable storage medium of claim 17, wherein the one or more inter-epoch tasks includes resolving each of the finite sequence of unique identifiers for the current epoch, wherein resolving a unique identifier comprises confirming that the respective assigned write transaction has been committed, committing the respective assigned write transaction, or designating the unique identifier as a NO-OP.

19. The non-transitory computer readable storage medium of claim 17, wherein the one or more inter-epoch tasks includes:
identifying one or more unique identifiers assigned to write transactions that have not been committed but for which there is a plurality of confirmations from replica servers; and
committing the write transactions corresponding to the identified unique identifiers.

20. The non-transitory computer readable storage medium of claim 17, wherein the one or more inter-epoch tasks includes electing a new leader server from among the replica servers and assigning a new finite sequence of unique identifiers to the new leader server.

* * * * *